US010995000B2

(12) United States Patent
Douglas et al.

(10) Patent No.: US 10,995,000 B2
(45) Date of Patent: May 4, 2021

(54) NANOSTRUCTURED CARBON MATERIALS AND METHODS OF MAKING AND USE THEREOF

(71) Applicant: Vanderbilt University, Nashville, TN (US)

(72) Inventors: Anna Douglas, Nashville, TN (US); Cary Pint, Nashville, TN (US)

(73) Assignee: Vanderbilt University, Nashville, TN (US)

(*) Notice: Subject to any disclaimer, the term of this patent is extended or adjusted under 35 U.S.C. 154(b) by 0 days.

(21) Appl. No.: 16/343,437

(22) PCT Filed: Aug. 1, 2017

(86) PCT No.: PCT/US2017/044826
§ 371 (c)(1),
(2) Date: Apr. 19, 2019

(87) PCT Pub. No.: WO2018/075123
PCT Pub. Date: Apr. 26, 2018

(65) Prior Publication Data
US 2019/0315624 A1 Oct. 17, 2019

Related U.S. Application Data

(60) Provisional application No. 62/455,693, filed on Feb. 7, 2017, provisional application No. 62/410,002, filed on Oct. 19, 2016.

(51) Int. Cl.
*C01B 32/162* (2017.01)
*C25B 15/08* (2006.01)
*B82Y 40/00* (2011.01)

(52) U.S. Cl.
CPC ............ *C01B 32/162* (2017.08); *B82Y 40/00* (2013.01); *C25B 15/08* (2013.01); *H01J 2237/2442* (2013.01)

(58) Field of Classification Search
CPC ...... C01B 32/16; C01B 32/162; C01B 32/164; B82Y 40/00; B32B 9/00; C25B 15/08
(Continued)

(56) References Cited

U.S. PATENT DOCUMENTS 6,929,064 B1  8/2005  Susman
7,250,148 B2  7/2007  Yang et al.
(Continued)

FOREIGN PATENT DOCUMENTS

WO  2007046713     4/2007
WO  2010120581 A1  10/2010
(Continued)

OTHER PUBLICATIONS

Alvarez, et al., "Uniform Large Diameter Carbon Nanotubes in Vertical Arrays from Premade Near-Monodisperse Nanoparticles.", Chem. Mater. 2011, 23, 3466-3475.
(Continued)

*Primary Examiner* — Tri V Nguyen
(74) *Attorney, Agent, or Firm* — Meunier Carlin & Curfman LLC

(57) ABSTRACT

Disclosed herein are methods of making a plurality of carbon nanotubes, the methods comprising applying a current across a catalytically passive anode and a catalytic cathode; wherein the catalytic cathode comprises a catalyst and the catalyst comprises Fe, Co, Mo, Cr, Cu, or a combination thereof; wherein the catalytically passive anode and the catalytic cathode are in electrochemical contact with a molten carbonate electrolyte and a source of CO2; thereby forming a plurality of carbon nanotubes on the catalytic cathode.

17 Claims, 33 Drawing Sheets

(58) Field of Classification Search
USPC ...... 252/500, 502; 977/842; 423/445 R, 460, 423/461
See application file for complete search history.

(56) References Cited

U.S. PATENT DOCUMENTS

| | | | |
|---|---|---|---|
| 7,794,690 | B2 | 9/2010 | Abatzoglou et al. |
| 9,090,473 | B2 | 7/2015 | Jasti et al. |
| 9,290,853 | B2 | 3/2016 | Elgammal et al. |
| 9,475,699 | B2 | 10/2016 | Noyes |
| 9,896,341 | B2 | 2/2018 | Noyes |
| 2004/0197260 | A1 | 10/2004 | Resasco et al. |
| 2007/0183959 | A1 | 8/2007 | Charlier et al. |
| 2009/0140215 | A1 | 6/2009 | Buchholz et al. |
| 2012/0034150 | A1 | 2/2012 | Noyes |
| 2014/0202874 | A1* | 7/2014 | Elgammal ............... C25B 15/08 205/555 |
| 2015/0064092 | A1 | 3/2015 | Noyes |
| 2015/0064096 | A1 | 3/2015 | Noyes |
| 2015/0078981 | A1 | 3/2015 | Noyes |
| 2015/0078982 | A1 | 3/2015 | Noyes |
| 2017/0190578 | A1 | 7/2017 | Noyes |
| 2018/0208466 | A1 | 7/2018 | Noyes |
| 2019/0271088 | A1* | 9/2019 | Licht ......................... C25B 1/00 |

FOREIGN PATENT DOCUMENTS

| | | |
|---|---|---|
| WO | 2013158156 A1 | 10/2013 |
| WO | 2016138469 | 9/2016 |

OTHER PUBLICATIONS

Amama, et al., "Catalyst-support interactions and their influence in water-assisted carbon nanotube carpet growth", Carbon 50 (2012) 2396-2406.

Amama, et al., "Influence of Alumina Type on the Evolution and Activity of Alumina-Supported Fe Catalysts in Single-Walled Carbon Nanotube Carpet Growth", ACS Nano 4 (2010) 895-904.

Amama, et al., "Role of Water in Super Growth of Single-Walled Carbon Nanotube Carpets", Nano Lett. 9 (2009) 44-49.

Arai, et al., "Selective Electrocatalytic Reduction of Carbon Dioxide to methanol on Ru-modified Electrode", Chem. Lett. 1989, 18, 1215-1218.

Arakawa, et al., "Catalysis research of relevance to carbon management: Progress, challenges, and opportunities", Chem. Rev. 101 (2001) 953-996.

Ayres, "Metals recycling: economic and environmental implications", Resour. Conserv. Recy. 1997, 21, 145-173.

Bansode, et al., "Towards full one-pass conversion of carbon dioxide to methanol and methanol-derived products", J. Catal. 309 (2014) 66-70.

Bara, et al., "Room-Temperature Ionic Liquids and Composite Materials: Platform Technologies for CO2 Capture", Acc. Chem. Res. 43 (2010) 152-159.

Bedewy, et al., "Diameter-dependent kinetics of activation and deactivation in carbon nanotube population growth", Carbon 50 (2012) 5106-5116.

Bedewy, et al., "Mechanical coupling limits the density and quality of self-organized carbon nanotube growth", Nanoscale 5 (2013) 2928-2937.

Borman, " Carbon dioxide hydrogenated to methanol on large scale", Chem. Eng. News 94 (2016) 7-7.

Cheung, "Diameter-Controlled Synthesis of Carbon Nanotubes", J. Phys. Chem. B. 2002, 106, 2429-2433.

De Volder, et al., "Carbon nanotubes: present and future commercial applications", Science. 2013, 339, 535-539.

Dresselhaus, et al., "Raman spectroscopy of carbon nanotubes", Phys. Rep. 409 (2005) 47-99.

Gattrell, et al., "A review of the aqueous electrochemical reduction of CO2 to hydrocarbons at copper", J. Electroanal. Chem. 594 (2006) 1-19.

Ge, et al., "An investigation into the carbon nucleation and growth on a nickel substrate in LiCl—Li2CO3 melts", Farad. Discuss. 2016, 190, 259-268.

Geohegan, et al., "Flux-dependent growth kinetics and diameter selectivity in single-wall carbon nanotube arrays", ACS Nano. 2011, 5, 8311-8321.

Hu, et al., "Direct Conversion of Greenhouse Gas CO2 into Graphene via Molten Salts Electrolysis", Chemsuschem 9 (2016) 588-594.

Iijima, "Helical Microtubules of Graphitic Carbon", Nature 354 (1991) 56-58.

Ijije, et al., "Electrochemical manufacturing of nanocarbons from carbon dioxide in molten alkali metal carbonate salts: roles of alkali metal cations", Advances in Manufacturing 2016, 4, 23-32.

Ijije, et al., "Electro-deposition and re-oxidation of carbon in carbonate-containing molten salts", Farad. Discuss. 172 (2014) 105-116.

Ingram, et al., "The Electrolytic Deposition of Carbon from Fused Carbonates", Electrochim. Acta 11 (1966) 1629-1639.

Kaplan, et al., "Conversion of CO2 to CO by Electrolysis of Molten Lithium Carbonate", J. Electrochem. Soc. 157 (2010) 552-556.

Kaplan, et al., "Synthesis and structural characterization of carbon powder by electrolytic reduction of molten Li2CO3—Na2CO3—K2CO3", J. Electrochem. Soc. 149 (2002) 72-78.

Kaplan, et al., "Synthesis of nanostructured carbon material by electroreduction in fused alkali carbonates", Chem. Lett. 7 (2001) 714-715.

Karwa, et al., "Scaled-up self-assembly of carbon nanotubes inside long stainless steel tubing", Carbon. 2006, 44, 1235-1242.

Karwa, et al., "Selective self-assembly of single walled carbon nanotubes in long steel tubing for chemical separations", J Mater Chem, 2006, 16, 2890-2895.

Kawamura, et al., "Electrodeposition of cohesive carbon films on aluminum in a LiCl—KCl—K2CO3 melt", J. Appl. Electrochem. 30 (2000) 571-574.

Kim, et al., "Catalyst and catalyst support morphology evolution in single-walled carbon nanotube supergrowth: Growth deceleration and termination", J. Mater. Res. 25 (2010) 1875-1885.

Kim, et al., "Evolution in Catalyst Morphology Leads to Carbon Nanotube Growth Termination", J. Phys. Chem. Lett. 1 (2010) 918-922.

Kothandaraman, et al., "Conversion of CO2 from Air into Methanol Using a Polyamine and a Homogeneous Ruthenium Catalyst", J. Am. Chem. Soc. 138 (2016) 778-781.

Kuhl, "Electrocatalytic conversion of carbon dioxide to methane and methanol on transition metal surfaces", J. Am. Chem. Soc. 2014, 136, 14107-14113.

Kuhl, et al., "New insights into the electrochemical reduction of carbon dioxide on metallic copper surfaces.", Energy & Environmental Science 2012, 5, 7050-7059.

Kushnir, et al., "Energy requirements of carbon nanoparticle production", Journal of Industrial Ecology. 2008, 12, 360-375.

Larsson, et al., "Calculating carbon nanotube-catalyst adhesion strengths", Phys. Rev. B 75 (2007).

Lau, et al., "Thermodynamic assessment of CO2 to carbon nanofiber transformation for carbon sequestration in a combined cycle gas or a coal power plant", Energy Conversion and Management, 2016, 122, 400-410.

Le, et al., "Electrochemical reduction of CO2 to CH3OH at copper oxide surfaces", J. Electrochem. Soc. 2011, 158, E45-E49.

Le Van, et al., "Electrochemical formation of carbon nano-powders with various porosities in molten alkali carbonates", Electrochim. Acta. 54 (2009) 4566-4573.

Lee, et al., "Temperature effect on the growth of carbon nanotubes using thermal chemical vapor deposition", Chem. Phys. Lett. 343 (2001) 33-38.

Li, et al., "Aligned single-walled carbon nanotube arrays from rhodium catalysts with unexpected diameter uniformity independent of the catalyst size and growth temperature", Chem. Mater. 2016, 28, 870-875.

Liao, et al., "Effect of catalyst composition on carbon nanotube growth", Appl. Phy. Lett. 82 (2003) 2694-2696.

(56) References Cited

OTHER PUBLICATIONS

Licht, et al., "Carbon Nanotubes Produced from Ambient Carbon Dioxide for Environmentally Sustainable Lithium-Ion and Sodium-Ion Battery Anodes", ACS Cent. Sci. 2 (2016) 162-168.
Licht, "Electrosynthetic control of CNT conductivity & morphology: Scale-up of the transformation", arXiv:1607.02220, 2016.
Lin, et al., "Field emission properties of aligned carbon nanotubes grown on stainless steel using CH4/CO2 reactant gas", Diamond Relat. Mater. 2004, 13, 1026-1031.
Liu, et al., "Synthesis of Single-Walled Carbon Nanotubes: Effects of Active Metals, Catalyst Supports, and Metal Loading Percentage", J. Nanomater. (2013).
Maschmann, "Integrated simulation of active carbon nanotube forest growth and mechanical compression", Carbon 86 (2015) 26-37.
Matter, et al., "Rapid carbon mineralization for permanent disposal of anthropogenic carbon dioxide emissions", Science 352 (2016) 1312-1314.
Mikkelsen, et al., "The teraton challenge. A review of fixation and transformation of carbon dioxide", Energ. Environ. Sci. 3 (2010) 43-81.
Muralidharan, et al., "From the junkyard to the power grid: ambient processing of scrap metals into nanostructures electrodes for ultrafast rechargeable batteries", ACS Energy Lett. 2016, 1, 1034-1041.
Nessim, et al., "Precursor gas chemistry determines the crystallinity of carbon nanotubes synthesized at low temperature", Carbon 49 (2011) 804-810.
Nessim, "Properties, synthesis, and growth mechanisms of carbon nanotubes with special focus on thermal chemical vapor deposition", Nanoscale 2 (2010) 1306-1323.
Orbaek, et al., "Single walled carbon nanotube growth and chirality dependence on catalyst composition", Nanoscale 5 (2013) 9848-9859.
Park, et al., "Synthesis of carbon nanotubes on metallic substrates by a sequential combination of PECVD and thermal CVD", Carbon. 2003, 41, 1025-1029.
PCT/US2017/044826, "International Preliminary Report on Patentability dated May 2, 2019 in International Application No. PCT/US2017/044826 (7pages)".
Pint, et al., "Dry Contact Transfer Printing of Aligned Carbon Nanotube Patterns and Characterization of Their Optical Properties for Diameter Distribution and Alignment", ACS Nano 4 (2010) 1131-1145.
Pint, et al., "Temperature and Gas Pressure Effects in Vertically Aligned Carbon Nanotube Growth from Fe—Mo Catalyst", J. Phys. Chem. C 112 (2008) 14041-14051.
Plata, et al., "Early evaluation of potential environmental impacts of carbon nanotube synthesis by chemical vapor deposition", Environmental Science & Technology. 2009, 43, 8367-8373.
Prasek, et al., "Methods for carbon nanotube synthesis—review", J. Mater. Chem. 2011, 21, 15872-15884.
Puretzky, et al., "In situ measurements and modeling of carbon nanotube array growth kinetics during chemical vapor deposition", Appl. Phys. A 81 (2005) 223-240.
Ren, "One-Pot Synthesis of Carbon Nanofibers from CO2", Nano Lett. 15 (2015) Supporting Information.
Ren, et al., "The minimum electrolytic energy needed to convert carbon dioxide to carbon by electrolysis in carbonate melts", J. Phys. Chem. C. 2015, 119, 23342-23349.
Ren, et al., "Tracking airborne CO2 mitigation and low cost transformation into valuable carbon nanotubes", Sci. Rep. 6 (2016) 27760.
Robertson, "Heterogeneous catalysis model of growth mechanisms of carbon nanotubes, graphene and silicon nanowires", J. Mater. Chem. 22 (2012) 19858-19862.
Sakurai, et al., "Role of subsurface diffusion and Ostwald ripening in catalyst formation for single-walled carbon nanotube forest growth", J. Am. Chem. Soc. 2012, 134, 2148-2153.
Soneda, et al., "Formation and texture of carbon nanofilaments by the catalytic decomposition of CO on stainless-steel plate", Carbon. 2000, 38, 478-480.
Studt, et al., "Discovery of a Ni—Ga catalyst for carbon dioxide reduction to methanol", Nat. Chem. 6 (2014) 320-324.
Talapatra, et al., "Direct growth of aligned carbon nanotubes on bulk metals", Nat. Nanotechnol. 2006, 1, 112-116.
Teblum, et al., "Role of Catalyst Oxidation State in the Growth of Vertically Aligned Carbon Nanotubes", J. Phys. Chem. C. 116 (2012) 24522-24528.
Thayer, "Carbon nanotubes by the metric ton", Chem. Eng. News. 2007, 85, 29-35.
Thostenson, et al., "Advances in the science and technology of carbon nanotubes and their composites: a review", Compos. Sci. Technol. 61 (2001) 1899-1912.
Vander Wal, et al., "Carbon nanotube synthesis upon stainless steel meshes.", Carbon. 2003, 41, 659-672.
Wu, et al., "Effect of molten carbonate composition on the generation of carbon material", RSC Adv. 2017, 7, 8467-8473.
Wu, et al., "One-pot synthesis of nanostructured carbon materials from carbon dioxide via electrolysis in molten carbonate salts.", Carbon. 2016,. 106, 208-217.
Zhang, et al., "Diameter-specific growth of semiconducting SWNT arrays using uniform Mo2C solid catalyst", J. Am. Chem. Soc. 2015, 137, 8904-8907.
International Search Report and Written Opinion dated Oct. 18, 2017, from International Application No. PCT/US2017/044826, 9 pages.
Ren, J. et al. "One-Pot Synthesis of Carbon Nanofibers from CO2", Nano Letters 2015, 15, 6142-6148.
Novoselova, I.A. et al. "Electrolytic synthesis of carbon nanotubes from carbon dioxide in molten salts and their characterization", ScienceDirect, Physica E 40 (2008) 2231-2237.
Hu, L. et al. "Capture and electrochemical conversion of CO2 to ultrathin graphite sheets in CaCl2-based melts", Journal of Materials Chemistry A, 2015, 3, 21211-21218.
Licht, S. et al. "Electrosynthetic control of CNT conductivity & morphology: Scale-up of the transformation of the greenhouse gas CO2 into carbon nanotubes by molten carbonate electrolysis", George Washington University, 27 pages, (2016).
Yin, H. et al. "Capture and electrochemical conversion of CO2 to value-added carbon and oxygen by molten salt electrolysis", Energy and Environmental Science, 2013, 6, 1538-1545.

\* cited by examiner

NANOSTRUCTURED CARBON MATERIALS AND METHODS OF MAKING AND USE THEREOF

CROSS-REFERENCE TO RELATED APPLICATIONS

This application is a national stage application filed under 35 U.S.C. § 371 of PCT/US2017/044826 filed Aug. 1, 2017, which claims the benefit of priority to U.S. Provisional Application No. 62/410,002 filed Oct. 19, 2016, and U.S. Provisional Application No. 62/455,693 filed Feb. 7, 2017, which are hereby incorporated herein by reference in their entireties.

STATEMENT OF GOVERNMENT SUPPORT

This invention was made with Government support under Grant No. EPS 1004083 awarded by the National Science Foundation and Graduate Student Research Fellowship Grant No. 1445197 awarded by the National Science Foundation. The Government has certain rights in the invention.

BACKGROUND

The concentration of carbon dioxide in the atmosphere, $CO_{2atm}$, now sits at around 405 parts per million, the highest concentration in history. Due to the relationship between $CO_2$ and global climate change, capture and storage or conversion of carbon dioxide has attracted the attention of researchers in the effort to achieve a reduction in $CO_{2atm}$. Sequestration technologies to store $CO_2$ underground are often bottlenecked by the limitations of available reserves (depleted oil and natural gas reserves) and the probability of gas leaks (Lewis N S. *Energ. Environ. Sci.* 2016, 9, 2172-2176). Similarly, injection of $CO_2$ gas into basaltic rock is promising, but limited by the long mineralization time (>3 years) and energy intensive injection (Matter J M et al. *Science* 2016, 352, 1312-1314). At present, technologies studied for transforming $CO_2$ include: chemical, photochemical, and biological transformation of $CO_2$ into hydrocarbons and alcohols (including methanol and ethanol) (Yin H Y et al. *Energ. Environ. Sci.* 2013, 6, 1538-1545; Mikkelsen M et al. *Energ. Environ. Sci.* 2010, 3, 43-81). Promising as a drop-in replacement fuel for gasoline, many researchers have concentrated their efforts on the chemical transformation of $CO_2$ into methanol (Kothandaraman J et al. *J. Am. Chem. Soc.* 2016, 138, 778-781; Bansode A et al. *J. Catal.* 2014, 309, 66-70; Borman S. *Chem. Eng. News* 2016, 94, 7-7; Studt F et al. *Nat. Chem.* 2014, 6, 320-324), but these low-value hydrocarbons and methanol produced at low system efficiencies undermine the rationale of this approach. The need remains for efficient conversion of $CO_2$ into high-value secondary products. The compositions and methods described herein address these and other needs.

SUMMARY

In accordance with the purposes of the disclosed devices and methods, as embodied and broadly described herein, the disclosed subject matter relates to nanostructured carbon materials and methods of making and use thereof.

Additional advantages of the disclosed devices and methods will be set forth in part in the description which follows, and in part will be obvious from the description. The advantages of the disclosed devices will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

DESCRIPTION OF FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
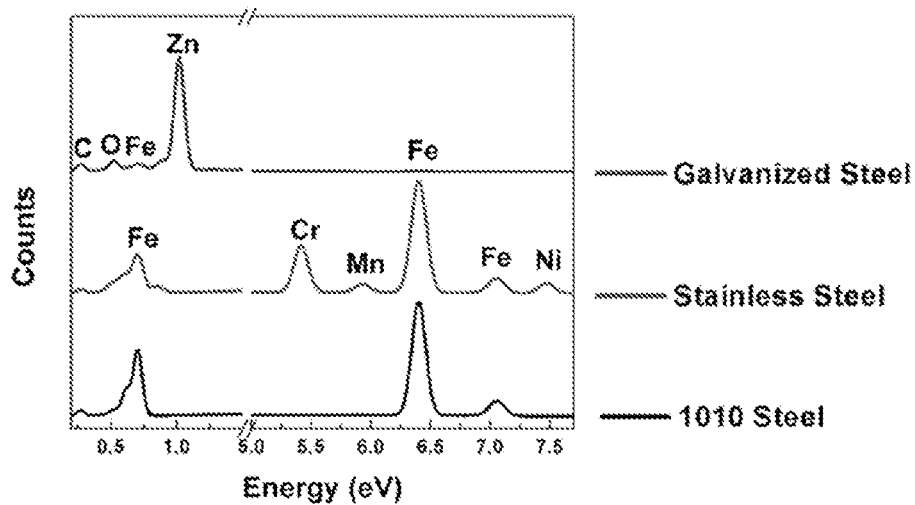
FIG. 1 is a scanning electron microscopy (SEM) energy dispersive x-ray spectroscopy (EDS) spectra showing the surface properties of the 1010 steel, stainless steel, and galvanized steel cathode materials.
Figure 2:
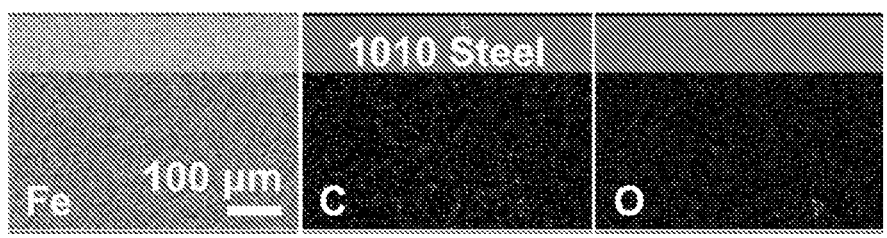
FIG. 2 is the SEM EDS maps showing the surface properties of the 1010 steel cathode materials.
Figure 3:
FIG. 3 is the SEM EDS maps showing the surface properties of the stainless steel cathode materials.
Figure 4:
FIG. 4 is the SEM EDS maps showing the surface properties of the galvanized steel cathode materials.

Carbon nanotubes are commercially used in aircraft and spacecraft materials, where the weight savings of carbon nanotubes are worth the current high cost. However, many other industries including energy, defense, electronic and semiconductors, polymer composites, and structural materials are beginning to use carbon nanotubes as well. Current production of many carbon nanostructures, including carbon nanotubes, are limited by high pressure and high vacuum systems involved in the synthesis process. These systems are expensive and do not scale well to accommodate large batch growths. This has limited current costs of commercial carbon nanostructures (especially single walled carbon nanotubes) to be very high ($900/gram for pure single walled carbon nanotubes). On the other hand, molten carbonate electrolysis has been investigated as a safe way to convert ambient carbon dioxide to stable non-oxidized carbon. The methods described herein provides a technique to manufacture carbon nanotubes at a significantly lower cost compared to current methods.

Disclosed herein are methods of making a plurality of carbon nanotubes, the methods comprising applying a current across a catalytically passive anode and a catalytic cathode; wherein the catalytic cathode comprise a catalyst and the catalyst comprises Fe, Co, Mo, Cr, Cu, or a combination thereof; wherein the catalytically passive anode and the catalytic cathode are in electrochemical contact with a molten carbonate electrolyte and a source of $CO_2$; thereby forming a plurality of carbon nanotubes on the catalytic cathode.

The current is applied at a current density sufficient to electrolytically convert $CO_2$ into carbon and oxygen. In some examples, the methods described herein can comprise electrolysis of carbon dioxide. The current can, for example, be applied at a current density of 25 mA/cm$^2$ or more (e.g., 30 mA/cm$^2$ or more, 40 mA/cm$^2$ or more, 50 mA/cm$^2$ or more, 60 mA/cm$^2$ or more, 70 mA/cm$^2$ or more, 80 mA/cm$^2$ or more, 90 mA/cm$^2$ or more, 100 mA/cm$^2$ or more, 125 mA/cm$^2$ or more, 150 mA/cm$^2$ or more, 175 mA/cm$^2$ or more, 200 mA/cm$^2$ or more, 225 mA/cm$^2$ or more, 250 mA/cm$^2$ or more, 275 mA/cm$^2$ or more, 300 mA/cm$^2$ or more, 350 mA/cm$^2$ or more, 400 mA/cm$^2$ or more, or 450 mA/cm$^2$ or more). In some examples, the current can be applied at a current density of 500 mA/cm$^2$ or less (e.g., 450 mA/cm² or less, 400 mA/cm² or less, 350 mA/cm² or less, 300 mA/cm² or less, 275 mA/cm² or less, 250 mA/cm² or less, 225 mA/cm² or less, 200 mA/cm² or less, 175 mA/cm² or less, 150 mA/cm² or less, 125 mA/cm² or less, 100 mA/cm² or less, 90 mA/cm² or less, 80 mA/cm² or less, 70 mA/cm² or less, 60 mA/cm² or less, 50 mA/cm² or less, 40 mA/cm² or less, or 30 mA/cm² or less). The current can be applied at a current density that can range from any of the minimum values described above to any of the maximum values described above. For example, the current can be applied at a current density of from 25 mA/cm² to 500 mA/cm² (e.g., from 25 mA/cm² to 250 mA/cm², from 250 mA/cm² to 500 mA/cm², from 25 mA/cm² to 400 mA/cm², from 25 mA/cm² to 300 mA/cm², from 25 mA/cm² to 200 mA/cm², or from 25 mA/cm² to 100 mA/cm²).

The current can be applied, for example, for an amount of time of 1 minute or more (e.g., 2 minutes or more, 3 minutes or more, 4 minutes or more, 5 minutes or more, 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 1 hour or more, 1.5 hours or more, 2 hours or more, 2.5 hours or more, 3 hours or more, 3.5 hours or more, 4 hours or more, or 4.5 hours or more, 5 hours or more, 6 hours or more, 7 hours or more, 8 hours or more, or 9 hours or more). In some examples, the current can be applied for 10 hours or less (e.g., 9 hours or less, 8 hours or less, 7 hours or less, 6 hours or less, 5 hours or less, 4.5 hours or less, 4 hours or less, 3.5 hours or less, 3 hours or less, 2.5 hours or less, 2 hours or less, 1.5 hours or less, 1 hour or less, 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, 5 minutes or less, 4 minutes or less, or 3 minutes or less). The time that the current is applied for can range from any of the minimum values described above to any of the maximum values described above. For example, the current can be applied for an amount of time of from 1 minutes to 10 hours (e.g., from 1 minute to 5 hours, from 5 hours to 10 hours, from 1 minute to 9 hours, from 1 minute to 8 hours, from 1 minute to 7 hours, from 1 minute to 6 hours, from 1 minute to 5 hours, from 1 minute to 4 hours, from 1 minute to 3 hours, from 1 minute to 2 hours, or from 1 minute to 1 hour).

As used herein, a "catalytically passive anode" is any conductive substrate that does not comprise nickel and/or any conductive substrate that has been coated with a passivating layer, wherein said passivating layer substantially minimizes or prevents nickel from leaching into the molten carbonate electrolyte relative to the same conductive substrate in the absence of the passivating layer.

The catalytically passive anode can, in some examples, comprises a conductive substrate coated with a passivating layer. The conductive substrate can, for example, comprise a metal, a metal oxide, a carbon material, or a combination thereof. Suitable conductive substrates are known in the art.

The passivating layer can, for example, comprise an oxide, a metal nitride, a metal carbide, or combinations thereof. In some examples, the passivating layer can comprise a metal oxide, a metal nitride, a metal carbide, or combinations thereof. The passivating layer can, for example, comprise $Al_2O_3$, $TiO_2$, MgO, TiN, VN, or combinations thereof.

The passivating layer can have a thickness of, for example, 2 nm or more (e.g., 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, or 90 nm or more). In some examples, the passivating layer can have a thickness of 100 nm or less (e.g., 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, or 5 nm or less). The thickness of the passivating layer can range from any of the minimum values described above to any of the maximum values described above. For example, the passivating layer can have a thickness of from 2 nm to 100 nm (e.g., from 2 nm to 50 nm, from 50 nm to 100 nm, from 2 nm to 30 nm, from 30 nm to 60 nm, from 60 nm to 100 nm, from 5 nm to 95 nm, from 10 nm to 90 nm, from 20 nm to 80 nm, from 30 nm to 70 nm, from 40 nm to 60 nm, or from 45 nm to 55 nm).

The methods can further comprise forming the catalytically passive anode. For example, the catalytically passive anode can be formed by depositing the passivating layer on the conductive substrate. The passivating layer can be deposited on the conductive substrate, for example, by thin film processing techniques, such as sputtering, pulsed layer deposition, molecular beam epitaxy, evaporation, atomic layer deposition, chemical vapor deposition, or combinations thereof. In some examples, the passivating layer is deposited on the conductive substrate by atomic layer deposition.

In some examples, the catalytically passive anode can comprise a metal, a metal oxide, a carbon material, or a combination thereof, with the proviso that the catalytically active material does not comprise nickel. In some examples, the catalytically passive anode can comprise iridium, graphite, platinum, tin oxide, steel, copper, or a combination thereof.

The catalytic cathode can, for example, be formed from a material that includes the catalyst. In some examples, the catalytic cathode can comprise a metal, a metal oxide, a carbon material, or a combination thereof. In some examples, the catalytic cathode can comprise steel (e.g., galvanized steel, 1010 steel, stainless steel, or a combination thereof).

In some examples, the catalytic cathode can comprise a conductive substrate and a catalytic layer deposited on said substrate, wherein said catalytic layer comprises the catalyst. In some examples, the conductive substrate can comprise a metal, a metal oxide, a carbon material, or a combination thereof. Suitable conductive substrates are known in the art. The catalytic layer can, for example, have a thickness of 0.1 nm or more (e.g., 0.25 nm or more, 0.5 nm or more, 0.75 nm or more, 1 nm or more, 1.25 nm or more, 1.5 nm or more, 1.75 nm or more, 2 nm or more, 2.25 nm or more, 2.5 nm or more, 3 nm or more, 3.5 nm or more, 4 nm or more, 4.5 nm or more, 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 21 nm or more, 22 nm or more, 23 nm or more, or 24 nm or more). In some examples, the catalytic layer can have a thickness of 25 nm or less (e.g., 24 nm or less, 23 nm or less, 22 nm or less, 21 nm or less, 20 nm or less, 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, 6 nm or less, 5 nm or less, 4.5 nm or less, 4 nm or less, 3.5 nm or less, 3 nm or less, 2.5 nm or less, 2.25 nm or less, 2 nm or less, 1.75 nm or less, 1.5 nm or less, 1.25 nm or less, 1 nm or less, 0.75 nm or less, or 0.5 nm or less). The thickness of the catalytic layer can range from any of the minimum values described above to any of the maximum values described above. For example, the catalytic layer can have a thickness of from 0.1 nm to 25 nm (e.g., from 0.1 nm to 13 nm, from 13 nm to 25 nm, from 0.1 nm to 5 nm, from 5 nm to 10 nm, from 10 nm to 15 nm, from 15 nm to 20 nm, from 20 nm to 25 nm, or from 0.5 nm to 5 nm).

In some examples, the methods can further comprise forming the catalytic cathode. For example, the catalytic cathode can be formed by depositing the catalytic layer on the conductive substrate. The catalytic layer can be deposited on the conductive substrate, for example, by thin film processing techniques, such as sputtering, pulsed layer deposition, molecular beam epitaxy, evaporation, atomic layer deposition, chemical vapor deposition, or combinations thereof. In some examples, the catalytic cathode further comprises a passivating layer and the passivating layer is disposed between the conductive substrate and the catalytic layer.

In some examples, the catalytic cathode can comprise a conductive substrate and a plurality of catalytic particles deposited on said conductive substrate, wherein the plurality of catalytic particles comprise the catalyst. Depositing a plurality of catalytic particles can, for example, comprise printing, lithographic deposition, spin coating, drop-casting, zone casting, dip coating, blade coating, spraying, vacuum filtration, or combinations thereof.

In some examples, the plurality of catalytic particles can comprise Fe. In some examples, the plurality of catalytic particles can comprise iron oxide.

The plurality of catalytic particles can have an average particle size. "Average particle size" and "mean particle size" are used interchangeably herein, and generally refer to the statistical mean particle size of the particles in a population of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. Mean particle size can be measured using methods known in the art, such as evaluation by scanning electron microscopy, transmission electron microscopy, and/or dynamic light scattering.

The plurality of catalytic particles can, for examples, have an average particle size of 0.5 nm or more (e.g., 1 nm or more, 2 nm or more, 3 nm or more, 4 nm or more, 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 25 nm or more, 30 nm or more, 35 nm or more, 40 nm or more, or 45 nm or more). In some examples, the plurality of catalytic particles can have an average particle size of 50 nm or less (e.g., 45 nm or less, 40 nm or less, 35 nm or less, 30 nm or less, 25 nm or less, 20 nm or less, 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, 6 nm or less, 5 nm or less, 4 nm or less, 3 nm or less, 2 nm or less, or 1 nm or less). The average particle size of the plurality of catalytic particles can range from any of the minimum values described above to any of the maximum values described above. For example, the plurality of catalytic particles can have an average particle size of from 0.5 nm to 50 nm (e.g., from 0.5 nm to 25 nm, from 25 nm to 50 nm, from 0.5 nm to 40 nm, from 0.5 nm to 30 nm, from 0.5 nm to 20 nm, or from 4 nm to 20 nm).

In some examples, the plurality of catalytic particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the mean particle size (e.g., within 20% of the mean particle size, within 15% of the mean particle size, within 10% of the mean particle size, or within 5% of the mean particle size).

The plurality of catalytic particles can comprise particles of any shape (e.g., a sphere, a rod, a quadrilateral, an ellipse, a triangle, a polygon, etc.). In some examples, the plurality of catalytic particles are substantially spherical.

In some examples, the catalytic cathode further comprises a passivating layer and the passivating layer is disposed between the conductive substrate and the plurality of catalytic particles.

In some examples, the catalyst comprises Fe. In some examples, the catalyst consists of Fe. In some examples, the catalyst can comprise Fe and the catalytic cathode can comprise Fe in an amount of 75% or more (e.g., 80% or more, 85% or more, 90% or more, or 95% or more). In some examples, the catalyst can comprise Fe and the catalytic cathode can comprise Fe in an amount of 99% or more (e.g., 99.1% or more, 99.2% or more, 99.3% or more, 99.4% or more, 99.5% or more, 99.6% or more, 99.7% or more, 99.8% or more, or 99.9% or more).

The methods can, in some examples, further comprise heating a metal carbonate to produce the molten carbonate electrolyte. The metal carbonate can, for example, be heated at a temperature of 400° C. or more (e.g., 425° C. or more, 450° C. or more, 475° C. or more, 500° C. or more, 525° C. or more, 550° C. or more, 575° C. or more, 600° C. or more, 625° C. or more, 650° C. or more, 675° C. or more, 700° C. or more, 725° C. or more, 750° C. or more, 775° C. or more, 800° C. or more, or 825° C. or more). In some examples, the metal carbonate can be heated at a temperature of 850° C. or less (e.g., 825° C. or less, 800° C. or less, 775° C. or less, 750° C. or less, 725° C. or less, 700° C. or less, 675° C. or less, 650° C. or less, 625° C. or less, 600° C. or less, 575° C. or less, 550° C. or less, 525° C. or less, 500° C. or less, 475° C. or less, 450° C. or less, or 425° C. or less). The temperature at which the metal carbonate is heated can range from any of the minimum values described above to any of the maximum values described above. For example, the metal carbonate can be heated at a temperature of from 400° C. to 850° C. (e.g., from 400° C. to 625° C., from 625° C. to 850° C., from 400° C. to 800° C., from 500° C. to 800° C., from 600° C. to 800° C., from 700° C. to 800° C., or from 725° C. to 775° C.).

The molten carbonate electrolyte can comprise any molten metal carbonate wherein the metal has a higher standard reduction potential compared to carbon. In some examples, the molten carbonate electrolyte can comprise and alkali metal carbonate, an alkaline earth metal carbonate, or a combination thereof. In some examples, the molten carbonate electrolyte can comprise lithium carbonate, sodium carbonate, potassium carbonate, rubidium carbonate, cesium carbonate, francium carbonate, beryllium carbonate, magnesium carbonate, calcium carbonate, strontium carbonate, barium carbonate, radium carbonate, or a combination thereof. In some examples, the molten carbonate electrolyte comprises lithium carbonate.

The source of $CO_2$ can, for example, be provided by injecting the $CO_2$ source into the molten carbonate electrolyte. In some examples, injecting the $CO_2$ source into the molten carbonate electrolyte can comprise bubbling the $CO_2$ source into the molten carbonate electrolyte. In some examples, the source of $CO_2$ can be provided by contacting the source of $CO_2$ with the molten carbonate electrolyte. For example, the molten carbonate electrolyte can be provided in a location such that the atmosphere around the molten carbonate electrolyte comprises the source of $CO_2$. The source of $CO_2$ can, for example, comprise $CO_2$, air, exhaust from an industrial process, exhaust from an internal combustion engine, or a combination thereof.

In some examples, the plurality of carbon nanotubes are crystalline. The crystallinity of the plurality of carbon nanostructures can be determined by Raman spectroscopy. The plurality of carbon nanotubes can, for example, comprise single walled carbon nanotubes, multi-walled carbon nanotubes, or a combination thereof. The average length of the plurality of carbon nanotubes can, for example, be 100 nm or more (e.g., 200 nm or more, 300 nm or more, 400 nm or more, 500 nm or more, 600 nm or more, 700 nm or more, 800 nm or more, 900 nm or more, 1 µm or more, 5 µm or more, 10 µm or more, 25 µm or more, 50 µm or more, 100 µm or more, 200 µm or more, 300 µm or more, 400 µm or more, 500 µm or more, 750 µm or more, 1 mm or more, 5 mm or more, 10 mm or more, 25 mm or more, 50 mm or more, 100 mm or more, 200 mm or more, 300 mm or more, 400 mm or more, 500 mm or more, or 750 mm or more). In some examples, the average length of the plurality of carbon nanotubes can be 1 centimeter (cm) or less (e.g., 750 mm or less, 500 mm or less, 400 mm or less, 300 mm or less, 200 mm or less, 100 mm or less, 50 mm or less, 25 mm or less, 10 mm or less, 5 mm or less, 1 mm or less, 750 µm or less, 500 µm or less, 400 µm or less, 300 µm or less, 200 µm or less, 100 µm or less, 50 µm or less, 25 µm or less, 10 µm or less, 5 µm or less, 1 µm or less, 900 nm or less, 800 nm or less, 700 nm or less, 600 nm or less, 500 nm or less, 400 nm or less, 300 nm or less, or 200 nm or less). The average length of the plurality of carbon nanotubes can range from any of the minimum values described above to any of the maximum values described above. For example, the average length of the plurality of carbon nanotubes can be from 100 nm to 1 cm (e.g., from 100 nm to 1 µm, from 1 µm to 1 mm, from 1 mm to 1 cm, from 100 nm to 1 mm, or from 100 nm to 100 µm). The average length of the plurality of carbon nanotubes can be measured using methods known in the art, such as evaluation by scanning electron microscopy and/or transmission electron microscopy. In some examples.

The plurality of carbon nanotubes can have an average outer diameter of 0.5 nm or more (e.g., 1 nm or more, 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, or 90 nm or more). In some examples, the plurality of carbon nanotubes can have an average outer diameter of 100 nm or less (e.g., 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, 2 nm or less, or 1 nm or less). The average outer diameter of the plurality of carbon nanotubes can range from any of the minimum values described above to any of the maximum values described above. For example, the average outer diameter of the plurality of carbon nanotubes can be from 0.5 nm to 100 nm (e.g., from 0.5 nm to 50 nm, from 50 nm to 100 nm, from 0.5 nm to 20 nm, from 20 nm to 40 nm, from 40 nm to 60 nm, from 60 nm to 80 nm, from 80 nm to 100 nm, from 0.5 nm to 5 nm, from 5 nm to 60 nm, from 10 nm to 60 nm, from 10 nm to 50 nm, from 20 nm to 35 nm, or from 25 to 30 nm). The average outer diameter of the plurality of carbon nanotubes can be measured using methods known in the art, such as evaluation by scanning electron microscopy and/or transmission electron microscopy.

The methods can, in some examples, further comprise collecting the plurality of carbon nanotubes from the catalytic cathode. Collecting the plurality of carbon nanotubes from the catalytic cathode can, for example, comprise sonicating the catalytic cathode to separate the plurality of carbon nanotubes from the catalytic cathode by dispersing the plurality of carbon nanotubes into a solvent and centrifuging or filtering the solvent with the plurality of carbon nanotubes dispersed therein to thereby collect the plurality of carbon nanotubes. In some examples, collecting the plurality of carbon nanotubes from the catalytic cathode can comprise mechanically scraping the catalytic cathode to separate the plurality of carbon nanotubes from the catalytic cathode.

The methods can, in some examples, further comprise washing the collected plurality of carbon nanotubes. For example, the collected plurality of carbon nanotubes can be washed with an acid, water, or a combination thereof. Examples of suitable acids include, but are not limited to, HCl, HBr, HI, HClO, $HClO_2$, $HClO_3$, $HClO_4$, $H_2SO_4$, $HNO_3$, $H_3PO_4$, acetic acid, citric acid, ascorbic, formic acid, or combinations thereof.

In some examples, the methods can further comprise drying the collected plurality of carbon nanotubes. Drying the collected plurality of carbon nanotubes can, for example, comprise heating the collected plurality of carbon nanotubes at a temperature of 60° C. or more for an amount of time (e.g., 70° C. or more, 80° C. or more, 90° C. or more, 100° C. or more, 120° C. or more, 140° C. or more, 160° C. or more, or 180° C. or more). In some examples, drying the collected plurality of carbon nanotubes can comprise heating the collected plurality of carbon nanotubes at a temperature of 200° C. or less for an amount of time (e.g., 180° C. or less, 160° C. or less, 140° C. or less, 120° C. or less, 100° C. or less, 90° C. or less, 80° C. or less, or 70° C. or less). The temperature at which the collected plurality of carbon nanotubes are heated for drying can range from any of the minimum values described above to any of the maximum values described above. For example, drying the collected plurality of carbon nanotubes can comprise heating the collected plurality of carbon nanotubes at a temperature of from 60° C. to 200° C. for an amount of time (e.g., from 60° C. to 120° C., from 120° C. to 200° C., from 60° C. to 90° C., from 90° C. to 120° C., from 120° C. to 150° C., from 150° C. to 180° C., from 180° C. to 200° C., or from 80° C. to 180° C.). In some examples, drying the collected plurality of carbon nanotubes can comprise heating the collected plurality of carbon nanotubes at a temperature for an amount of time of 30 minutes or more (e.g., 1 hour or more, 2 hours or more, 3 hours or more, 4 hours or more, 5 hours or more, 6 hours or more, 8 hours or more, 10 hours or more, 12 hours or more, 14 hours or more, 16 hours or more, 18 hours or more, 20 hours or more, or 22 hours or more). In some examples, drying the collected plurality of carbon nanotubes can comprise heating the collected plurality of carbon nanotubes at a temperature for an amount of time of 24 hours or less (e.g., 22 hours or less, 20 hours or less, 18 hours or less, 16 hours or less, 14 hours or less, 12 hours or less, 10 hours or less, 8 hours or less, 6 hours or less, 5 hours or less, 4 hours or less, 3 hours or less, 2 hours or less, or 1 hour or less). The time for which the collected plurality of carbon nanotubes are heated at a temperature for drying can range from any of the minimum values described above to any of the maximum values described above. For example, drying the collected plurality of carbon nanotubes can comprise heating the collected plurality of carbon nanotubes at a temperature for an amount of time of from 30 minutes to 24 hours (e.g., from 30 minutes to 12 hours, from 12 hours to 24 hours, from 30 minutes to 18 hours, or from 30 minutes to 8 hours). In some examples, drying the collected plurality of carbon nanotubes can comprise heating the collected plurality of carbon nanotubes at a temperature of from 60° C. to 200° C. for an amount of time from 30 minutes to 24 hours.

Also described herein are devices comprising a catalytically passive anode; a catalytic cathode, wherein the catalytic cathode comprises a catalyst and the catalyst comprises Fe, Co, Mo, Cr, Cu, or a combination thereof; a molten carbonate electrolyte; a source of carbon dioxide; wherein the catalytically passive anode and the catalytic cathode are in electrochemical contact with a molten carbonate electrolyte and a source of $CO_2$. In some examples, the devices can further comprise a power source that is in electrical contact with the catalytically passive anode and the catalytic cathode.

Also described herein are methods of use of the devices for capturing $CO_2$. For example, the devices can be used to capture $CO_2$ from the atmosphere, exhaust from an industrial process, exhaust from an internal combustion engine, or a combination thereof. In some examples, the methods can further comprise electrolytically converting the captured $CO_2$ into a plurality of carbon nanotubes. The methods described herein can overcome the bottlenecks often associated with carbon capture and conversion/storage by transformation into a functional material useful for applications in a variety of sectors. One possible application for this technology is the direct integration of this system to an exhaust pipe on a passenger car, which would utilize hot $CO_2$ exhaust as $CO_2$ source as well as thermal energy to heat electrolyte The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

The electrolytic conversion of $CO_2$ into nanostructured carbons has been investigated beginning with aqueous electrolytes (Gattrell M et al. *J. Electroanal. Chem.* 2006, 594, 1-19). However, the low solubility of $CO_2$ in aqueous solution and the similar reaction potential of water decomposition made the reaction impractical. Reduction of $CO_2$ was more recently investigated in room temperature ionic liquids (RTILs) due to their attractive electrochemical window and high solubility of $CO_2$, however the high cost and toxicity of room temperature ionic liquids inhibits their adoption in commercial applications (Bara J E et al. *Acc. Chem. Res.* 2010, 43, 152-159). Carbonate melts offer a low cost and high ionic conductivity with a low vapor pressure, and have been demonstrated to be a viable electrolyte for the reduction of $CO_2$. The deposition of carbon onto gold wire electrodes in molten eutectic carbonate electrolytes was first reported in the mid-1960s (Ingram BBMD and Janz G J. *Electrochim. Acta* 1966, 11, 1629-1639). Building from early experiments, nanostructured carbon films deposited from low temperature eutectic electrolytes have more recently been investigated using inexpensive working electrodes such as aluminum, Ni, and steel, even though control of carbon products remains a challenge (Kawamura H and Ito Y. *J. Appl. Electrochem.* 2000, 30, 571-574; Kaplan B et al. *J. Electrochem. Soc.* 2002, 149, 72-78; Kaplan B et al. *Chem. Lett.* 2001, 7, 714-715; Le Van K et al. *Electrochim. Acta.* 2009, 54, 4566-4573; Ijije H V et al. *Farad. Discuss.* 2014, 172, 105-116). Energy storage applications such as supercapacitors have utilized high surface area carbon deposited from these low temperature eutectic electrolytes (Yin H Y et al. *Energ. Environ. Sci.* 2013, 6, 1538-1545). In the case of pure carbonate electrolytes, recent advances have observed the formation of CO in $Li_2CO_3$ at elevated temperatures (>850° C.) (Kaplan V et al. *J. Electrochem. Soc.* 2010, 157, 552-556), and ultrathin graphite sheets onto steel electrodes in calcium electrolytes (Hu L W et al. *J. Mater. Chem. A* 2015, 3, 21211-21218; Hu L W et al. *Chemsuschem* 2016, 9, 588-594.

Owing to their extraordinary mechanical, electrical, and thermal properties, growth of carbon nanotubes (CNTs) has been at the forefront of research for nearly two decades (Iijima S. *Nature* 1991, 354, 56-58; Dresselhaus M S et al. *Phys. Rep.* 2005, 409, 47-99; Thostenson E T et al. *Compos. Sci. Technol.* 2001, 61, 1899-1912). In past years, comprehensive models of carbon nanotube growth have been developed to account for the various factors that impact gas phase surface supported growth, such as precursor chemistry, catalyst composition and oxidation state, catalyst size, catalyst support properties, temperature, and dynamic processes during growth such as Ostwald ripening, metal catalyst diffusion into the support layer, and mechanochemical termination processes. Growth of carbon nanostructures from electrochemical techniques remains a new idea, and recent studies leading to the first observation of carbon nanofibers (Ren J W et al. *Nano Lett.* 2015, 15, 6142-6148) or large-diameter carbon nanotubes (>100 nm) (Licht S et al. *ACS Cent. Sci.* 2016, 2, 162-168) have been carried out using a corrosive Ni anode and steel cathode. The first report of carbon nanofibers grown from this process utilized a mixture of carbonates and soluble metal oxides between inexpensive steel cathodes and either Ni or Ir anodes, and found there to be a positive effect from Ni and Zn to grow fibers (Ren J W et al. *Nano Lett.* 2015, 15, 6142-6148). In this system, it is presumed that corrosion of the Ni is the basis for the metal catalyst, and no apparent route exists to control the formation of a surface-bound catalyst for carbon nanotube growth (Ren J W et al. *Nano Lett.* 2015, 15, 6142-6148; Licht S et al. *ACS Cent. Sci.* 2016, 2, 162-168). Whereas these works have studied the interplay between cathode surfaces and electrodeposited catalysts (in the case of Zn coated cathodes and corroded Ni catalysts), currently no studies have been carried out to correlate catalytic activity in the presence of carbonates to the catalytic properties of the electrode materials themselves. This is especially important since decades of gas phase carbon nanotube growth research has led to unequivocal correlation between catalyst composition, size, and the resulting carbon nanotubes that are grown (Puretzky A A et al. *Appl. Phys. A* 2005, 81, 223-240; Nessim G D. *Nanoscale* 2010, 2, 1306-1323).

Herein the effect of electrode processes on electrochemical growth of carbon nanostructures is examined, building on observations of traditional gas-phase carbon nanotube growth processes, which typically use only one active substrate. To control and understand growth, atomic layer deposition, cathodes with different surface coatings and Fe metal composition, and varying anode-cathode current density were utilized. The results of these investigations indicate the ability to use these concepts to direct the formation of iron-based catalyst nanoparticles to grow high yield (99%) and highly crystalline multi-walled carbon nanotubes with average outer diameter of 27 nm from ambient carbon dioxide captured from the atmosphere.

Three different anodes were used in electrolysis experiments. Anodes included untreated Ni wire (Fisher Scientific, 99%, 1 mm diameter), thermally oxidized Ni wire (1 hr at 450° C. in air), and Ni wire coated with 500 cycles (~50 nm) of $Al_2O_3$ by a Gemstar Arradiance atomic layer deposition (ALD). The thickness of the $Al_2O_3$ coating deposited using atomic layer deposition was determined through ellipsometry analysis of $Al_2O_3$ coatings on silicon wafers with a J. A. Woollam spectrometer. The $Al_2O_3$ coating was deposited using sequential 28 ms pulses of $C_6H_{18}Al_2$ and $H_2O$ with a residence time of 1 second. The cathodes used in these experiments were three different steels: 16 gauge galvanized steel wire (Home Depot), 216 stainless steel shim (Trinity Brand Industries), and 1010 steel shim (McMaster-Carr).

Scanning electron microscopy (SEM) energy dispersive x-ray spectroscopy (EDS) were used to characterize the surface properties of each of the cathode materials by observing the elements present on the surface of each type of steel, the results of which are shown in FIG. 1-FIG. 4. In the case of 1010 steel, the surface is comprised of mostly Fe and a low concentration of C and O; whereas stainless steel is comprised of many elements including Fe, Cr, Mn, and Ni and galvanized steel is comprised of Zn, O, and Fe (FIG. 1-FIG. 4).

Electrolysis experiments were carried out in an alumina crucible (AdValue Tech, 50 ml) containing 40 g lithium carbonate electrolyte (Fisher Scientific, 99%), which was held at 750° C. (mp 723° C.) in a cylindrical ceramic heater (Thermcraft) using a bench top temperature controller (OEM Heaters). The electrodes (5 cm², coiled wires or square shims) were immersed into the electrolyte and a constant current was applied across the electrodes. All electrolysis experiments in this study were carried out for 1 hr. No degradation of the lithium carbonate electrolyte was observed, and the same batch of lithium carbonate electrolyte was reused for five consecutive experiments before discarding. During the electrolysis, carbon accumulates at the cathode, which is removed from the electrolyte and cooled after electrolysis. The carbon product was removed from the electrodes by bath sonication in water (1 hr), and purified from carbonates by washing in 2 M HCl, and solvent exchanged to water through centrifugation. The carbon product was then dried at 60° C. overnight.

The carbon nanostructures were analyzed with a Zeiss Merlin scanning electron microscopy (SEM) and an FEI Osiris transmission electron microscope (TEM) at a beam voltage of 200 kV with corresponding elemental mapping by energy dispersive x-ray (EDS) technique to determine catalyst composition. The yield of carbon nanotubes in the overall electrolysis product was estimated from SEM images of raw material. The crystallinity of the carbon nanostructures was determined by Raman spectroscopy on a Renishaw inVia microscope with a 532 $nm^{-1}$ laser excitation, 10 seconds exposure time, and 10% laser power.

Figure 5:
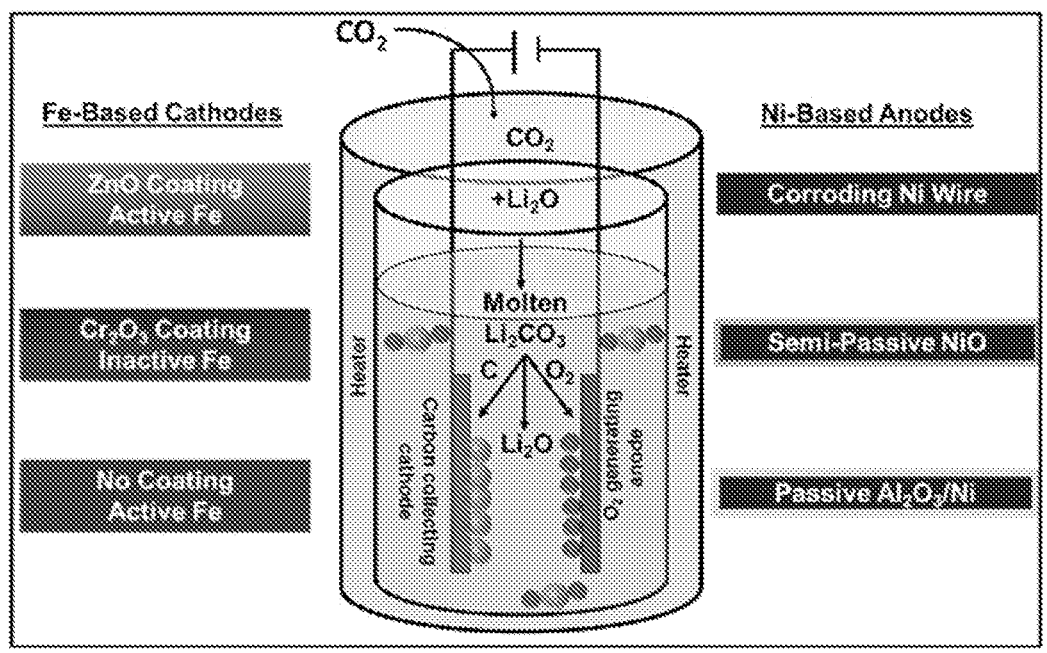
FIG. 5 is a schematic illustration of electrolysis set-up including the different cathodes and anodes utilized in this study.

The general process of carbon nanotube growth relies on the decomposition of a carbon containing precursor most commonly on the surface of a metal catalyst. Only recently has the growth of carbon nanotubes been demonstrated through liquid phase electrolysis of $CO_2$, and parameters commonly related to traditional carbon nanotube growth, such as catalyst composition, carbon flux, and catalyst size, remains elusive without a clear understanding of how these components originate or evolve. Therefore, the focus of the present study is to elucidate and control these parameters to control carbon nanotube growth to achieve high yield and high quality carbon nanotube materials from carbon dioxide. The molten carbonate electrolysis technique used to convert $CO_2$ into nanostructured carbon is illustrated in FIG. 5. Lithium carbonate was chosen as the electrolyte because of the lower standard reduction potential of carbon compared to the alkali metal, causing carbon to deposit onto the cathode rather than Li (Ijije H V et al. *Farad. Discuss.* 2014, 172, 105-116). Briefly, a constant current is applied across a carbon collecting cathode (steel) and an oxygen-generating anode (Ni). This splits molten $Li_2CO_3$ into C, which collects at the cathode, $O_2$ collected at the anode, and $Li_2O$. The remaining $Li_2O$ reacts with ambient $CO_2$ to regenerate the $Li_2CO_3$ electrolyte. The equations are:

$$Li_2CO_3 \rightarrow Li_2O + C + O_2 \quad (1)$$

$$Li_2O + CO_2 \rightarrow Li_2CO_3 \quad (2)$$

The net equation from equations (1) and (2) is:

$$CO_2 \rightarrow C + O_2 \quad (3)$$

This four-electron process converts $CO_2$ to carbon at a theoretical rate of 84 grams C/kilowatt-hour at 100% faradaic efficiency and a potential of 1.33 V. Previous works have justified the argument of $CO_2$ capture by molten carbonate electrolytes, and work by Ren et al. demonstrated a $^{13}C$ isotope experiment to track $CO_2$ uptake and transformation into carbon nanofibers and large diameter nanotubes (Ren J W and Licht S. *Sci. Rep.* 2016, 6, 27760).

Figure 6:
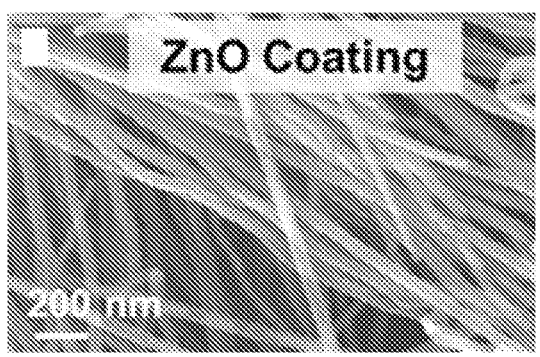
FIG. 6 is a scanning electron microscopy (SEM) image of carbon nanotube products grown on ZnO coated (galvanized) steel electrodes.
Figure 7:
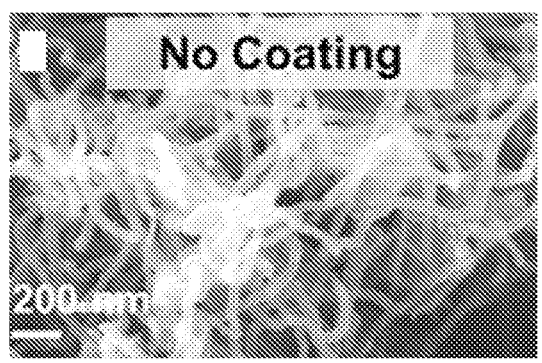
FIG. 7 is a SEM image of carbon nanotube products grown on uncoated (1010) steel electrodes.
Figure 8:
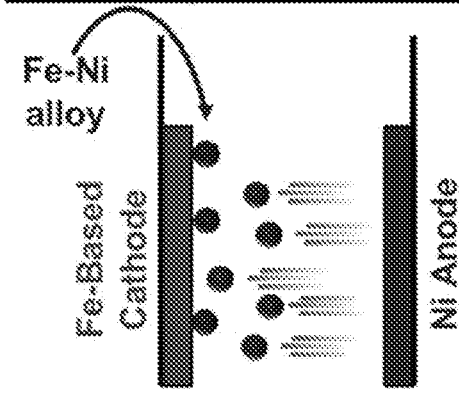
FIG. 8 is a schematic illustration of bare Ni anodes and their corrosive nature in electrolyte.
Figure 9:
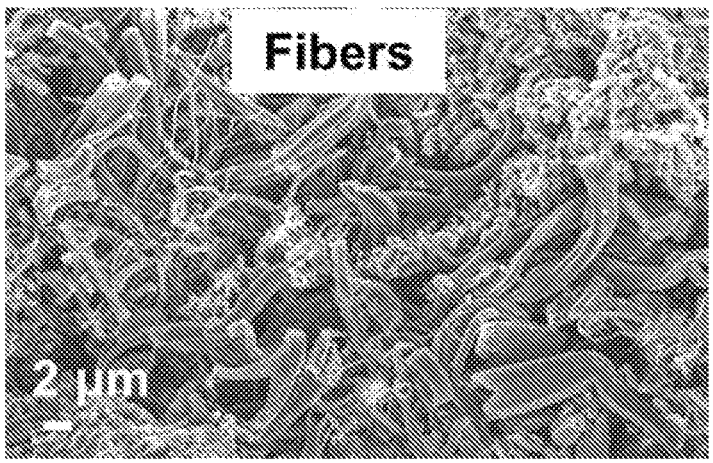
FIG. 9 is a SEM image of the carbon materials grown from bare Ni anodes.
Figure 10:
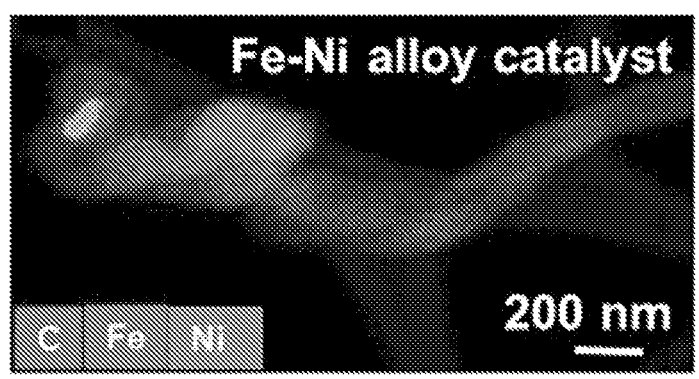
FIG. 10 is the scanning tunneling electron microscopy (STEM) energy dispersive x-ray spectroscopy (EDS) analysis of the catalyst left inside the carbon nanomaterials grown using bare Ni anodes.
Figure 11:
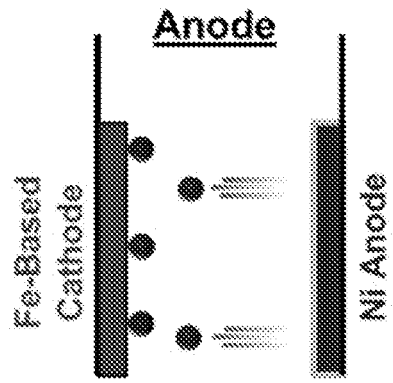
FIG. 11 is a Schematic illustration of the thermally passivated Ni anodes and their corrosive nature in electrolyte.
Figure 12:
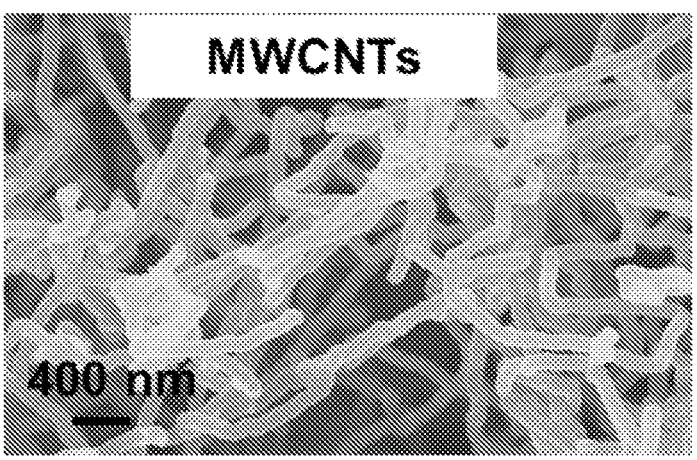
FIG. 12 is a SEM image of the multi-walled carbon nanotubes grown from the thermally passivated Ni anodes.
Figure 13:
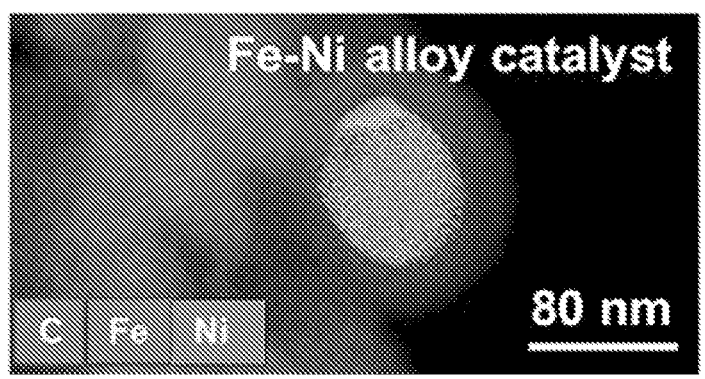
FIG. 13 is the STEM EDS analysis of the catalyst left inside the multi-walled carbon nanotubes growth using the thermally passivated Ni anodes.
Figure 14:
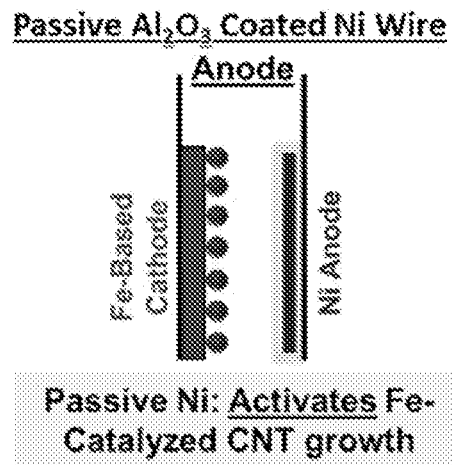
FIG. 14 is a schematic illustration of the atomic layer deposition alumina passivated Ni anodes and their corrosive nature in electrolyte.
Figure 15:
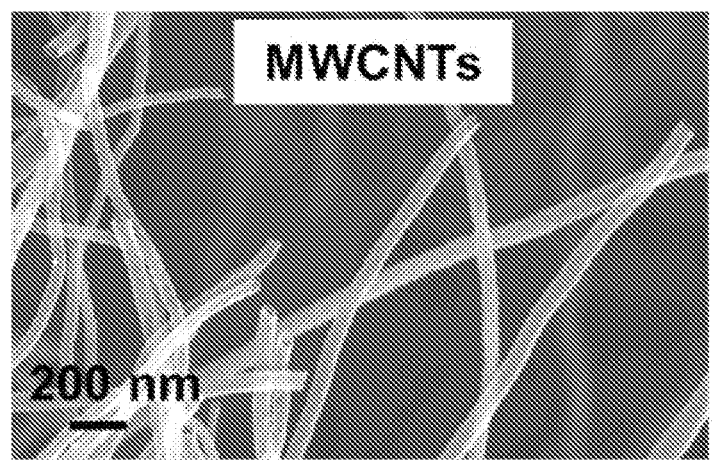
FIG. 15 is a SEM image of the multi-walled carbon nanotubes grown from the atomic layer deposition alumina passivated Ni anodes.
Figure 16:
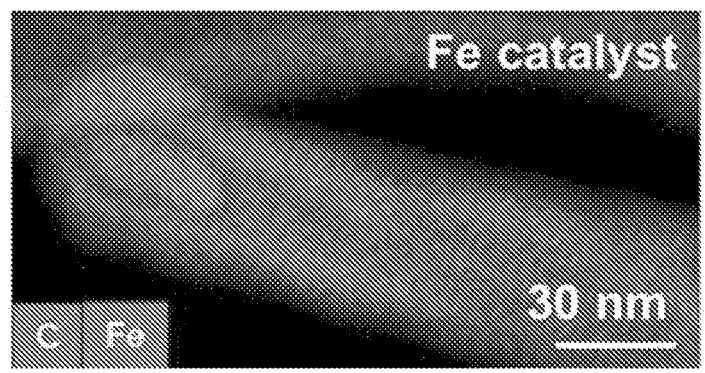
FIG. 16 is the STEM EDS analysis of the catalyst left inside the multi-walled carbon nanotubes made using the atomic layer deposition alumina passivated Ni anodes.

To assess the effect of the electrode on the carbon nanotube growth process, three different cathodes and anodes were studied, and they are schematically represented in FIG. 5. The three anodes studied include untreated Ni wire, semi-passive thermally oxidized NiO, and fully passivated $Al_2O_3$ coated Ni wire. The three cathodes studied include galvanized steel, (ZnO-coated, Fe>95%), stainless steel ($Cr_2O_3$ coating, 72% Fe), and 1010 steel (99% Fe). Without detailed understanding of the catalytic process, these three electrodes can be coupled with Ni-based anodes to produce a variety of carbon nanostructures including carbon fibers or nanofibers, petaled graphite materials, and carbon nanotubes. However, the lack of understanding of how the anode or cathode impacts the formation of each of these products limits a controlled route to design the system to optimize tailored growth of one species. In this manner, the efforts herein are focused on tailoring these electrode materials to achieve high yield growth of highly crystalline carbon nanotubes (FIG. 6, FIG. 7).

Figure 17:
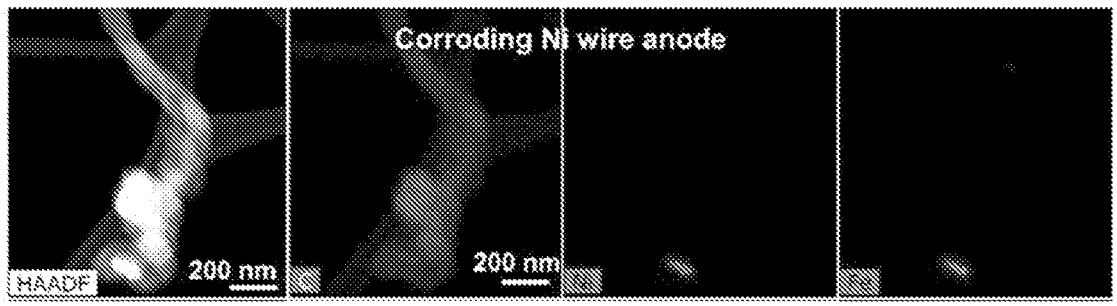
FIG. 17 is the individual elemental maps from carbon nanotubes grown using corroding Ni wire.
Figure 18:
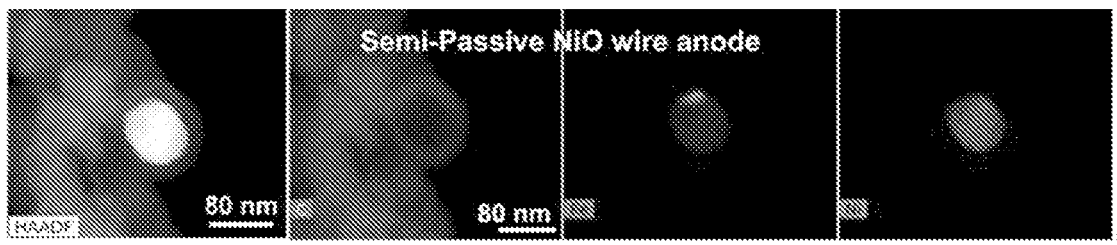
FIG. 18 is the individual elemental maps from carbon nanotubes grown using semi-passive NiO wire.

Whereas no previous experimental efforts have been made to address the catalyst species in molten carbonate electrolysis, it has been hypothesized that Ni corrosion into the electrolyte leads to plating onto the cathode and is responsible for the nucleation of carbon nanofibers (or carbon nanostructures) on the surface (Ren J W et al. *Nano Lett.* 2015, 15, 6142-6148). In order to understand the source of the catalyst for carbon nanotube growth, passive, uniform coatings of alumina were formed in certain studies herein using atomic layer deposition to thereby fully deactivate corrosion on the Ni anode. Whereas previous work demonstrated the inert nature of Ir anodes in molten carbonate electrolytes (Ren J W et al. *Nano Lett.* 2015, 15, 6142-6148), the experiments described herein focused on studying the tunable surface properties of Ni anodes, in an effort to utilize inexpensive electrode materials. Three cases were compared—untreated Ni wire, thermally oxidized Ni wire, and Ni wire coated with ~50 nm of alumina using atomic layer deposition. In each case, a current density during electrolysis of 100 mA/cm$^2$ was used and the cathode material was galvanized steel. As shown in FIG. 8-FIG. 16, the carbon products obtained by varying the anode are significantly different, implying the importance of the anode in steering the catalytic properties. In the case of an untreated Ni wire anode material, the growth results primarily in carbon fibers with some a minority species of large-diameter carbon nanotubes also being formed. When the Ni wire is thermally oxidized to produce a rough oxide layer coating that exceeds the thickness of the native oxide, the carbon product produced in an identical process is steered toward the formation of hollow-center carbon nanotubes with large diameters (~100+ nm) and wavy surfaces that are indicative of a high sp$^3$ (defect) content. Finally, when atomic layer deposition is utilized to produce a moderately thick (50 nm) and dense barrier layer on the Ni anode surface, straight carbon nanotubes with smaller diameters are observed. To understand these differences, scanning-tunneling electron microscopy (STEM) energy dispersive x-ray spectroscopy (EDS) imaging of the carbon nanotube materials was performed to correlate the synthesized product and the chemical identity of the catalyst particles that remain embedded in the product. Despite trace metals present in galvanized steel, the SEM EDS imaging reveals the catalytic behavior of metals, as only those metals that participate catalytically will be embedded in the carbon nanotubes. In both the Ni wire and the thermally oxidized Ni wire anodes, the presence of Ni-rich bimetallic Ni—Fe catalyst particles were observed at the exterior edges of the grown carbon nanostructures. Individual elemental EDS maps for the bimetallic catalysts and corresponding high angular dark field electron images are shown in FIG. 17 and FIG. 18. The presence of Fe and Ni are observed at the same location, as seen in FIG. 17 and FIG. 18, indicating a bimetallic alloy, which is consistent with the bulk phase diagram at 750° C. However, in the case of the atomic layer deposition coated Ni anode, no signature of Ni was observed in the catalyst particles (which reveals that Ni is sourced from the anode in the previous experiments), and only Fe-based catalyst materials positioned at the ends of the multi-walled carbon nanotubes (MWCNTs) were observed.

Therefore, the anode can be deactivated from taking part in the catalytic process, this allows the carbon nanotube growth process to be directly controlled by the composition and properties of the cathode material. In this spirit, a series of experiments were performed using galvanized steel (ZnO coating, >95% Fe), stainless steel (Cr$_2$O$_3$ coating, 72% Fe), and 1010 steel (99% Fe) cathodes. These electrodes were subjected to either high current density (100 mA/cm$^2$) or low current density (25 mA/cm$^2$) and the carbon structures produced were then compared. As the carbon flux is a parameter commonly associated with gas-phase catalytic carbon nanotube growth, the analogous parameter of these systems is the current density since this controls the rate at which CO$_2$ is split between electrodes. In these three different cathodes, the source of catalytic metal (bulk Fe) will have different accessibility based on the surface coating of the steel that dictates whether the steel is galvanized, stainless, or 1010.

Representative SEM images of the carbon products grown on each steel cathode were collected. In all cases, if carbon nanotubes are observed, the SEM images of these are shown with relative yields overlaid. In all cases carbon is deposited, but herein the relative yield is defined as the concentration of carbon nanotubes relative to non-carbon nanotube carbon products. These yields were estimated based on SEM analysis of multiple images.

Figure 19:
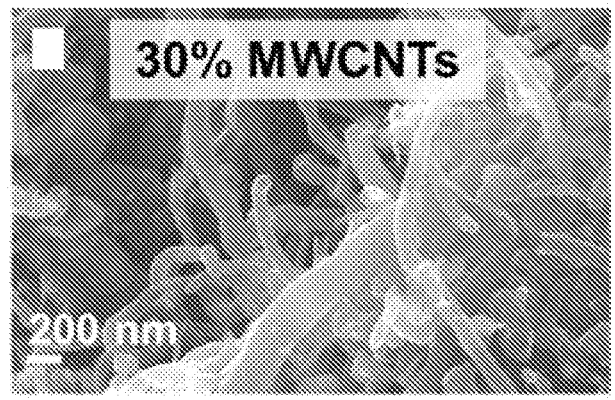
FIG. 19 is a SEM image of the carbon materials grown on the untreated galvanized steel cathodes at 25 $mA/cm^2$.
Figure 20:
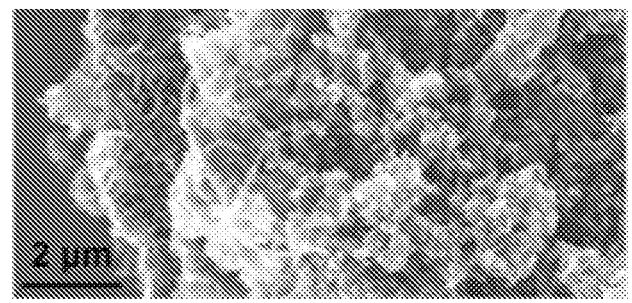
FIG. 20 is a SEM image of carbon products other than carbon nanotubes grown on untreated galvanized cathodes at 25 mA/cm$^2$.
Figure 21:
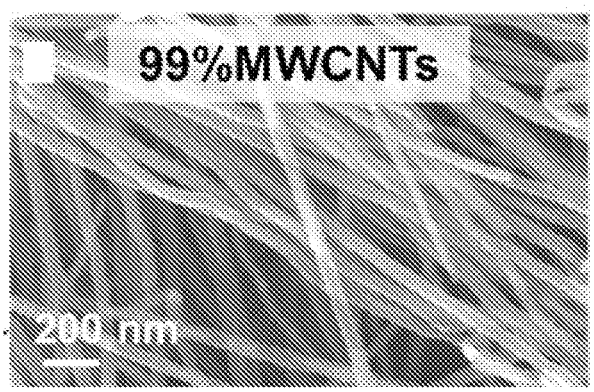
FIG. 21 is a SEM image of the carbon materials grown on the untreated galvanized steel cathodes 100 mA/cm$^2$.
Figure 22:
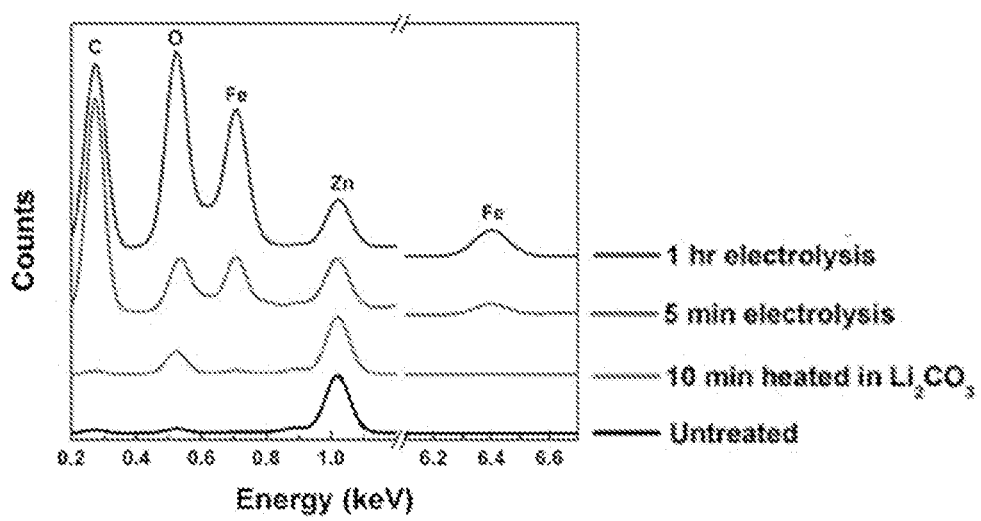
FIG. 22 is the SEM EDS spectra of galvanized steel surface at different points throughout electrolysis.
Figure 23:
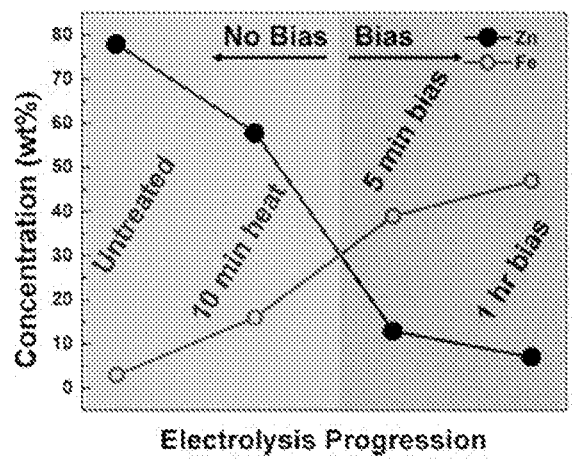
FIG. 23 is a plot of the relative concentrations of Zn and Fe on the galvanized steel surface at different points throughout electrolysis.
Figure 24:
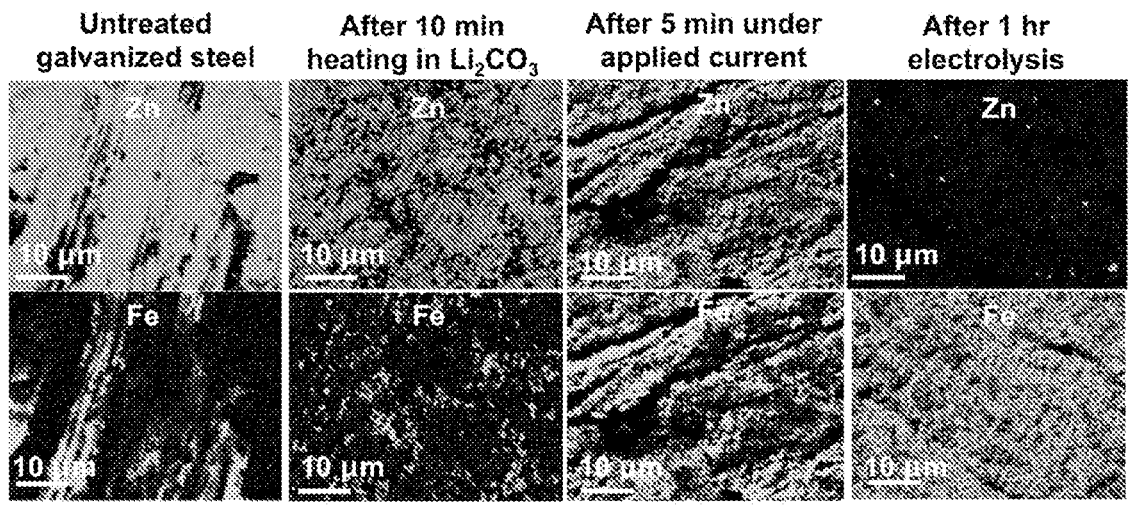
FIG. 24 is the SEM EDS mapping of Zn and Fe elements on the galvanized steel surface at different points throughout the electrolysis
Figure 25:
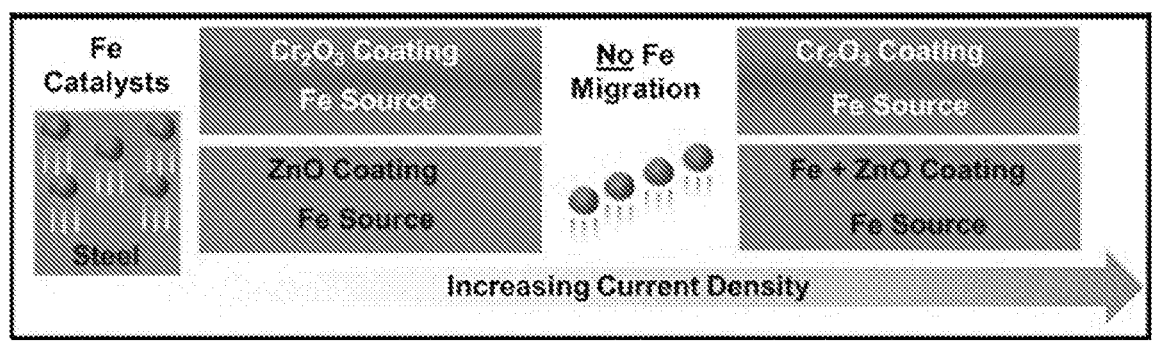
FIG. 25 is a schematic illustration of the mechanism of sourcing Fe from within the steel.

In the case of galvanized steel, under low current densities the formation of 30% carbon nanotubes (FIG. 19) among 70% amorphous carbon (FIG. 20) were observed, whereas high current densities drove the growth of 99% yield multi-walled carbon nanotubes (FIG. 21). This high yield growth can be attributed to the combined ability to activate the catalyst from beneath the ZnO layer with high current densities, but also the ability to sustain catalytic carbon nanotube growth in conditions of higher carbon flux. At low current densities, a combination of amorphous carbon overcoating of catalytic Fe metal combined with low accessibility of the Fe from the interior of the steel can inhibit high yield carbon nanotube growth. At higher current densities, faster carbon deposition kinetics and greater Fe migration through the ZnO coating, driven by the increased electric field, to the electrode surface can lead to high yield multi-walled carbon nanotube growth. This effect was experimentally observed with SEM EDS imaging of the substrate surface before growth, after ten minutes of heating in the carbonate electrolyte, after five minutes of applied current, and after a full hour-long electrolysis (FIG. 22 and FIG. 23). As shown in both the spectra (FIG. 22) and relative concentrations of Zn and Fe (FIG. 23), at the beginning of the electrolysis, the galvanized steel surface is comprised of almost entirely Zn and a native oxide layer. However, under heating and applied current, the concentration of zinc decreases while the concentration of Fe increases as the Fe migrates to the surface to catalyze the growth of carbon nanotubes (FIG. 22 and FIG. 23). After a 1 hr electrolysis, the surface is almost entirely Fe, with trace amounts of Zn present (FIG. 22 and FIG. 23). This is also shown in the SEM EDS maps shown in FIG. 24. This relationship between current density and metal migration to the surface of the catalyst is schematically represented in FIG. 25.

Figure 26:
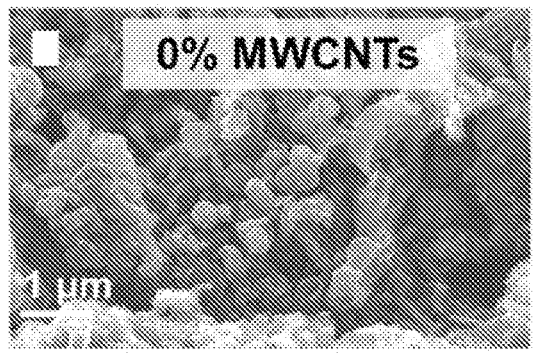
FIG. 26 is a SEM image of the carbon materials grown on the untreated stainless steel cathodes at 25 mA/cm$^2$.
Figure 27:
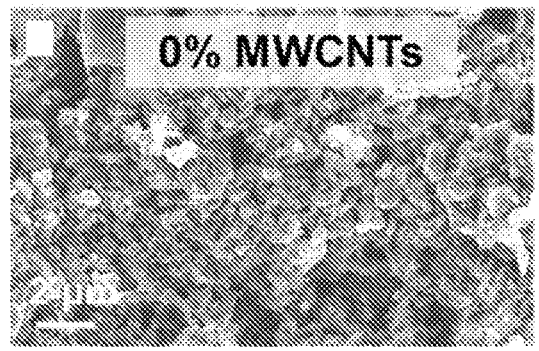
FIG. 27 is a SEM image of the carbon materials grown on the untreated stainless steel cathodes 100 mA/cm$^2$.

In the case of the stainless steel cathode (FIG. 26, FIG. 27) the formation of amorphous carbon was observed at all current densities, with no carbon nanotubes observed. In this case, the $Cr_2O_3$ layer actively prevents the migration of Fe to the surface of the electrode and drives the formation of amorphous carbon, schematically represented in FIG. 25. This result also implies that amorphous carbon deposition using galvanized steel electrodes is a result of increased accessibility of catalytic metal as opposed to the adverse effect of slow carbon deposition on the surface.

Figure 28:
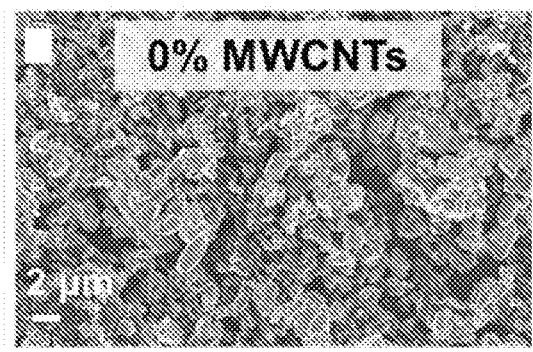
FIG. 28 is a SEM image of the carbon materials grown on the untreated 1010 steel cathodes at 25 mA/cm$^2$.
Figure 29:
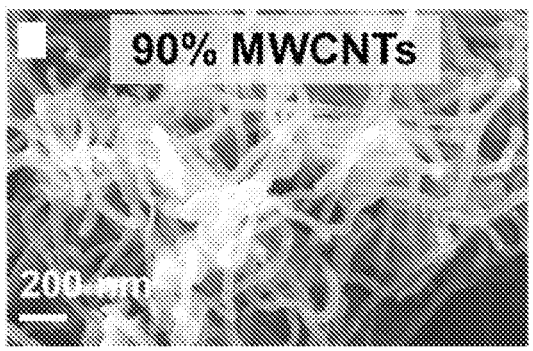
FIG. 29 is a SEM image of the carbon materials grown on the untreated 1010 steel cathodes at 100 mA/cm$^2$.
Figure 30:
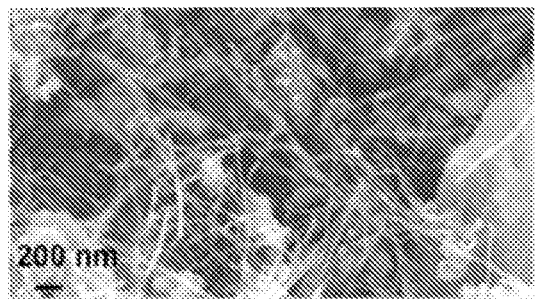
FIG. 30 is a SEM image of carbon products other than carbon nanotubes grown on the untreated 1010 steel cathodes at 100 mA/cm$^2$.
Figure 31:
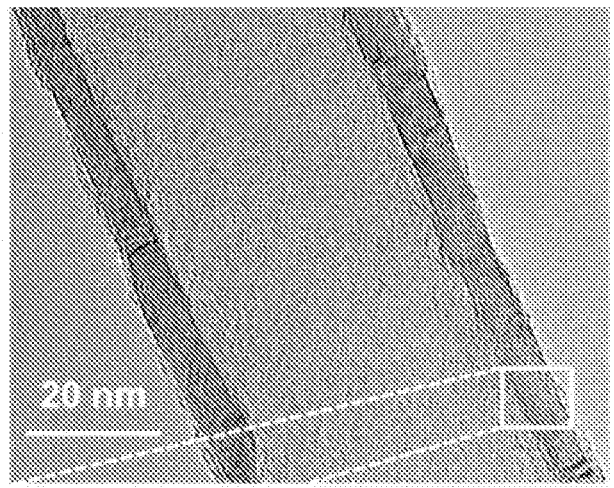
FIG. 31 is a transmission electron microscope (TEM) image of highly crystalline multi-walled carbon nanotube grown on untreated galvanized steel cathode with inert $Al_2O_3$ coated Ni anode at 100 mA/cm$^2$.
Figure 32:
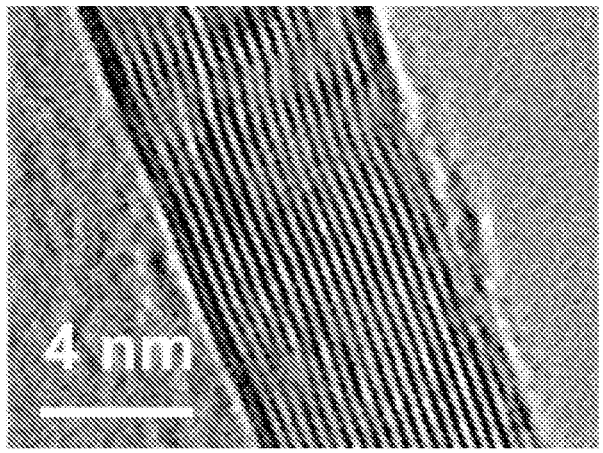
FIG. 32 is a high-resolution TEM image of a portion of the highly crystalline multi-walled carbon nanotube grown on untreated galvanized steel cathode with inert $Al_2O_3$ coated Ni anode at 100 mA/cm$^2$.
Figure 33:
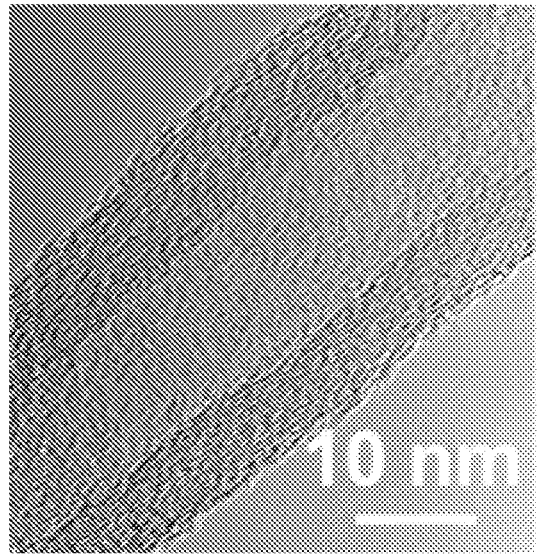
FIG. 33 is a TEM image of carbon nanotube products grown on untreated galvanized steel cathode with inert $Al_2O_3$ coated Ni anode at 100 mA/cm$^2$.
Figure 34:
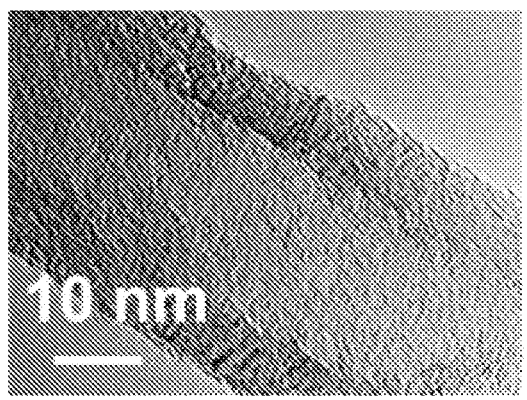
FIG. 34 is a TEM image of carbon nanotube products grown on untreated galvanized steel cathode with inert $Al_2O_3$ coated Ni anode at 100 mA/cm$^2$.
Figure 35:
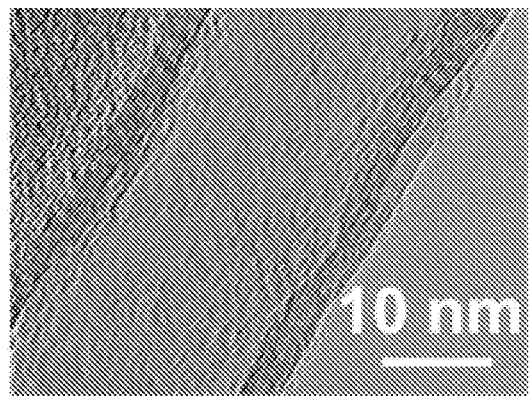
FIG. 35 is a TEM image of carbon nanotube products grown on untreated galvanized steel cathode with inert $Al_2O_3$ coated Ni anode at 100 mA/cm$^2$.

Finally, the carbon products grown on 1010 steel cathodes were studied. No carbon nanotubes were observed to grow at low current densities on 1010 steel (FIG. 28), whereas high current densities drove the formation of multi-walled carbon nanotubes as the majority product (90% yield) (FIG. 29), with the remaining 10% of carbon products grown at high current density on the 1010 steel cathode being amorphous carbon (FIG. 30). This trend, consistent with the case of galvanized steel, is attributed to the current-induced Fe diffusion through a native oxide layer to the electrode-electrolyte interface. Whereas previous reports have correlated positive catalytic activity to the zinc coating at the surface of the cathode, however the observance of carbon nanotubes grown on 1010 steel, which has no zinc coating, indicates that the zinc coating may be instead be inert. Rather, the porous oxide coatings on both the galvanized and 1010 steel aid in the diffusion of Fe to the surface for catalytic activity. In the cases of galvanized steel and 1010 steel where carbon nanotubes are observed, some carbon nanotubes appear to be partially filled with catalyst metal. Here, as the carbon nanotubes are grown via tip-growth, metal filling will be a result of favorable energetics on the carbon nanotube interior in agreement with the capillary effect. During electrolysis experiments, the conductive nature of carbon nanotubes enables electrical connectivity between catalyst situated on growing carbon nanotubes and the cathode where the Fe metal catalyst is sourced from.

Figure 36:
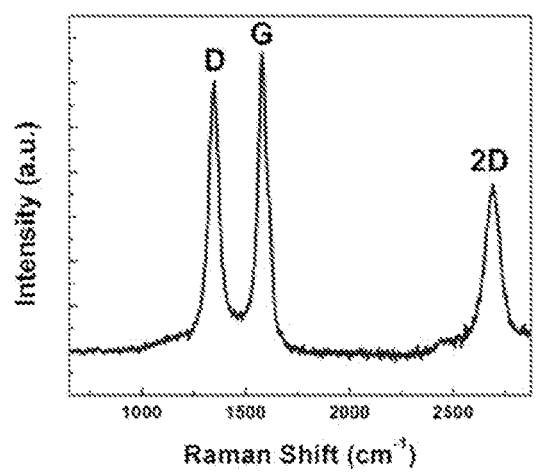
FIG. 36 is representative Raman spectra of the multi-walled carbon nanotubes grown on untreated galvanized steel cathode with inert $A_2O_3$ coated Ni anode at 100 mA/cm$^2$.
Figure 37:
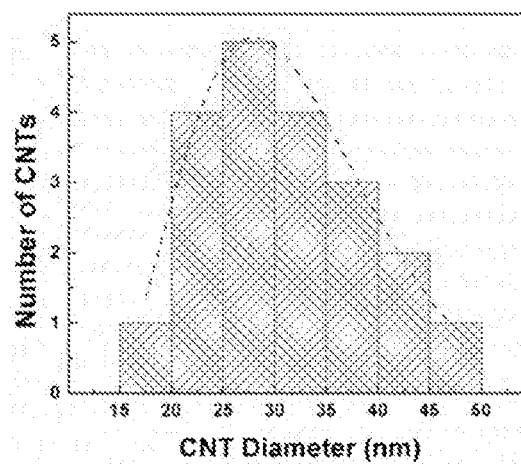
FIG. 37 is a plot of the size distribution of the multi-walled carbon nanotube grown on untreated galvanized steel cathode with inert $Al_2O_3$ coated Ni anode at 100 mA/cm$^2$ assessed through ImageJ using multiple images acquired through TEM.
Figure 38:
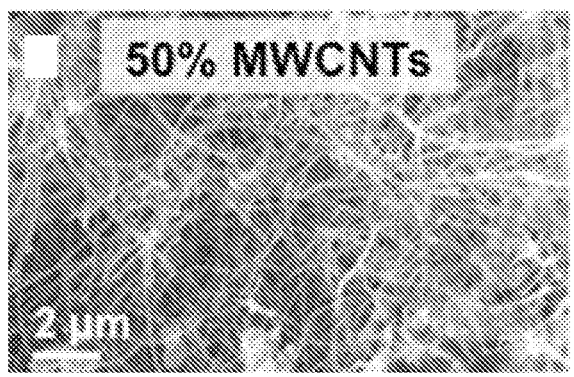
FIG. 38 is an SEM image of the carbon materials grown on the galvanized steel cathode pretreated with $Al_2O_3$ coating and e-beam deposition of Fe catalysts at 25 mA/cm$^2$.
Figure 39:
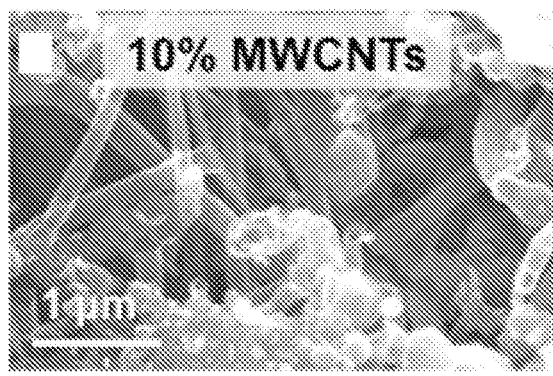
FIG. 39 is an SEM image of the carbon materials grown on the galvanized steel cathode pretreated with $Al_2O_3$ coating and e-beam deposition of Fe catalysts at 100 mA/cm$^2$.

These results indicate that crystalline multi-walled carbon nanotubes are best achieved through growth on the galvanized steel cathodes at high current densities, utilizing Fe catalyst particles accessible from the interior reservoir of iron within the steel. From TEM analysis of the multi-walled carbon nanotubes grown under these conditions (FIG. 31-FIG. 35), highly crystalline, straight graphitic walls were observed. This crystalline nature is further confirmed through Raman Spectroscopy (FIG. 36), where a sharp G mode ~1580 $cm^{-1}$ is observed, indicative of in plane $sp^2$ hybridized carbons, and a D mode ~1350 $cm^{-1}$ is observed, which corresponds to out of plane defective $sp^2$ hybridized carbons. The average ratio of D to G peak intensities across a map of 50 scans is 0.89, consistent with that of graphitic multi-walled carbon nanotube spectra. ImageJ image analysis software was used to assess the size distribution of the multi-walled carbon nanotubes evident in the multiple TEM images to obtain a log-normal distribution of multi-walled carbon nanotubes with outer diameter sizes between 15 and 50 nm and an average diameter centered near ~27.5 nm (FIG. 37). While chemical vapor deposition (CVD) commonly grows single-walled and double-walled carbon nanotubes with smaller diameters than observed in this study, this is likely due to dewetting energetics of catalyst nanoparticles at a gas-solid interface. In this study, the catalyst particle dewetting occurs at a solid-liquid interface which controls particle size prior to carbon nanotube nucleation. Notably, a log-normal diameter distribution of carbon nanotube diameters grown in the process described herein is observed, which is a similar to the carbon nanotube diameter distribution shape in gas phase chemical vapor deposition growth where it is well accepted that carbon nanotube diameter is correlated to the catalyst nanoparticle size (Pint C L et al. *ACS Nano* 2010, 4, 1131-1145). This range of carbon nanotube diameters is consistent with those produced in many gas phase processes, but represents a significant decrease from existing prior work on $CO_2$-derived carbon nanotubes, where the products exist as large diameter materials with diameters 150+ nm, and generally mixed with other non-carbon nanotube products.

Until now, research efforts focused on electrochemical conversion of carbon dioxide into stable carbon-based materials have been limited by poor understanding of catalytic effects occurring at surfaces. Herein, synergy between traditional gas phase carbon nanotube growth mechanisms and electrolytic growth of carbon nanotubes was demonstrated by leveraging an electrode design strategy to understand and direct the catalytic process toward iron-catalyzed growth. The methods herein were able to capture $CO_2$ and electrochemically convert this $CO_2$ into multi-walled carbon nanotubes with an average diameter of 27.5 nm and a high degree of crystallinity and at high yields (99%) by leveraging iron based carbon nanotube catalysts for the first time. This builds on using atomic layer deposition to produce a passive alumina coating on the Ni anode surface to inhibit mass transfer and isolate Fe as a primary catalyst species at the cathode where carbon nanotubes are grown, and engineer the surface properties of the Fe-containing cathode to optimize the accessibility of internally-contained catalyst material. Whereas previous works have studied the interplay between cathode surface properties and in-situ deposited catalytic particles (Ren J W et al. *Nano Lett.* 2015, 15, 6142-6148), this is the first study of the catalytic properties of the cathode materials, which can either be activated or deactivated, based on the engineered surface properties of the anode. SEM, TEM, and Raman spectroscopic imaging reveals the ability to produce highly crystalline carbon nanotube materials with high yield (99%) relative to other carbon products, and touting a carbon nanotube diameter distribution that intersects products formed in state-of-the-art traditional gas phase carbon nanotube processes. As decades of gas-phase carbon nanotube research has led to the understanding that catalyst size and support layer dictate carbon nanotube growth, future works to modulate catalyst size to achieve smaller diameter carbon nanotubes and study the influence of catalyst support are of interest. More significantly, this work provides the first intersection between concepts present among the vast community of researchers studying gas phase carbon nanotube growth and the concepts and mechanisms behind the electrolytic growth of carbon nanotubes from ambient carbon dioxide.

Example 2

Herein, the ability to source Fe catalysts for the growth of carbon nanotubes through E-Beam deposition of Fe to the surface of steel cathodes is investigated.

Three different anodes were used in electrolysis experiments. Anodes included untreated Ni wire (Fisher Scientific, 99%, 1 mm diameter), thermally oxidized Ni wire (1 hr at 450° C. in air), and Ni wire coated with 500 cycles (~50 nm) of $Al_2O_3$ by atomic layer deposition (ALD), as described above in Example 1. The cathodes used in these experiments were three different steels: 16 gauge galvanized steel wire (Home Depot), stainless steel shim (Trinity Brand Industries), and 1010 steel shim (McMaster-Carr). However, to eliminate effects of Fe migration through the cathode, which is potentially a function of current density, a thin (~10 nm) layer of $Al_2O_3$ was deposited via ALD onto the cathodes followed by the deposition 0.6 nm Fe via E-Beam deposition. Therefore, the Fe catalyst has been pre-deposited and should not come from the Fe-rich steel.

Electrolysis experiments were carried out as described above in Example 1. Carbon nanotubes were grown at current densities 100 mA/cm$^2$, 50 mA/cm$^2$, and 25 mA/cm$^2$ using the galvanized steel cathode with the Al$_2$O$_3$ and Fe deposited thereon. From SEM analysis, it was determined that at 100 mA/cm$^2$, the carbon product grown consists of a mixture of some carbon nanotubes and mostly carbon fibers, with the carbon nanotubes being of mainly larger diameters around 200 nm. However, at 50 mA/cm$^2$, the carbon product consists of smaller diameter carbon nanotubes (less than 100 nm) and some amorphous carbon. At the lowest current density of 25 mA/cm$^2$, the carbon produce produced was almost entirely carbon nanotubes with diameters less than 200 nm. The observation that carbon fibers were produced at high current densities and not at low current densities can indicate that a higher carbon flux preferentially forms carbon fibers over carbon nanotubes. However, the lower carbon flux can preferentially grow smaller diameter carbon nanotubes, demonstrating that the current density can have a major effect on the nature of the carbon product formed.

These results indicate that 25 mA/cm$^2$ is indeed enough current to drive the growth of carbon nanotubes, as the previous set of experiments using galvanized steel cathodes with Fe deposited via e-beam evaporation grew carbon nanotubes at the lowest current density. However, the effect of the different steel substrates and current density in the case of predeposited Fe catalysts remains unknown. To investigate this, all three types of steels were tested with ~10 nm Al$_2$O$_3$ deposited via ALD, and 0.6 nm Fe deposited via e-beam evaporation. Representative SEM images from the carbon products produced and relative carbon nanotube yield in these experiments are shown in FIG. 38-FIG. 43. In all cases, if carbon nanotube growth occurs, these SEM images are shown with relative yields overlaid. In some cases, other carbon products were also grown. From FIG. 38, a 50% yield of multi-walled carbon nanotubes are grown on galvanized steel at lower current densities, but at higher current densities (FIG. 39), the product consists of carbon fibers and only 10% carbon nanotubes. This can be attributed to the difference in carbon flux, where at lower rates of carbon deposition at the cathode, carbon is able to diffuse into the deposited Fe catalysts at a stable rate and grow multi-walled carbon nanotubes, but at higher rates, the carbon flux is uncontrollable and forms fibers instead of multi-walled carbon nanotubes.

Figure 40:
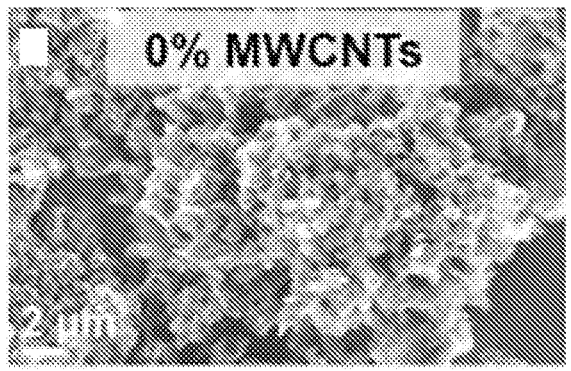
FIG. 40 is an SEM image of the carbon materials grown on the stainless steel cathode pretreated with $Al_2O_3$ coating and e-beam deposition of Fe catalysts at 25 mA/cm$^2$.
Figure 41:
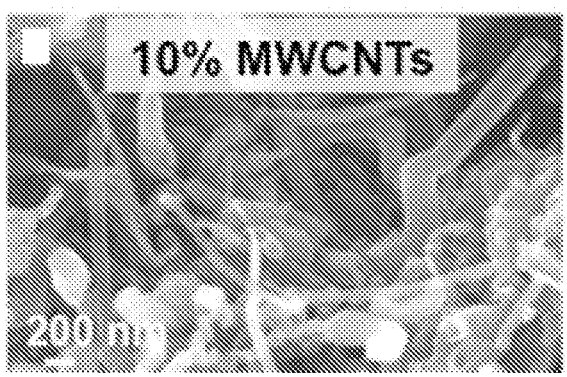
FIG. 41 is an SEM image of the carbon materials grown on the stainless steel cathode pretreated with $Al_2O_3$ coating and e-beam deposition of Fe catalysts at 100 mA/cm$^2$.
Figure 42:
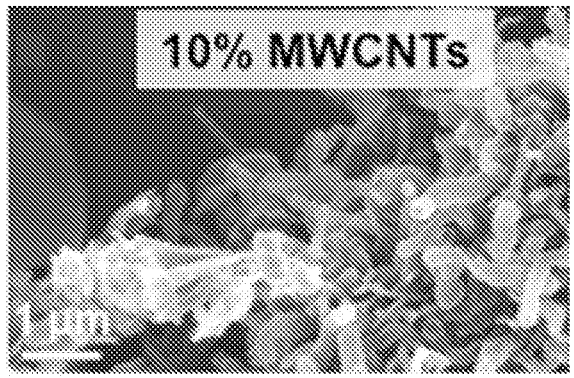
FIG. 42 is an SEM image of the carbon materials grown on the 1010 steel cathode pretreated with $Al_2O_3$ coating and e-beam deposition of Fe catalysts at 25 mA/cm$^2$.

A similar trend was expected on the other types of steels, as they all have Fe particles deposited on top of the Al$_2$O$_3$ coating. However, shown in FIG. 40 and FIG. 41 are the SEM images from the carbon produced on stainless steel cathodes. FIG. 40 shows no carbon nanotubes were grown at low current densities, with 100% of the product consisting of petaled graphite, while amorphous carbon and 10% multi-walled carbon nanotubes are formed at higher current densities (FIG. 41).

Figure 43:
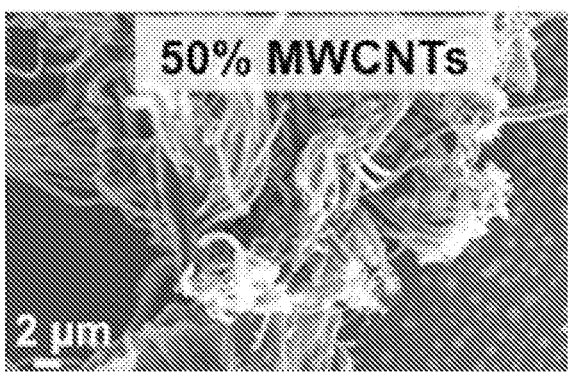
FIG. 43 is an SEM image of the carbon materials grown on the 1010 steel cathode pretreated with $Al_2O_3$ coating and e-beam deposition of Fe catalysts at 100 mA/cm$^2$.

For the 1010 steel, low current densities (FIG. 42) produced 90% petaled graphite and 10% carbon nanotubes, and higher current densities grow carbon fibers and 50% carbon nanotubes (FIG. 43). The results from the 1010 steel show a balance between the galvanized steel and the stainless steel, where lower current density produces a similar product as stainless steel, but higher current density produces a similar product as galvanized steel. At low current densities, the Fe catalyst particles are only active towards carbon nanotube formation on the galvanized steel, which can indicate that a molten support under the Al$_2$O$_3$ favors carbon nanotubes formation over petaled graphite, which is observed in the case of a solid layer under the Al$_2$O$_3$ layer (1010 steel and stainless steel). However, in the case of high current densities, the observation of carbon fibers grown from galvanized steel as well as 1010 steel points to active Fe particles, but with uncontrollable carbon flux forming fibers preferentially over carbon nanotubes.

Example 3

Two of the main global challenges faced by modern society include increasing amounts of atmospheric carbon pollution and the growing footprint of low-value nondegradable materials which are not recycled and are dumped into landfills. The first case, which is implicated as a main contributor to global climate change, can be addressed by the conversion of atmospheric CO$_2$ into stable products to form a carbon-neutral economy. The United States alone emits over 5 million kilotons of CO$_2$ each year, which could potentially be a chemical feedstock for the production of functional materials, if appropriate conversion processes can be realized. In the second case, scrap metals represent >130 million tons of waste each year and among the top contributors to this number are both steel and brass. Despite modern recycling efforts, a significant portion of these are not recycled (~17.5 million tons of steel and ~1.1 million tons of brass) and end up in landfills as nondegradable waste.

To overcome atmospheric carbon pollution, CO$_2$ conversion processes close the carbon loop to recycle and repurpose this greenhouse gas into useful chemicals and materials. The electrochemical conversion of CO$_2$ into alcohols and hydrocarbon fuels has been a highly active area for research under the promise of a viable secondary market for otherwise pollutant greenhouse gases. However, high operating costs, the need for expensive catalyst materials that cannot be developed from abundant sources, and low conversion efficiencies stand in the way of practical commercial viability for these techniques. On the other hand, the deposition of carbon from CO$_2$ using molten salt electrolysis to produce stable carbon products is an alternative to the production of fuels. This approach dates back to the 1960s where carbon was first deposited onto a gold electrode using molten salt electrolysis (Ingram et al. *Electrochim. Acta.* 1966, 11, 1629-1639). Compared to low-efficiency conversion to fuels, which is both carbon positive and generates a product whose value is correlated with further CO$_2$ generation, this approach gives promise to stable carbon-based products which can be processed into components used for high value consumer technologies. However, only recently has this approach been applied to the synthesis of nanostructured carbons, and limitations reflect lack of understanding of the chemistry and electrochemistry of the combined electrolyte and electrodes. While the electrolyte composition and/or temperature can affect the resulting carbon structures (Ijije and Chen. *Adv. Manuf.* 2016, 4, 23-32; Le Van et al. *Electrochim. Acta.* 2009, 54, 4566-4573; Wu. *RSC Adv.* 2017, 7, 8467-8473; Hu. *J. Mater. Chem. A.* 2016, 3, 21211-21218; Yin. *Energ. Environ. Sci.* 2013, 6, 1538-1545), the strongest influence of carbon-structure control appears to be the cathode structure and composition (Ren et al. *Nano Lett.* 2015, 15, 6142-6148; Licht et al. *ACS Cent. Sci.* 2016, 2, 162-168; Ge. *Farad. Discuss.* 2016, 190, 259-268; Ge. *J. Electrochem. Soc.* 2017, 164, D248-D252), a concept consistent with gas-phase chemical synthesis routes (Douglas et al. *Carbon.* 2017, 116, 572-578). Early efforts in the growth of carbon based nanostructures from molten carbonates observed growth activity linked to in situ deposition (Licht et al. *ACS Cent. Sci.* 2016, 2, 162-168; Ren et al. *J. Phys. Chem. C.* 2015, 119, 23342-23349) and/or corrosion of the metal anode. Recently, efforts have demonstrated routes to passivate the corrosive anode and selectively exploit Fe catalytic metal in the cathode for the first time. This leverages understanding from the traditional gas-phase carbon nanotube (CNT) growth community, which has demonstrated Fe catalysts to be the most efficient for high quality carbon nanotube synthesis.

In this regard, low-cost metal alloys are an ideal electrode to study the electrochemical conversion of $CO_2$ due to stability in molten carbonates and excellent conductivity. These materials offer a low carbon footprint compared to highly precise catalyst layers prepared using energy-intensive methods and, in the case where purity is not critical, can be sourced at virtually no additional cost. Conductive metal substrates, such as stainless steels, have also actively been utilized in gas phase carbon nanotube growth techniques due to the presence of a majority of Fe catalyst that can be tapped for carbon nanotube synthesis (Park et al. *Carbon.* 2003, 41, 1025-1029; Soneda and Makino. *Carbon.* 2000, 38, 478-480; Lin et al. *Diamond Relat. Mater.* 2004, 13, 1026-1031; Vander Wal and Hall. *Carbon.* 2003, 41, 659-672; Karwa et al. *Carbon.* 2006, 44, 1235-1242; Talapatra et al. *Nat. Nanotechnol.* 2006, 1, 112-116). However, a lack of understanding of the interplay between the cathode and anode and their role in the catalytic products has hampered an understanding of what electrode materials can or should be used for the catalytic conversion of $CO_2$ into functional carbon nanostructures.

Due to their impressive mechanical, electronic, and thermal properties, carbon nanotubes (CNTs) have been at the forefront of research and technological development for nearly two decades. The extraordinary physical properties of carbon nanotubes can be attributed to their atomic structure and size, motivating work focused on understanding the mechanisms of carbon nanotube growth that govern their resulting structure. Generally, carbon nanotube growth relies on the dissociation of a carbon-containing precursor gas passed over the surface of a catalytic nanoparticle, which allows for the diffusion of carbon intermediates into the particle, and templates precipitation of graphitic carbon (Prasek et al. *J. Mater. Chem.* 2011, 21, 15872-15884). However, in contrast to this mature field of gas-phase carbon nanotube growth, the liquid-phase growth of carbon nanotubes from electrochemical reduction of $CO_2$ remains a new field. This technique relies on the decomposition of dissolved $CO_2$ between two biased electrodes, where elemental carbon is captured at the cathode and the resulting structures of the deposited carbons are largely dependent on process parameters including electrolyte, current density, and electrode materials. Efforts to achieve high quality and precisely tuned structures, such as diameter controlled carbon nanotubes, requires stronger process control beyond approaches that have thus far been reported.

This study presents findings generalizable to a wide range of low-cost multicomponent metal alloys that demonstrate that low-cost multicomponent scrap metals can be used as catalytically active cathodes to electrochemically synthesize multiwalled carbon nanotube (MWCNT) materials from ambient carbon dioxide. Electron microscopy maps indicate that in the case of both (1) Fe-rich metals and (2) Fe-free metals, where Fe exists as an impurity at or below 1 wt %, that molten salt electrolysis leads to the segregation of Fe or Fe—Ni nanoparticles to the surface of the alloy that facilitate multiwalled carbon nanotube growth. The results further demonstrate the direct growth of multiwalled carbon nanotubes from ambient carbon dioxide on the surface of scrap metal pieces with arbitrary shape and size, including pipes and shavings. Electrochemical growth requires conductive electrode surfaces and chemical stability in the carbonate electrolyte. This work indicates that under appropriate process conditions and when combined with a noncorrosive anode, metal alloys stable in molten carbonates can be viable candidates as cathodes in the conversion of ambient $CO_2$ into carbon nanotubes either from primary or impurity components.

Electrode Preparation. An $Al_2O_3$ coated Ni wire (Fisher Scientific, 99%, 1 mm diameter) anode was used in all electrolysis experiments. Ni wire was coated with 500 cycles (~50 nm) of $Al_2O_3$ by a Gemstar Arradiance atomic layer deposition (ALD) tool. The thickness of this coating was determined through ellipsometry analysis of $Al_2O_3$ coatings on silicon wafers with a J. A. Woollam spectrometer. To accomplish this, sequential 28 ms pulses of $C_6H_{18}Al_2$ (TMA) and $H_2O$ with a residence time of 1 s were utilized. This electrode can be used for multiple experiments. The cathodes used in these experiments were scrap metals including steel and brass that were retrieved from a scrap yard (PSC Metals). The structures utilized in this study included shavings taken from yellow brass and 316 stainless steel, screws, and pipes.

Electrolysis. Experiments were carried out in an alumina crucible (AdValue Tech, 50 mL) containing 40 g lithium carbonate (Fisher Scientific, 99%) electrolyte (M.P. 723° C.), which was held at 750° C. in a cylindrical ceramic heater (Thermcraft) using a benchtop temperature controller (OEM Heaters). Electrodes were immersed into the electrolyte and a constant current was applied across the electrodes. The current density is normalized to the approximate synthesis.

All electrolysis experiments in this study were carried out for 1 h. No degradation of the lithium carbonate electrolyte was observed and the lithium carbonate electrolyte was reused the same batch for five consecutive experiments before discarding. During the electrolysis, carbon accumulates at the cathode, which is removed from the electrolyte and cooled after electrolysis. The carbon product was removed from the electrodes by bath sonication in water (1 h) and purified from carbonates via washing in 2 M HCl. This removes the carbonates and dissolves the Fe-based catalyst materials situated at the ends of the grown carbon nanotubes to form aqueous metal chloride solutions. The carbon product was then solvent exchanged to water through centrifugation and dried at 60° C. overnight.

Material Characterization. The carbon nanostructures were analyzed with a Zeiss Merlin scanning electron microscope (SEM) and an FEI Osiris transmission electron microscope (TEM) at a beam voltage of 200 kV with corresponding elemental mapping by energy dispersive X-ray (EDS) technique to determine catalyst composition. Cathode surfaces were characterized through SEM EDS. The crystallinity of the carbon nanostructures was determined by Raman spectroscopy on a Renishaw in Via microscope with a 532 $nm^{-1}$ laser excitation, 10 s exposure time, and 10% laser power. Thermogravimetric analysis was carried out using a TGA Instrument Specialists TGA 1000 to characterize the relative weight percent of carbon nanotubes to residual catalysts.

Figure 44:
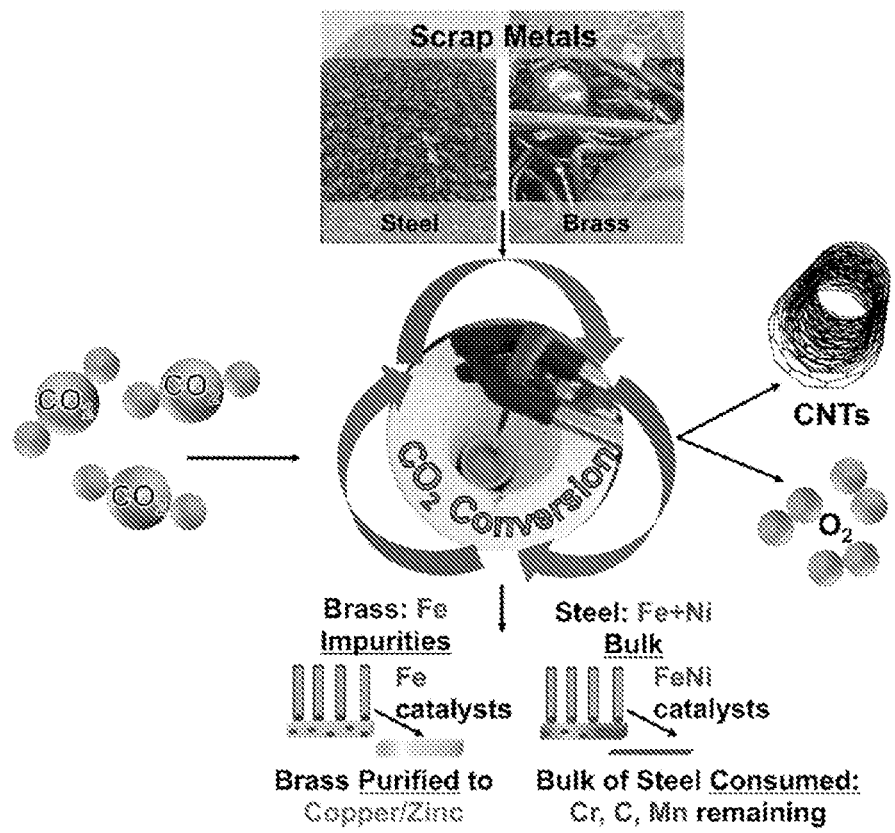
FIG. 44 is a schematic representation of the general process of $CO_2$ conversion using scrap metals as electrodes, $CO_2$ as a chemical feedstock for the production of carbon nanotubes, and recycling of scrap brass and steel by purification or consumption.

The general process of electrochemical reduction of $CO_2$ to carbon nanotubes via molten salt electrolysis relies on the splitting of the molten $Li_2CO_3$ (M.P. 723° C.) electrolyte into C, which collects at the cathode, $O_2$ collected at the anode, and resulting $Li_2O$ in the electrolyte. $Li_2O$ then reacts with ambient $CO_2$ to regenerate the $Li_2CO_3$ electrolyte. This occurs under the application of a constant current of 100 mA/cm$^2$ between a scrap metal cathode and a reusable inert $Al_2O_3$ coated Ni wire anode, which was previously demonstrated as an ideal anode allowing the activation of catalysts which are contained on-site at the cathode material (Douglas et al. Carbon. 2017, 116, 572-578). Here, this work exploits this idea to explore how a class of conductive and low-valued materials often discarded from scrap yards into landfills, and hence exhibiting negligible carbon footprint, can be repurposed as consumable cathodes for the catalytic synthesis of carbon nanotubes from atmospheric carbon dioxide. In this regard, two representative scrap metal materials were chosen, neither of which have been studied for carbon nanotube growth from molten salt electrolysis but that give a general representation of (1) a metal cathode containing a significant amount of Fe metal on the interior (stainless steel) or (2) a metal cathode that contains catalytic Fe metal only as impurities of processing (brass). In each case, the output of electrolysis is either a mostly consumed cathode (stainless steel) or a cathode that is purified of impurities (brass) to yield elemental copper and zinc that are inactive in this process. This idea is schematically represented in FIG. 44. In turn, this work is therefore relevant to a broad class of multi-element metals that either contain Fe as a primary element or do not contain Fe except as impurities in the metal alloy matrix.

Figure 45:
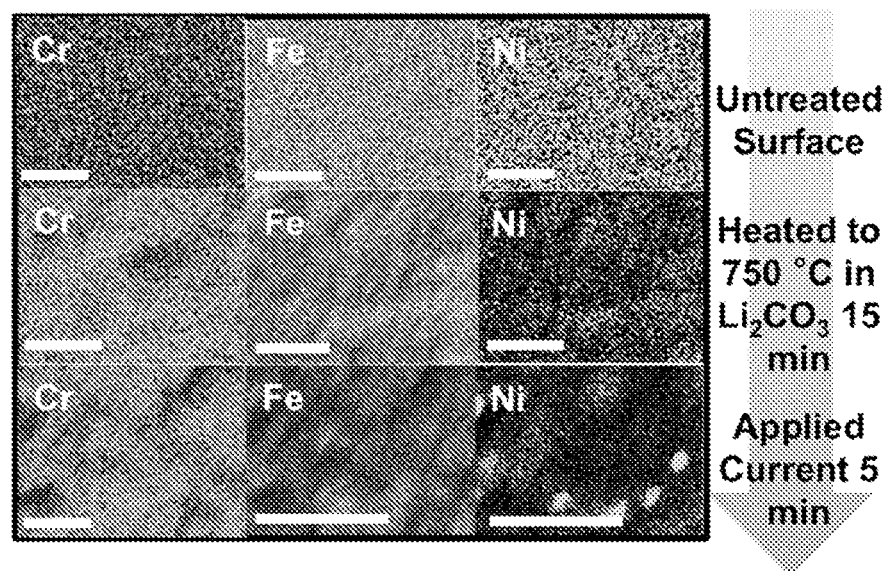
FIG. 45 is an SEM EDX map of electrode surfaces for stainless steel throughout the electrolysis process. Shown from top to bottom are the untreated surfaces, the electrodes after heat treatment, and then after applied current. All scalebars are 2.5 µm.
Figure 46:
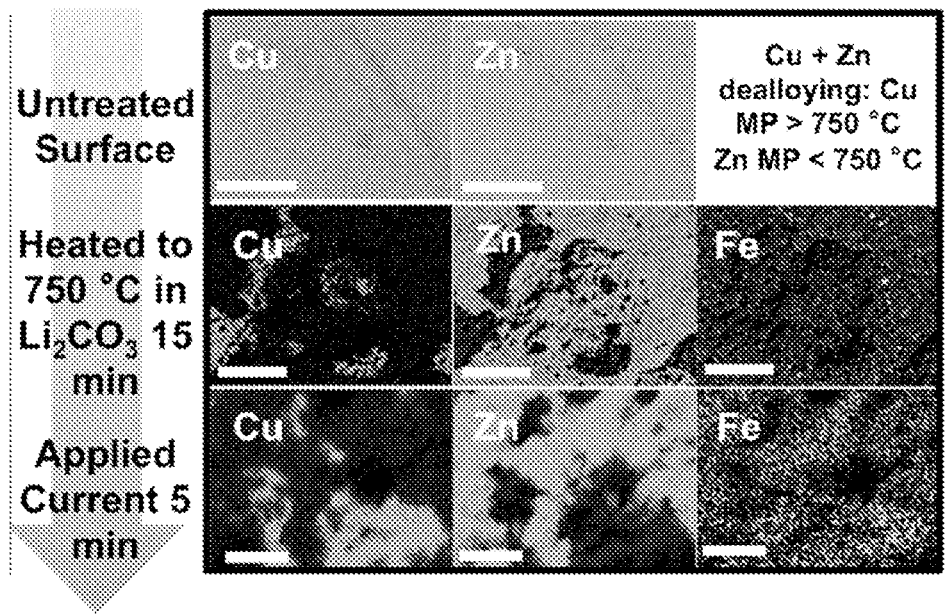
FIG. 46 is an SEM EDX map of electrode surfaces for brass throughout the electrolysis process. Shown from top to bottom are the untreated surfaces, the electrodes after heat treatment, and then after applied current. All scalebars are 2.5 µm.
Figure 47:
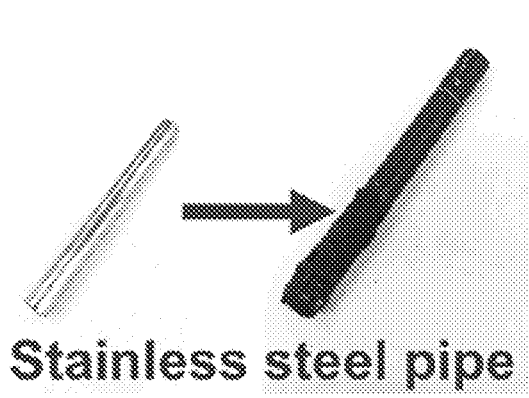
FIG. 47 is an optical image of steel pipes before and after electrolysis carbon coating.
Figure 48:
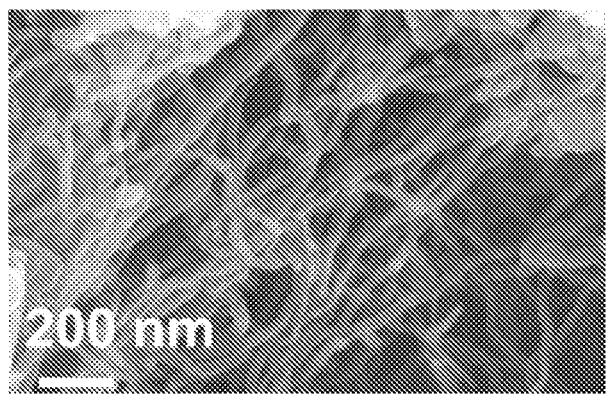
FIG. 48 is an SEM image of the carbon products formed on the steel pipe from FIG. 47.
Figure 49:
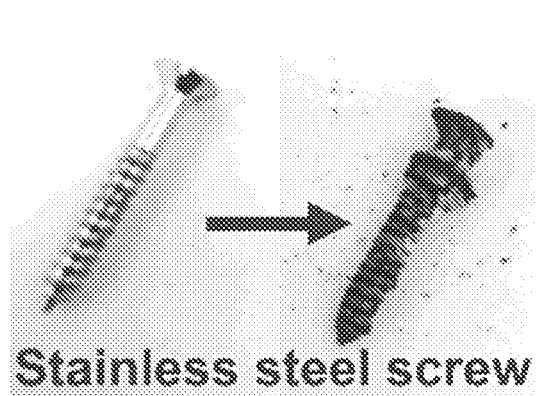
FIG. 49 is an optical image of a steel screw before and after electrolysis carbon coating.
Figure 50:
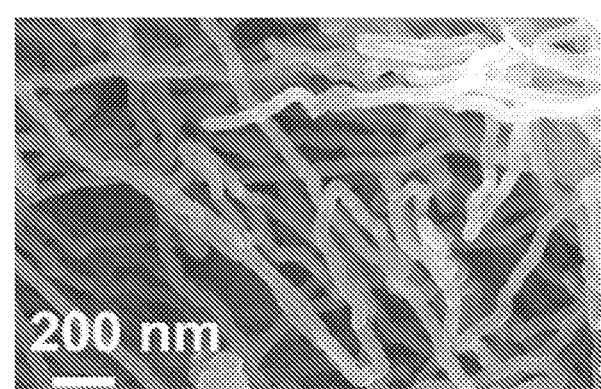
FIG. 50 is a SEM image of the carbon products formed on the steel screw from FIG. 49.
Figure 51:
FIG. 51 is an optical image of steel shavings before and after electrolysis carbon coating.
Figure 52:
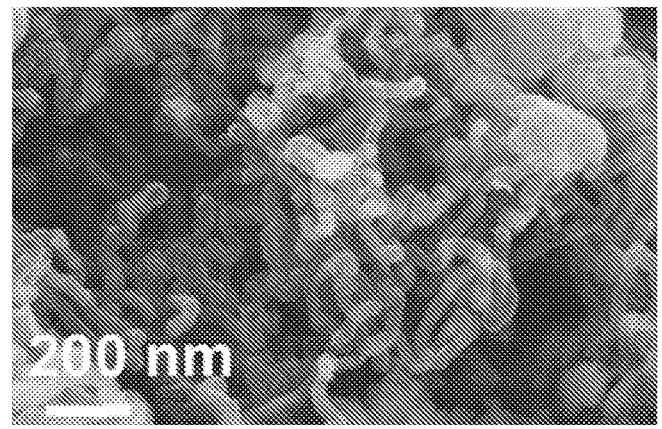
FIG. 52 is a SEM image of the carbon products formed on the steel shavings from FIG. 51.
Figure 53:
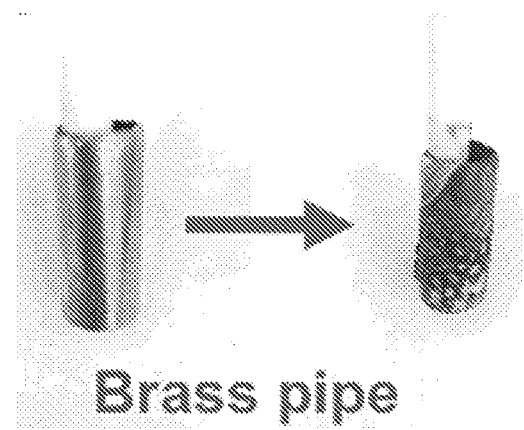
FIG. 53 is an optical image of a brass pipe before and after electrolysis carbon coating.
Figure 54:
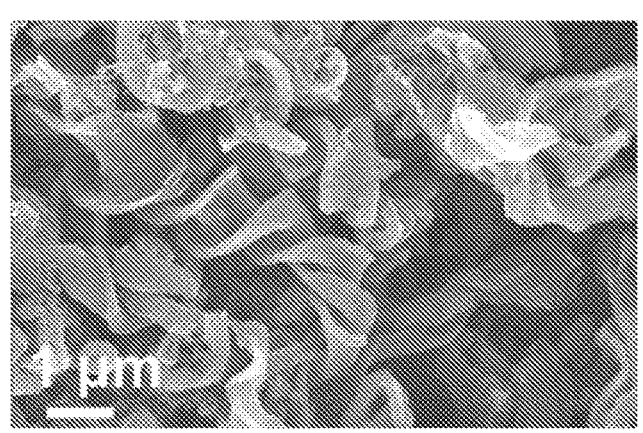
FIG. 54 is a SEM image of the carbon products formed on the brass pipe from FIG. 53.
Figure 55:
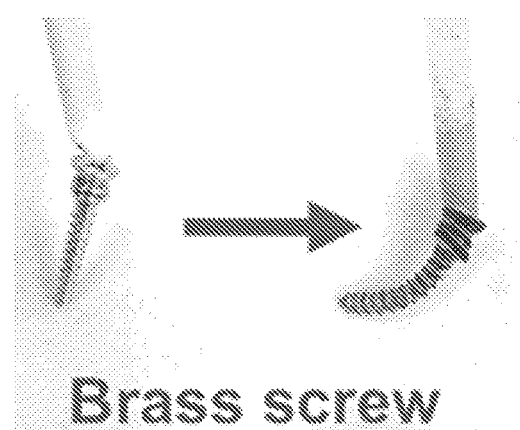
FIG. 55 is an optical image of a brass screw before and after electrolysis carbon coating.
Figure 56:
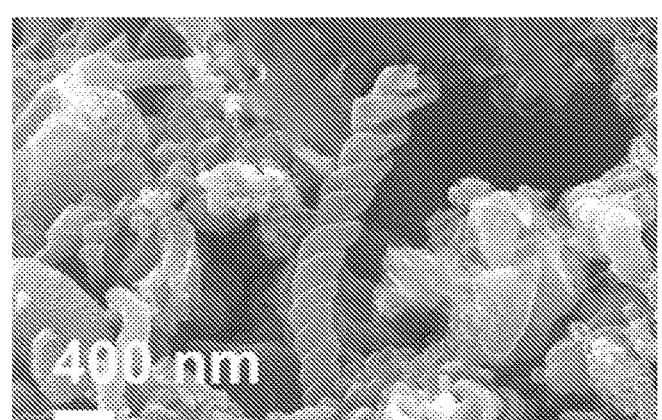
FIG. 56 is a SEM image of the carbon products formed on the brass screw from FIG. 55.
Figure 57:
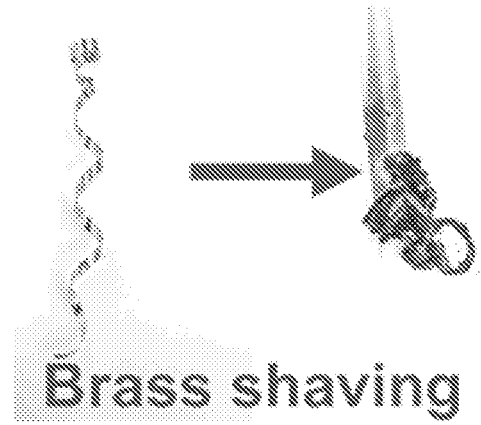
FIG. 57 is an optical image of brass shavings before and after electrolysis carbon coating.
Figure 58:
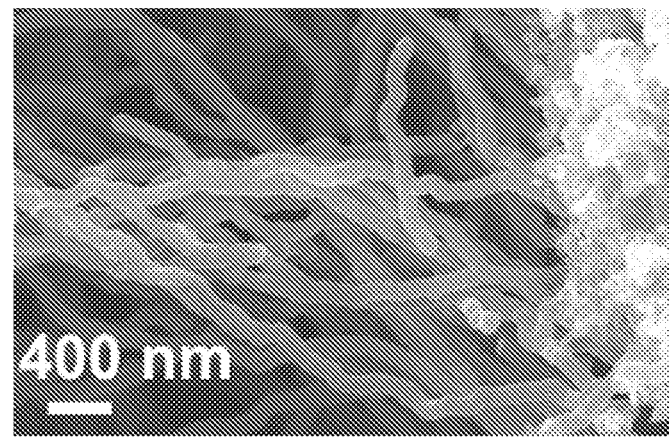
FIG. 58 is a SEM image of the carbon products formed on the brass shavings from FIG. 57.

Decades of research on gas-phase carbon nanotube growth has elucidated the critical step of catalyst formation that is necessary to precede carbon nanotube growth (Puretzky et al. Appl. Phys. A. 2005, 81, 223-240; Nessim. Nanoscale. 2010, 2, 1306-1323). Herein, experiments were performed to study the evolution of the scrap brass and scrap stainless steel surfaces in the environment where carbon nanotube growth takes place using scanning electron microscopy (SEM) elemental mapping. Three cases were compared: (1) untreated metals, (2) after heat treatment at 750° C. in $Li_2CO_3$ for 15 min, and (3) after 5 min of initial applied current (FIG. 45-FIG. 46). For stainless steel (FIG. 45), observations of a surface mostly comprised of well-distributed Cr, Fe, and Ni initially, with little change for the electrodes after being heat treated in molten carbonate. However, the formation of prominent Fe—Ni islands, which are both catalytically active materials, on the surface was observed after current was applied (FIG. 45). Similarly for brass, the untreated surface is comprised of only Cu and Zn, with no evidence of Fe (FIG. 46). After heat treatment at 750° C., the Cu and Zn begin to dealloy since the melting point of Zn is below 750° C. During dealloying, Fe impurities from within the bulk of the brass become present at the surface of the scrap brass, as shown in FIG. 46. These Fe islands become more prominent after 5 min of initial applied current (FIG. 46), and the presence of Fe particles at the surface of scrap brass can be the basis for catalytic activity, even in a case where Fe is only an impurity component.

Further, unlike the planar two-dimensional electrodes that have been used for previous efforts of carbon nanostructure growth through $CO_2$ electrolysis, the use of scrap metals requires electrodes that can be purposed from irregular materials. In this regard, recovered scraps and objects based from both stainless steel (316) and brass (yellow brass) that represent a diverse set of irregular shapes and sizes, including pipes, screws, and shavings (FIG. 47-FIG. 58) were used. FIG. 47-FIG. 58 show the untreated scrap, the multi-walled carbon nanotube-coated scrap after undergoing $CO_2$ capture and conversion process, and the resulting carbon products after removing excess carbonate in a dilute HCl wash. From all three stainless steel electrodes, the formation of multiwalled carbon nanotubes (FIG. 47-FIG. 52), attributed to the catalytic activity of the Fe and Ni particles from within the bulk of the metals are observed. In the case of scrap brass, the formation of carbon nanotubes with the brass shaving (FIG. 57-FIG. 58) are observed, but other objects including the screw and pipes led to the catalytic formation of other nanostructured carbons, such as nanorotini and carbon nanofibers (FIG. 53-FIG. 56). This can be attributed to the possibility that impurities in a shaving are likely to be more concentrated near the surface of the shaving due to the material processing required to form the shaving. However, SEM EDS characterization of these materials in an untreated state was inconclusive due to the lack of a prominent Fe signature prior to the heat treatment of these materials. In any case, this indicates that a material that natively does not contain Fe can still be catalytically active in the growth of carbon nanotubes from Fe that segregates to the surface during thermal and electrochemical processing.

Figure 59:
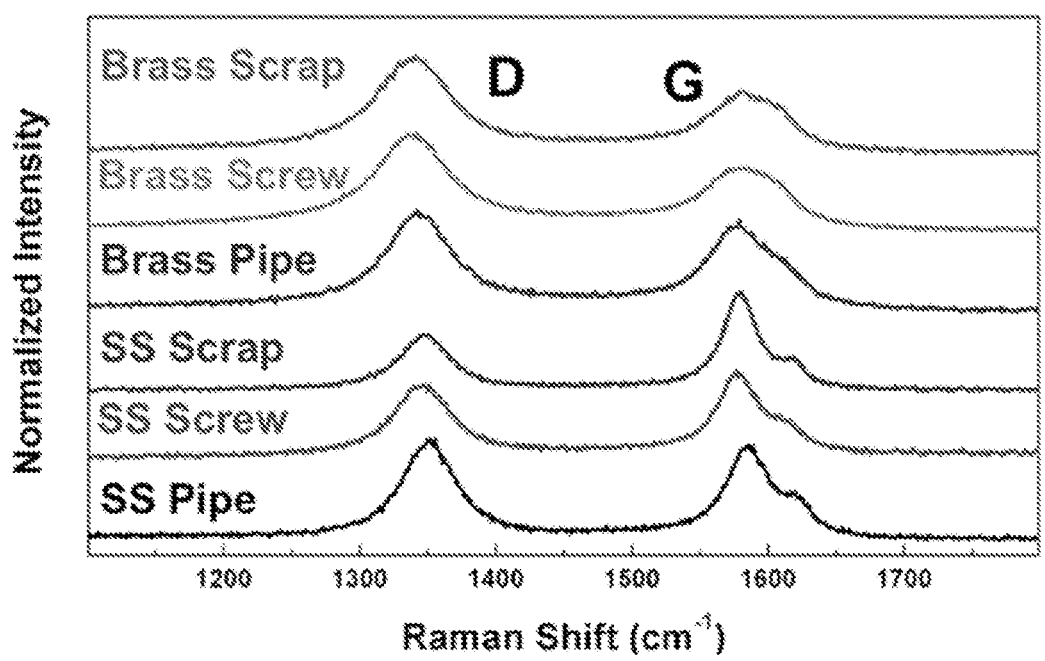
FIG. 59 is the Raman spectra of materials grown from steel and brass shavings, screws, and pipes.
Figure 60:
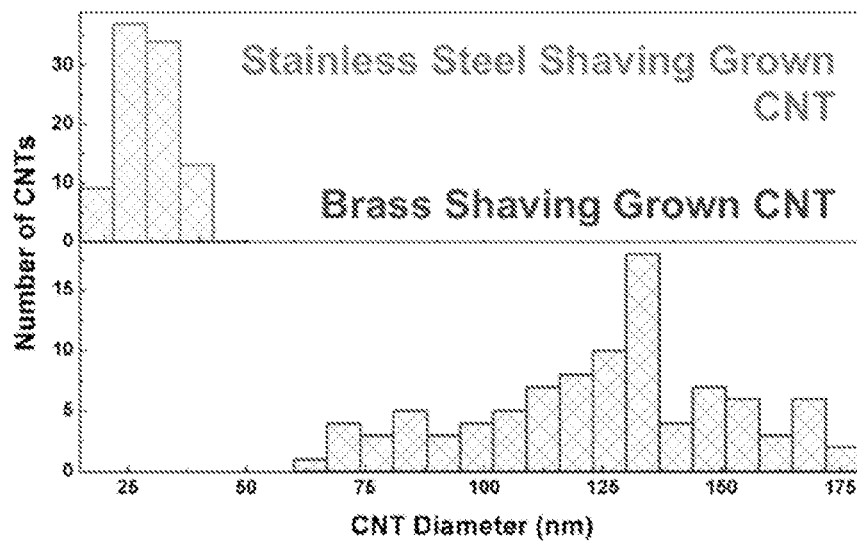
FIG. 60 is the size distribution plots of carbon nanotubes produced from stainless steel and brass shavings.

Raman spectroscopy was used to characterize the carbon products, which all exhibit the characteristic graphitized carbon G peak ~1580 cm$^{-1}$, indicative of in-plane sp$^2$ hybridized carbons, and a D mode ~1350 cm$^{-1}$, which corresponds to out of plane defective sp$^3$ hybridized carbons (FIG. 59). A higher D/G peak intensity ratio is observed for carbon nanotubes and carbon nanomaterials grown from brass compared to stainless steels, which indicates a greater concentration of sp$^3$ carbon materials (FIG. 59). Diameter distributions of carbon nanotubes were taken from image analysis using multiple SEM images from multiple spots on the sample (FIG. 60) and indicate the brass-grown carbon nanotubes have a wider and larger diameter size distribution compared to the stainless steel-grown carbon nanotubes. Based on the outer diameter, carbon nanotubes grown from a stainless steel shaving exhibit a tight size distribution from ~18-47 nm, centered at ~29 nm. In the case of the carbon nanotubes grown on the brass shaving electrode, the study demonstrated a wider size distribution from ~65-174 nm, with a peak centered around ~125 nm. The larger carbon nanotubes from brass can be attributed to the high Fe mobility in the molten Zn that lowers the surface free energy of nanoparticles through coarsening, which in turn leads to larger diameter carbon nanotubes. Traditional gas-phase carbon nanotube growth has elucidated a correlation between carbon nanotube diameter and conditions such as (1) precursor flux, (2) rate of catalyst reduction, (3) support layer environment for the catalytic particles, and (4) temperature and pressure; each of these control mechanisms has a unique analog in electrochemical growth. Here, the use of current density controls carbon flux, the use of current density during catalyst reduction and dewetting controls the reduction kinetics, and the control of carbon nanotube synthesis temperature in the molten carbonate and each of these can be modified to leverage similar or even more precise levels of control compared to conventional gas-phase carbon nanotube synthesis processes.

Figure 61:
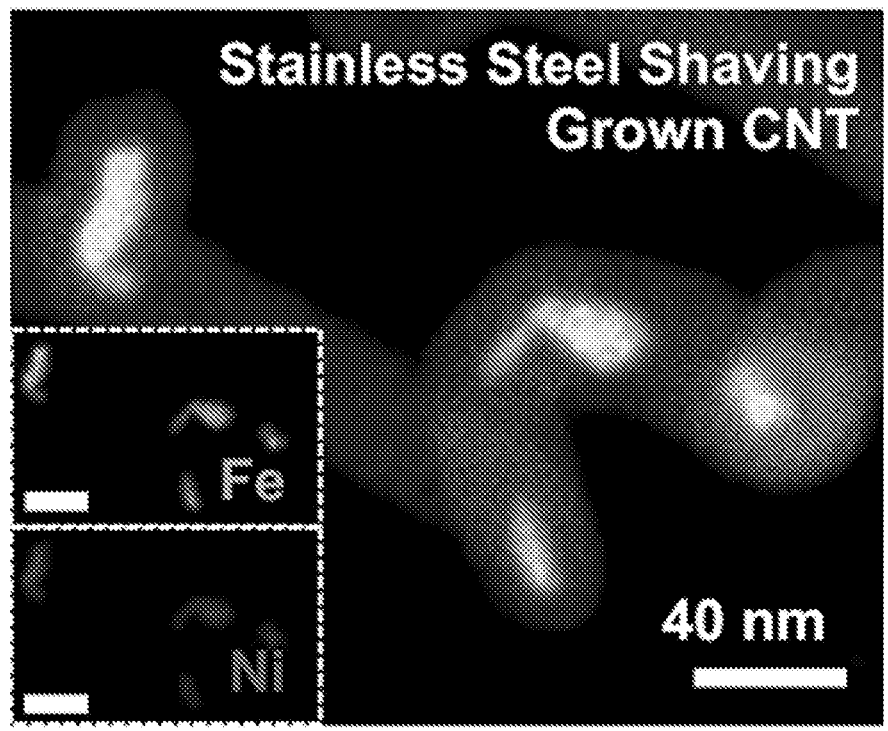
FIG. 61 is STEM EDX maps of carbon nanotubes with embedded catalysts from stainless steel shavings.
Figure 62:
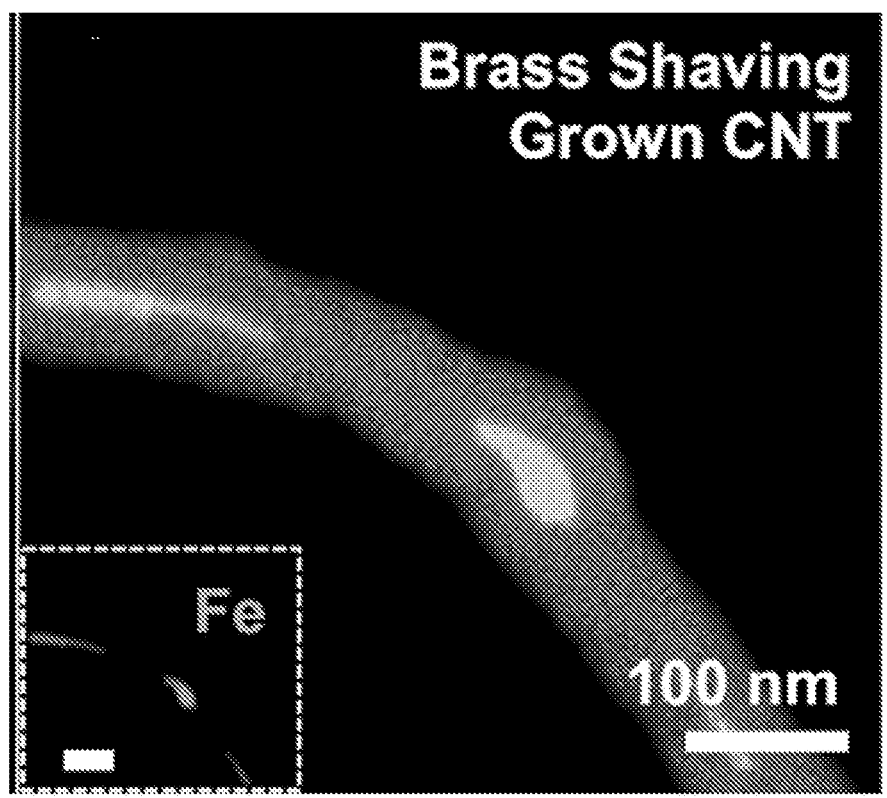
FIG. 62 shows STEM EDX maps of carbon nanotubes with embedded catalysts from brass shavings.
Figure 63:
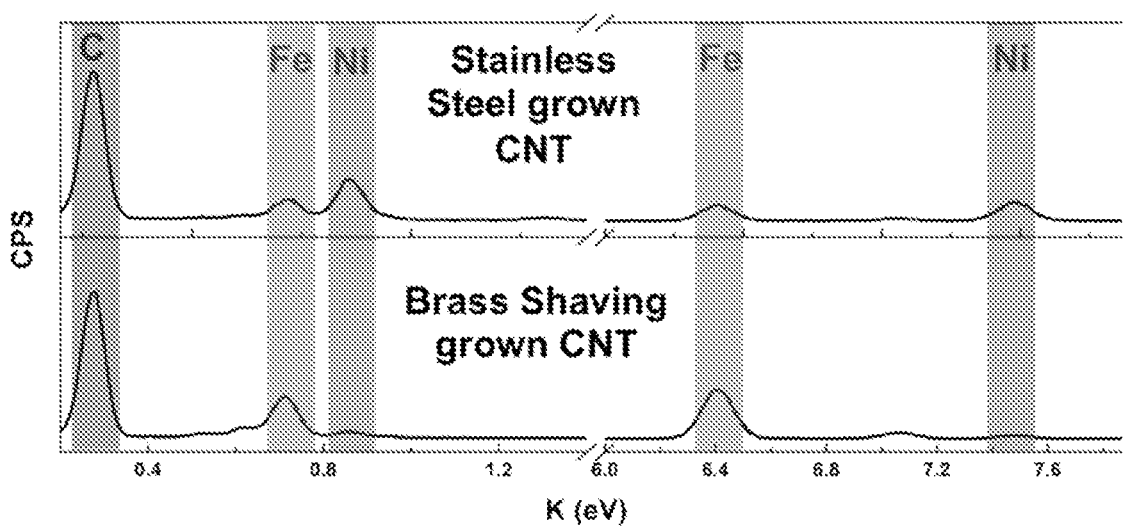
FIG. 63 shows energy spectra of the embedded catalyst inside carbon nanotubes grown from brass and stainless steel shavings.

Whereas previous imaging isolated the catalyst formation prior to carbon nanotube nucleation and growth, this study reports post-mortem STEM EDS imaging of the carbon nanotube materials to correlate the synthesis product and the chemical identity of the catalyst particles that remain embedded in the carbon nanotubes to validate prior observations. This is due to the idea that only those elements that participate catalytically (despite many elemental impurities present in the metal alloys) in carbon nanotube growth will be embedded in the carbon nanotubes following growth. The resulting compiled STEM EDS maps are shown in FIG. 61 and FIG. 62, with individual elemental maps of the catalysts shown as insets. In the case of the stainless steel shaving-grown carbon nanotubes, the presence of a Fe—Ni alloy nanoparticle catalyst that is responsible for the catalytic growth of carbon nanotubes is observed, which further confirmed with EDS spectra shown in FIG. 63 showing the presence of C, Fe, and Ni. 316 stainless steel is alloyed with 2-3 wt % Mo to enhance corrosion resistance and resist thermal degradation, and previous gas-phase carbon nanotube growth studies have demonstrated enhanced catalytic activity with the addition of Mo present in the catalyst (Pint et al. *J. Phys. Chem. C.* 2008, 112, 14041-14051). Whereas impurities such as Mo are not observed above the detection limit of EDS imaging during STEM analysis, such additional impurities would be expected to correlate to enhanced catalytic growth if present in the Fe-based catalyst. However, in the case of the brass shaving-grown carbon nanotube, only observations of the presence of Fe on the interior of the carbon nanotube, and in the EDS spectra are made (FIG. 62). In both cases, the catalysts are embedded within the carbon nanotubes and residing at the tips. This result confirms the hypothesis that catalysts can be consumed from primary elements (Fe and Ni) within scrap stainless steel and consumed from impurity species (Fe) in brass as catalysts for carbon nanotube growth from $CO_2$.

Figure 64:
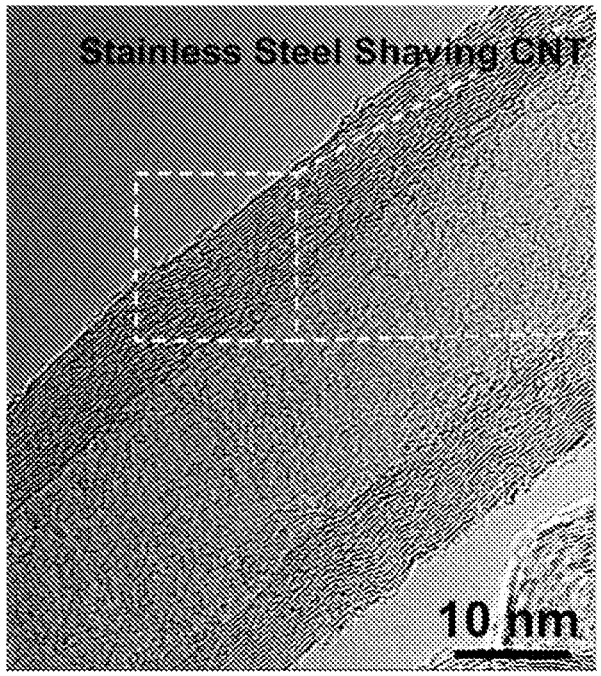
FIG. 64 is a representative TEM image of a carbon nanotube grown on stainless steel shavings.
Figure 65:
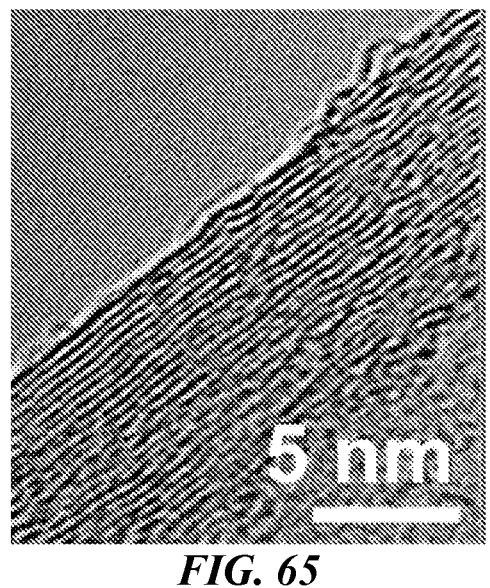
FIG. 65 is a high magnification image of FIG. 64, demonstrating wall crystallinity.
Figure 66:
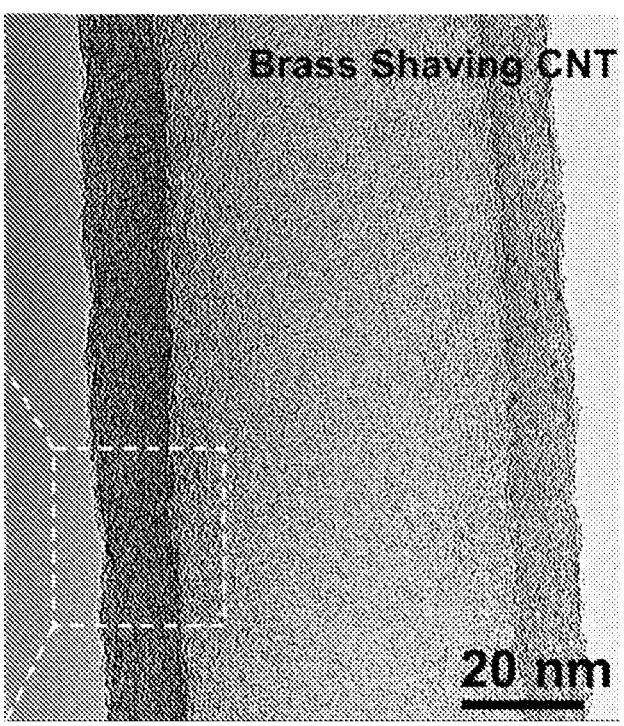
FIG. 66 is a representative TEM image of a carbon nanotube grown on brass shavings.
Figure 67:
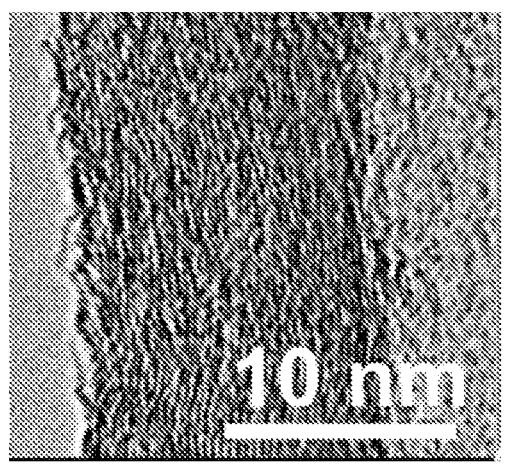
FIG. 67 is a high magnification image of FIG. 66, demonstrating wall crystallinity.

Building from Raman spectroscopy and SEM imaging that give statistical assessments of the carbon nanotubes produced, HR-TEM imaging of representative carbon nanotubes synthesized from both stainless steel and brass scraps can give insight into the representative crystallinity and wall quality of the synthesized carbon nanotube materials (FIG. 64-FIG. 66). Consistent with the results from Raman spectroscopy, there is a better degree of crystallinity for carbon nanotubes synthesized using stainless steel scraps (FIG. 64 and FIG. 65) compared to those using brass scraps (FIG. 66 and FIG. 67).

Figure 68:
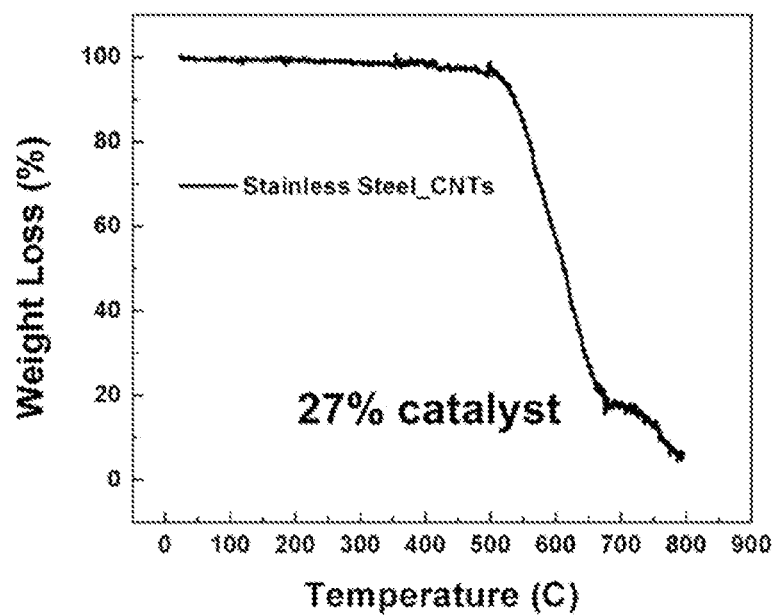
FIG. 68 shows the mass loss spectra obtained from thermogravimetric analysis for materials grown on stainless steel and brass shavings.
Figure 69:
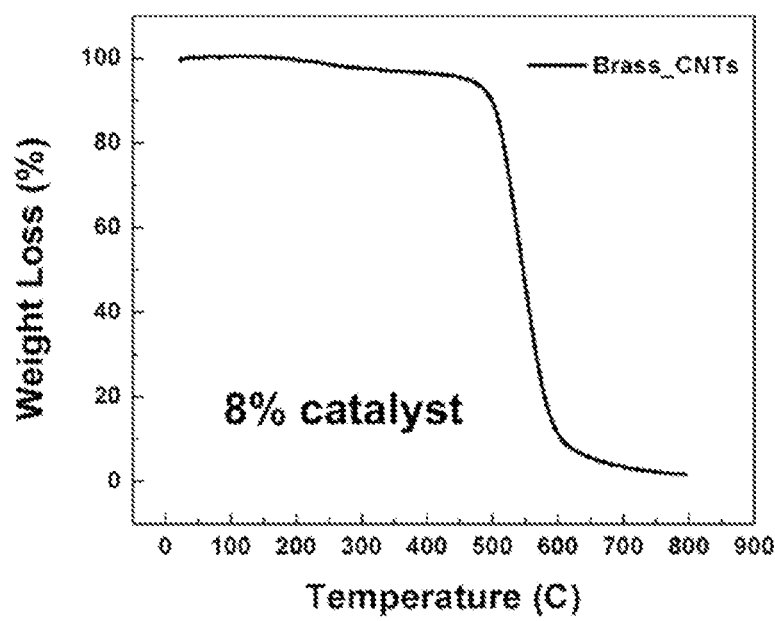
FIG. 69 shows the mass loss spectra obtained from thermogravimetric analysis for materials grown on stainless steel and brass shavings.

To further characterize and understand the scrap metal consumption from electrolysis, thermogravimetric analysis (TGA) was carried out on the scrap metal-grown carbon nanotubes (FIG. 68-FIG. 69). The calculated $CO_2$ conversion at 84 g carbon/kW h of applied electricity between the electrodes based on 100% efficiency and a standard reduction potential of 1.33 V has been previously reported. In the case of the scrap steel, there is ~27 wt % residual catalyst metal following the burning of carbon materials near 600° C. This correlates to an approximate 31 g scrap metal (Fe+Ni bulk) consumed for every 84 g carbon/kW h of electricity produced, whereas the brass-grown carbon nanotubes present a case where 8 wt % residual catalyst corresponds to approximately 7.3 g scrap metal (Fe impurities) consumed. To better understand what this means for the duration of carbon nanotube synthesis from these materials, TGA analysis was used to calculate how many consecutive electrolysis experiments are required to fully consume catalyst materials embedded with the bulk of the scrap metal alloys. In the case of the stainless steel, where Fe and Ni can make up anywhere from 68 to 88 wt % of the alloy, consecutive hour-long experiments can be run 10-13 times to fully consume the Fe and Ni elements from the bulk of the steel. However, a 1 hour long electrolysis experiment removes all 1 wt % of Fe impurities from within the brass-based electrodes. This is consistent with the notion that steel presents a case where bulk material is consumed, whereas the brass is purified from impurities in this process. Surface changes of the electrodes post-electrolysis, characterized by SEM EDX, are shown in Table 1. In the case of the steel, the relative concentrations of Fe and Ni to other elements present including O and Cr slightly diminish compared to the concentrations prior to electrolysis, consistent with the findings of Fe and Ni consumed as catalysts within the carbon nanotubes. However, the brass scrap demonstrates a large change in elemental concentrations, the untreated brass has ~2× the concentration of Cu relative to Zn, which increases drastically to over 8× in the post-electrolysis brass. This finding is also consistent with the observations of dealloying due to an operating temperature that is between the melting temperatures of the two elements. This implies it can be possible to purify the brass by consuming the Fe impurities in addition to dealloying the brass alloy to form a higher value raw material (Cu).

TABLE 1

Elemental surface concentrations for stainless steel and brass shavings before electrolysis and after a 1 hour long electrolysis experiment, characterized by SEM EDX mapping

| Surfaces | Elemental Concentrations (mass %) | | | |
| --- | --- | --- | --- | --- |
| Brass | Cu | O | Zn | Fe |
| Untreated | 43 | 27 | 26 | <1 |
| Post-Electrolysis | 77 | 14 | 9 | <1 |
| Stainless Steel | Fe | Ni | O | Cr |
| Untreated | 49 | 8 | 28 | 12 |
| Post-Electrolysis | 36 | 4 | 45 | 9 |

Compared to conventional routes for carbon nanotube synthesis which are not only energy intensive in materials preparation but result in significant atmospheric emissions due to the thermal formation of stable carbon reaction byproducts, such as methane, the approach described herein yields the production of carbon nanotubes from $CO_2$ with only $O_2$ emission byproducts. Through the use of scrap metal catalyst layers and low-emission energy sources, the route described herein has the potential to produce an overall carbon negative scheme for carbon sequestration and conversion. Whereas cheap solar cells are approaching levels of carbon neutrality, further improvement in low-energy silicon processing can be a viable approach for a carbon-negative process. Further, combining this approach with geothermal or other carbon neutral energy production techniques has the potential to not only enable true carbon negative sequestration and conversion of carbon dioxide, but also the production of a high value commodity with market values >$100/kg for multiwalled carbon nanotubes. Compared to micron-scale carbon fibers (~$22/kg), the nanoscale features of multiwalled carbon nanotubes enable their use in a range of markets not addressable by materials with micron-scale features, such as in conductive additives for thick battery electrodes and high sensitivity sensors or biosensors as two examples. For this process that sequesters and converts $CO_2$ from the air, Coulombic efficiencies approach 100% resulting in a carbon nanotube yield directly comparable to the energy input for electrolysis. Therefore, the primary costs of operating this system are (1) the energy inputs arising from biasing the electrodes and heating the electrolyte and (2) the total cost of the consumable materials. In the case of the first cost, calculations of total energy input in laboratory scale $CO_2$ capture and conversion system correlates to an energy footprint of ~410 kW h/kg carbon nanotube, which, with a residential energy cost of ~$0.12/kW h, yields a total cost of ~$50 to produce 1 kg of multiwalled carbon nanotubes. This is about half the cost of the cheapest multiwalled carbon nanotube materials currently available on the market by using a lab-scale system designed with no consideration for thermal management. In the case of the second cost, the substrate source is a raw multicomponent scrap material with negligible value compared to the cost of energy used in the process, which also provides a benefit in this approach. There is even a possibility of a value stream enabled by purification of metals containing Fe or other transition metal impurities based on this electrochemical process. Overall, whereas significant reductions can be achieved in the total thermal energy footprint of the system described herein, the approach described herein already produces a carbon nanotube product that is more valuable than the energy footprint required to make the carbon nanotubes and maintains an energy footprint lower than conventional carbon nanotube synthesis routes (Kushnir and Sanden. *Journal of Industrial Ecology.* 2008, 12, 360-375). This underlines a critical economic requirement for a practical carbon conversion process where the value of the product overcomes the cost of the energy required to produce it. The combination of this process with advances in energy generation which are natively carbon neutral, such as geothermal energy, can produce an economically driven pathway to simultaneous valuable technological products and carbon negative material manufacturing. Building upon the this, unlike other carbon nanotube growth processes that produce volatile carbon emissions from the breakdown of hydrocarbon precursors (Plata et al. *Environmental Science& Technology.* 2009, 43, 8367-8373), the byproduct of the process described herein is only oxygen and valuable carbon nanotubes. This not only implies a process representing an economically viable pathway for the capture and conversion of $CO_2$ into valuable products, but a synthesis method for carbon nanotubes that bypasses the emissions footprint of traditional synthesis methods for valuable carbon nanomaterials, a feature of utmost importance as carbon nanotubes exhibit a stronger foothold in modern technological applications.

In summary, this work demonstrates the general principle that conductive scrap metals can be used as catalytic growth cathodes for carbon nanotubes through the interaction of $CO_2$ in air with molten salts that provides the carbon source. These results demonstrate this in the context of cathodes primarily composed of catalytic Fe metal (stainless steel) as well as cathodes that do not natively contain catalytic Fe metal except through impurities (brass). SEM EDS measurements confirm the formation of catalytic metal islands on the surface of the metal during thermal and electrochemical treatment in both cases that provide the basis for nucleation of multiwalled carbon nanotubes. An average diameter of ~29 nm in the case of the steel scrap-grown carbon nanotubes and ~126 nm for the brass scrap-grown carbon nanotubes is reported. Raman spectroscopy and TEM characterization reveals a higher crystallinity of carbon nanotubes grown from stainless steel scraps compared to brass scraps, and TGA measurements verify the weight percent of residual catalyst metals within the carbon nanotubes and the ability to consume scrap metals (as either bulk or impurities) through this process. Overall, this work demonstrates how low-value scrap metals can enable stable and functional multiwalled carbon nanotubes from capture and conversion of $CO_2$ from the air in a way that produces a material more valuable than the cost requirement to convert the $CO_2$, even in an unoptimized system at laboratory scale.

Example 4

The first observations of carbon nanotubes grown by electrochemical reduction of $CO_2$ in molten carbonates relied on in-situ deposition of catalysts from corroded metal anodes onto the cathode (Ren et al. *Nano Lett.* 2015, 15, 6142-6148; Licht et al. *ACS Cent. Sci.* 2016, 2, 162-168; Wu et al. *Carbon.* 2016, 106, 208-217), which drove the formation of large diameter (>100 nm) carbon nanotubes rather than previously observed spherical carbon particles, flakes, or other carbon structures onto non-catalytic cathodes. However, this approach presents limited control over catalyst formation and carbon nanotube structures obtained from electrochemical growth, and further studies are required to understand the effect of process parameters on resulting carbon nanotube structure. This is especially critical as stronger understandings over how process parameters influence carbon structures can lead to precise tuning of this system towards the growth of valuable carbon-based nanostructures including single-walled carbon nanotubes and graphene. Prior work has demonstrated that stronger control of the catalytic nanostructures, similar to those harnessed in traditional gas-phase carbon nanotube synthesis, can be achieved through surface engineering of the cathode utilizing a passivated anode, whereby the catalytic nanoparticles are only sourced from within the cathode, and result in much stronger control over the resulting carbon nanotube structures (Douglas et al. *Carbon.* 2017, 116, 572-578). These studies focused on sourcing the catalyst from within iron-rich steels and demonstrated the feasibility of growing multi-walled carbon nanotubes (MWCNTs) from galvanized and 1010 steel, where the iron can easily be present at the cathode-electrolyte surface either by temperature-induced dealloying of the Zn—Fe surface (in the case of the galvanized steel), or through current-induced migration (in the case of the 1010 steel). However, 316 stainless steel electrodes with chromium-based surfaces demonstrated no carbon nanotube growth presumably due to the lack of Fe present at the cathode-electrolyte interface. This presents an opportunity to use a low-cost conductive 316 stainless steel-based electrode, and tune the catalyst particle sizes at the cathode surface through pre-deposition of catalytic materials.

In this spirit, studies correlating the effects of catalyst size on the resulting carbon nanotube properties, such as diameter, present an unstudied yet critical step towards understanding the mechanisms governing the catalytic growth of carbon nanotubes by electrochemical reduction of $CO_2$ in molten carbonates. Therefore, this study pre-deposited catalysts of varying thicknesses (0.5 nm to 5 nm) onto stainless steel cathodes and demonstrates the ability to structurally tune the diameter of multiwalled carbon nanotubes (from ~23 nm to 33 nm, median diameter) grown through electrochemical methods. The results indicate a strong correlation between catalyst size and resulting carbon nanotube diameter, which is analogous to catalytic growth under gas-phase conditions. Additionally, as dynamic processes such as Ostwald ripening of catalysts (a phenomenon whereby larger particles grow in size while smaller particles shrink in size and eventually disappear through atomic diffusion) are well accepted in gas-phase growth, further presented in this study are time-stop studies demonstrating smaller diameter distribution for shorter growth time conditions (with a small minority of <5 nm diameter and double walled carbon nanotubes observed), indicating the presence of Ostwald ripening phenomena. This work indicates that many mechanistic understandings from gas-phase catalytic carbon nanotube growth may be applied to the electrochemical growth of carbon nanotubes from $CO_2$, and demonstrates specifically the ability to tune carbon nanotube structures such as diameter through catalyst size and growth time.

Electrode Preparation: An $Al_2O_3$ coated Ni wire (Fisher Scientific, 99%, 1 mm diameter) anode was used in all electrolysis experiments. Ni wire was coated with 500 cycles (~50 nm) of $Al_2O_3$ by a Gemstar Arradiance atomic layer deposition (ALD) tool. The thickness of this coating was determined through ellipsometry analysis of $Al_2O_3$ coatings on silicon wafers with a J. A. Woollam spectrometer. To accomplish this, sequential 28 ms pulses of $C_6H_{18}Al_2$ (TMA) and $H_2O$ with a residence time of 1 second were utilized. This electrode can be used for multiple experiments. The cathodes used in these experiments were 316 stainless steel (Trinity Brand Industries) sheets with thin layers of Fe deposited via e-beam evaporation using an Angstrom eBeam and Sputter Tool.

Electrolysis: Experiments were carried out in an alumina crucible (AdValue Tech, 50 ml) containing 40 g lithium carbonate (Fisher Scientific, 99%) electrolyte (M.P. 723° C.), which was held at 750° C. in a cylindrical ceramic heater (Thermcraft) using a bench top temperature controller (OEM Heaters). Electrodes were immersed into the electrolyte and a constant current was applied across the electrodes. The current density was normalized to the approximate exposed surface area of the cathode. All electrolysis experiments in this study were carried out for 1 hr unless otherwise noted in the text. No degradation of the lithium carbonate electrolyte was observed and the same batch of lithium carbonate electrolyte was reused for five consecutive experiments before discarding. During the electrolysis, carbon accumulates at the cathode, which is removed from the electrolyte and cooled after electrolysis. The carbon product was removed from the electrodes by bath sonication in water (1 hr), and purified from carbonates via washing in 2 M HCl, and solvent exchanged to water through centrifugation. The carbon product was dried at 60° C. overnight.

Material Characterization: The carbon nanostructures were analyzed with a Zeiss Merlin scanning electron microscope (SEM) and an FEI Osiris transmission electron microscope (TEM) at a beam voltage of 200 kV with corresponding elemental mapping by energy dispersive x-ray (EDS) technique to determine catalyst composition. Diameter distributions were assessed by taking measurements of >100 carbon nanotubes from multiple SEM images taken at multiple different spots. In the case of the 3 min growth samples, diameter distributions were assessed by a combination of SEM and TEM imaging, to account for the population of carbon nanotubes that are too small to measure from SEM techniques. Cathode surfaces were characterized through SEM EDS. Raman spectroscopy was used to determine carbon nanotube crystallinity on a Renishaw inVia microscope with a 532 nm$^-$ laser excitation, 10 seconds exposure time, and 10% laser power. All samples were purified through suspension in sodium dodecylbenzene sulfonate (SDBS, Fisher Scientific) and centrifugation for 15 minutes at 2000 rpm for Raman characterization.

Figure 70:
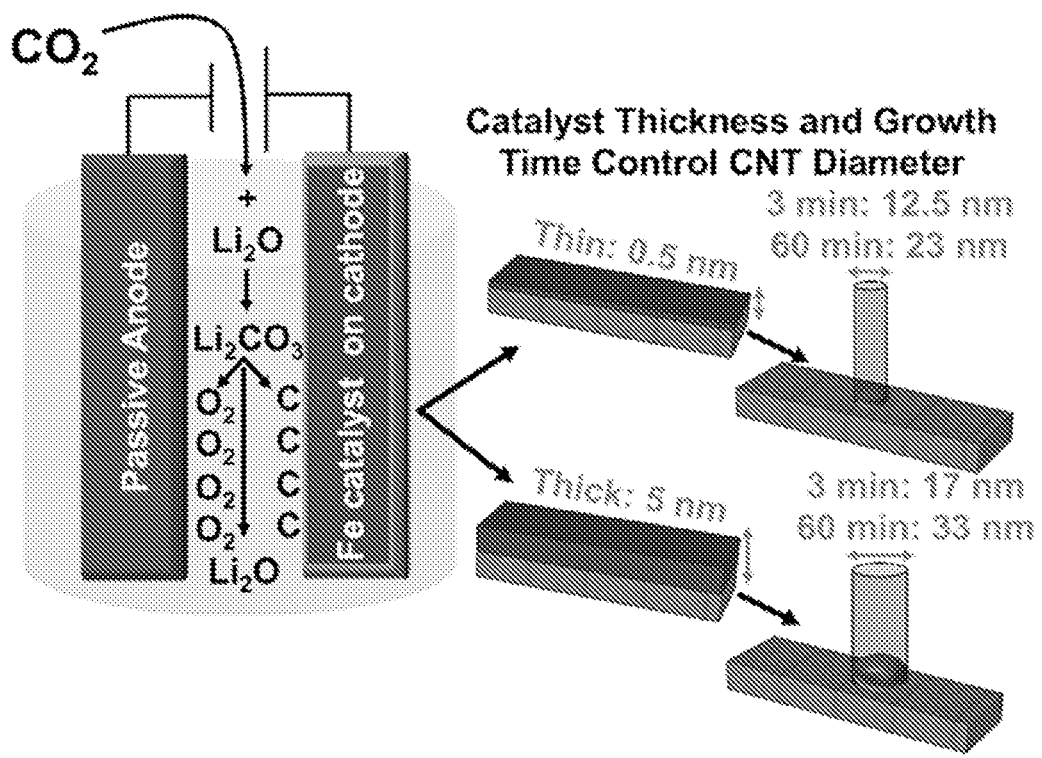
FIG. 70 is a schematic illustration of electrolysis setup, where catalyst of varying thickness and growth time controls carbon nanotube diameter.
Figure 71:
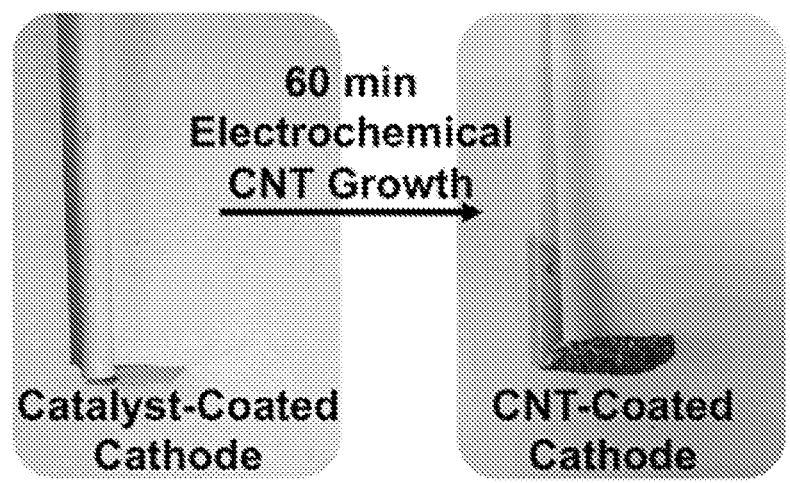
FIG. 71 is an optical image of a stainless steel cathode before electrochemical carbon nanotube growth, and after 60 minutes of growth.
Figure 72:
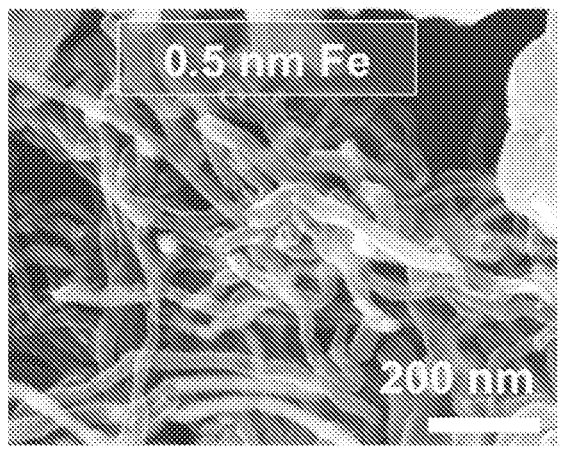
FIG. 72 is a representative SEM image of carbon nanotubes grown on 0.5 nm Fe on stainless steel cathodes.
Figure 73:
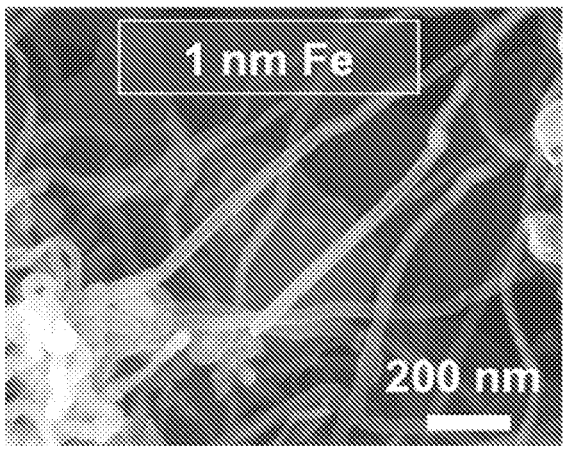
FIG. 73 is a representative SEM image of carbon nanotubes grown on 1 nm Fe on stainless steel cathodes.
Figure 74:
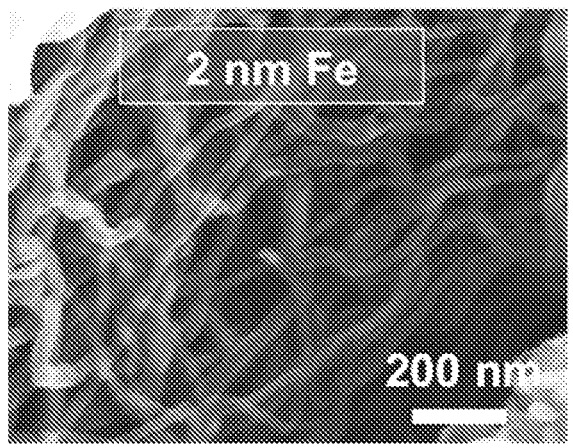
FIG. 74 is a representative SEM image of carbon nanotubes grown on 2 nm Fe on stainless steel cathodes.
Figure 75:
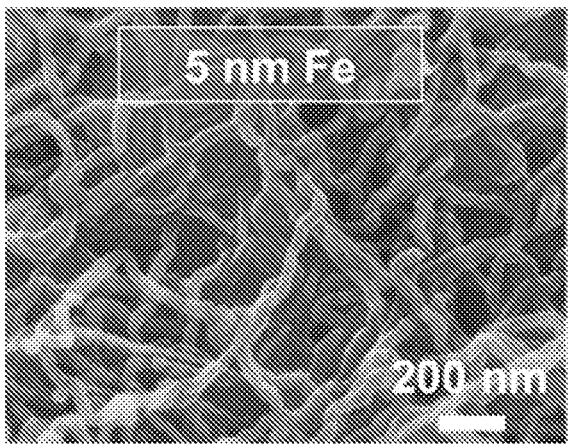
FIG. 75 is a representative SEM image of carbon nanotubes grown on 5 nm Fe on stainless steel cathodes.

The electrochemical reduction of $CO_2$ to carbon nanotubes via molten salt electrolysis has been previously described (Douglas et al. *Carbon*. 2017, 116, 572-578) and relies on the splitting of the molten $Li_2CO_3$ electrolyte (M.P. 723° C.) into C, which collects at the cathode, $O_2$ collected at the anode, and $Li_2O$ in the electrolyte. $Li_2O$ regenerates the $Li_2CO_3$ electrolyte through a chemical reaction with ambient $CO_2$. This takes place under constant current of 100 mA/cm$^2$ applied between a conductive stainless steel-based cathode and inert $Al_2O_3$ coated Ni wire anode, which has been demonstrated as a reusable anode by promoting the activation of catalysts at the cathode-electrolyte interface (Douglas et al. *Carbon*. 2017, 116, 572-578). It has been hypothesized that dynamic processes of catalyst evolution, which are observed in gas-phase carbon nanotube growth, may also take place in this liquid-phase electrochemical carbon nanotube growth from $CO_2$ (Douglas and Pint. *ECS J. Solid State Sci. Technol.* 2017, 6, M3084-M3089). Though there have been no studies demonstrating this concept to date, it can be important for the basis of understanding of how process parameters influence either or both the electrochemical and catalytic aspects of this carbon nanotube growth technique. Therefore, this study utilized pre-deposited catalyst particles of varying sizes, deposited via e-beam evaporation and size controlled through deposition thickness ranging from 0.5 nm to 5 nm Fe, rather than previously studied particles sourced from within the steel-based cathodes, to drive the catalytic synthesis of carbon nanotubes from ambient carbon dioxide. This experimental approach allows for the study of dynamic catalyst processes independent of electrochemical parameters such as temperature and current density. The results indicate catalyst thickness and growth time can govern the resulting carbon nanotube diameter, with thinner catalyst layers (which lead to smaller particles) and shorter growth times leading to smaller diameter carbon nanotubes, as schematically illustrated in FIG. 70. The choice of stainless steel as the support for catalysts was made because of its conductivity and inert chemical nature in molten carbonates. FIG. 71 shows a catalyst-coated stainless steel cathode before electrochemical carbon deposition, with FIG. 71 showing a carbon nanotube-coated cathode after 60 minutes of electrochemical growth.

Figure 76:
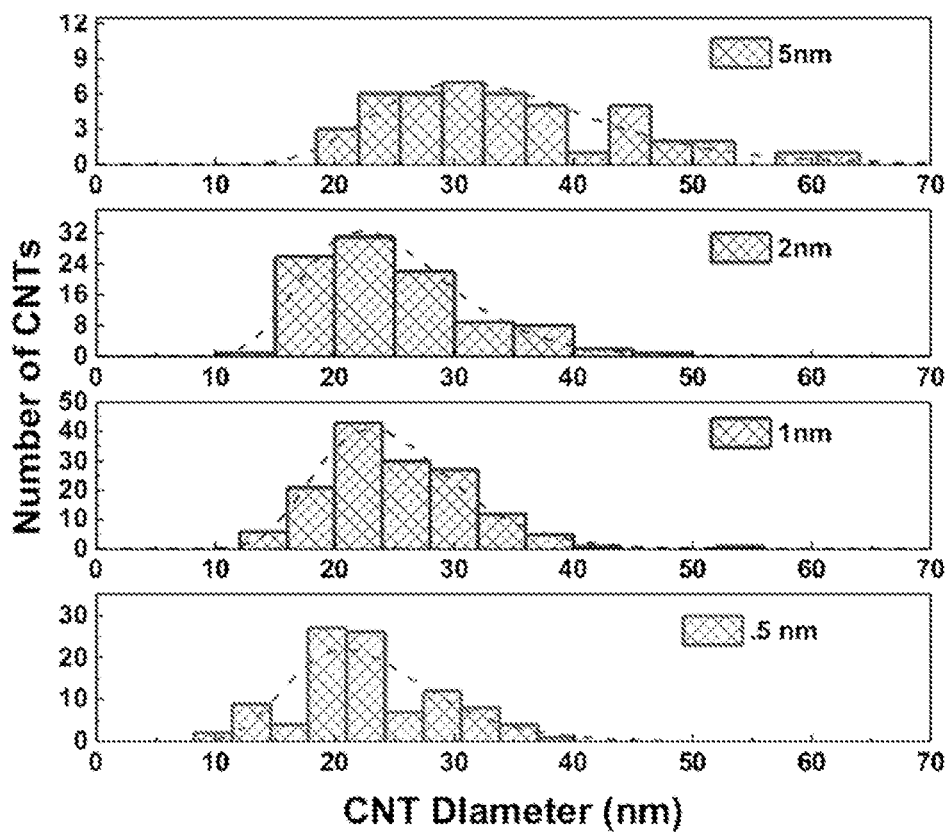
FIG. 76 is a size distribution plot for each growth condition including carbon nanotubes grown on 0.5, 1, 2, and 5 nm Fe deposited on stainless steel cathodes.
Figure 77:
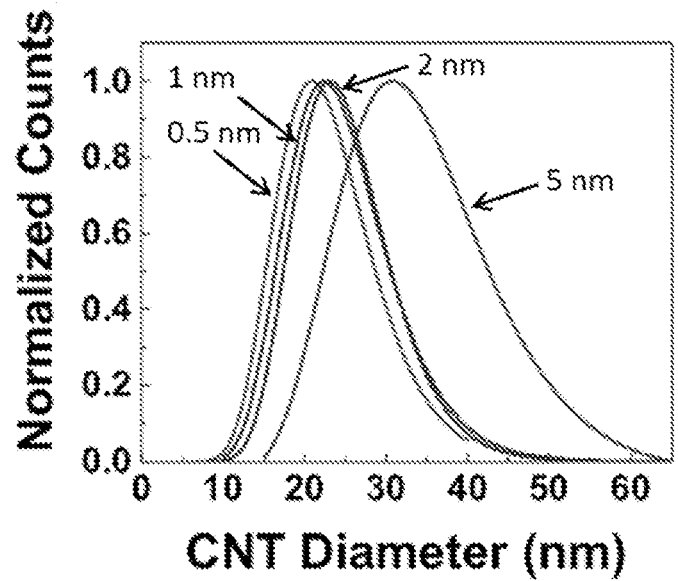
FIG. 77 shows the lognormal fits for the size distributions plotted in FIG. 76.
Figure 78:
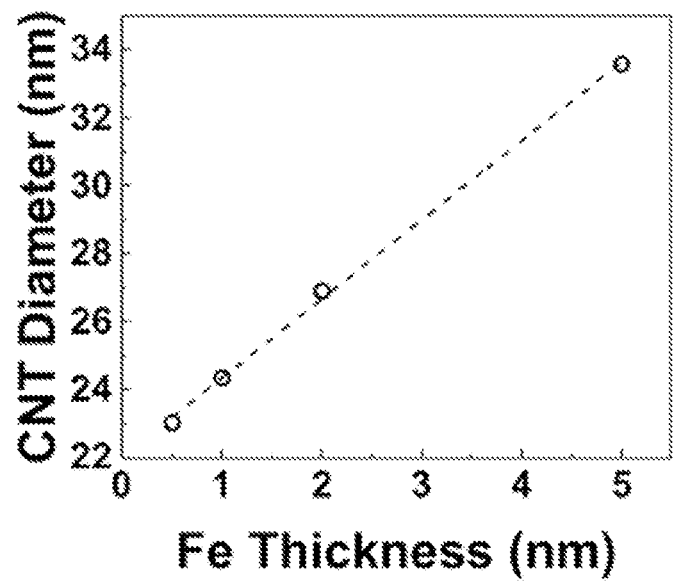
FIG. 78 is a plot of the median diameters as a function of Fe catalyst thickness.

Carbon nanotubes were grown under conditions of varying catalyst thicknesses ranging from 0.5 nm to 5 nm Fe, with representative SEM images shown in FIG. 72-FIG. 75 and corresponding diameter distributions measured from image analysis using multiple SEM images from multiple spots on the sample. The diameter distributions follow lognormal distributions with fits overlaid, which are consistent with gas-phase grown carbon nanotubes and is indicative of dynamic catalyst processes such as Ostwald ripening. The study observes a general trend of thinner catalyst layers yielding carbon nanotubes with smaller and tighter diameter distributions, with a 0.5 nm thick Fe layer leading to carbon nanotubes ranging from ~10-38 nm with a median diameter centered around ~23 nm (FIG. 76). A 5 nm thick catalyst layer resulted in the widest and largest diameter distribution ranging from ~19-62 nm with a median diameter centered around ~33 nm (FIG. 76). Normalized lognormal fits of the raw distribution data are overlaid and shown in FIG. 77, demonstrating the trend of increasing carbon nanotube diameter from increased Fe thickness, which is further shown in FIG. 78, with median carbon nanotube diameter as a function of Fe thickness plotted with a linear fit.

Figure 79:
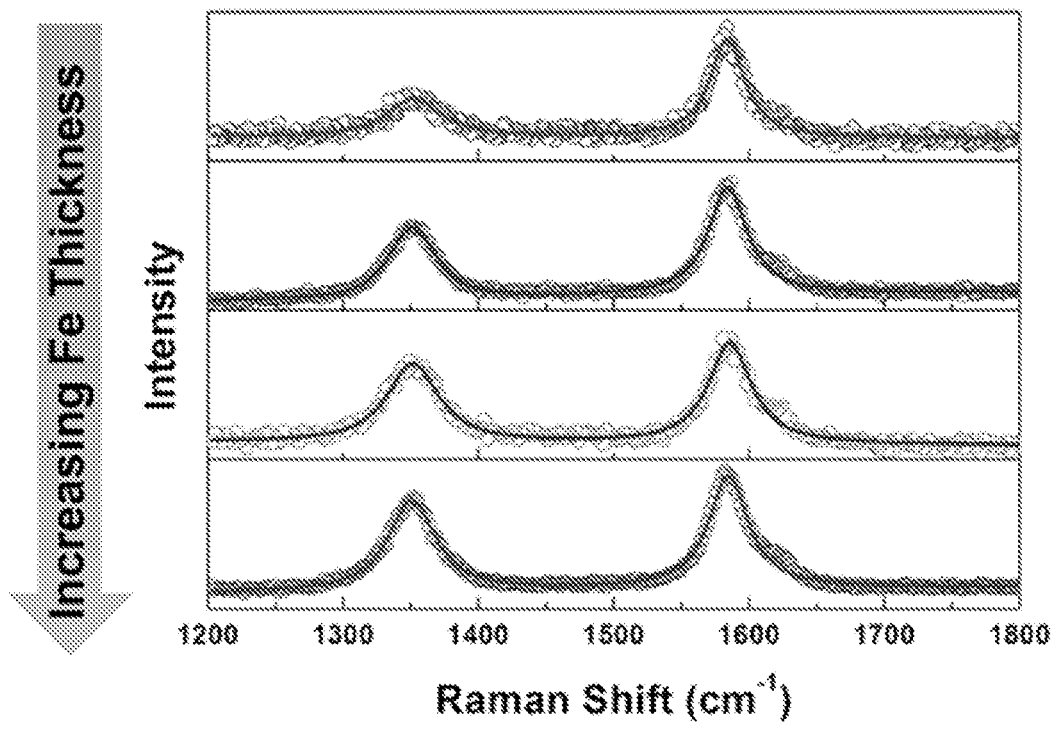
FIG. 79 shows representative Raman spectra for carbon nanotubes grown on 0.5, 1, 2, and 5 nm Fe deposited on stainless steel cathodes, with fits shown in solid lines and raw data shown in open circles.
Figure 80:
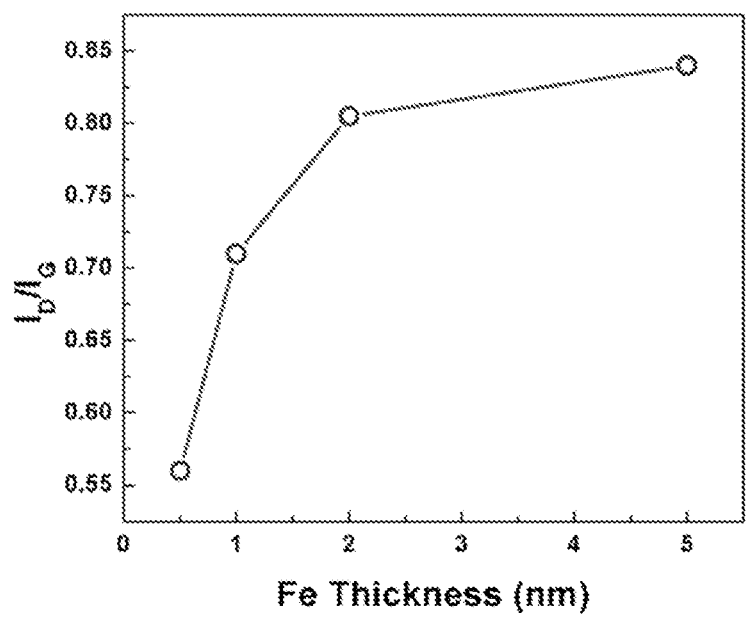
FIG. 80 shows the $I_D/I_G$ Raman ratios as a function of Fe catalyst thickness for all samples shown in FIG. 79.

Raman spectroscopy was used to characterize the multiwalled carbon nanotube products, which all exhibit the characteristic graphitized carbon G peak ~1580 cm$^{-1}$, indicative of in-plane sp$^2$ hybridized carbons, and a D mode ~1350 cm$^{-1}$, which corresponds to out of plane defective sp$^3$ hybridized carbons. Shown are representative spectra for carbon nanotubes grown from all catalyst thickness conditions, and a higher D/G peak intensity ratio is observed for carbon nanotubes grown from thicker Fe catalyst layers, which indicates a greater concentration of sp$^3$ carbon materials (FIG. 79). FIG. 80 demonstrates the trend between the D/G intensity ratios ($I_D/I_G$) as a function of Fe thickness, and an increasing trend where thicker Fe layers yield carbon nanotubes with a larger portion of defects is observed, consistent with the observation of larger diameters.

Figure 81:
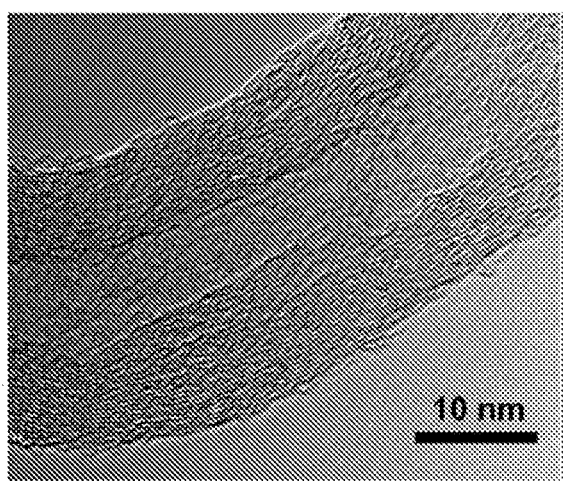
FIG. 81 shows a representative TEM image of a carbon nanotube grown from 0.5 nm Fe on stainless steel cathodes.
Figure 82:
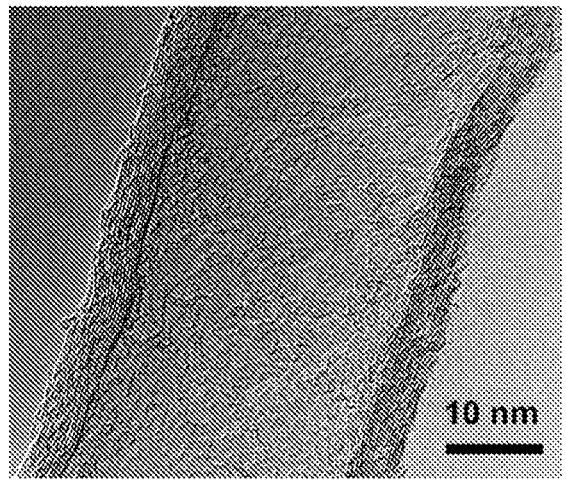
FIG. 82 shows a representative TEM image of a carbon nanotube grown from 5 nm Fe on stainless steel cathodes.

As Raman spectroscopy and SEM image analysis give statistical assessments of the carbon nanotubes grown, HR-TEM imaging was performed on representative carbon nanotubes synthesized from both extreme cases of 0.5 nm (FIGS. 81) and 5 nm (FIG. 82) Fe thicknesses to give insight into the crystallinity and wall quality of the synthesized carbon nanotube materials. Consistent with the observations from Raman spectroscopy, a high degree of crystallinity for both samples is observed, and sizes are consistent with diameter distributions taken from SEM images, where smaller diameter carbon nanotubes are observed in the case of 0.5 nm Fe films compared to larger diameter carbon nanotubes grown from the 5 nm Fe films.

Figure 83:
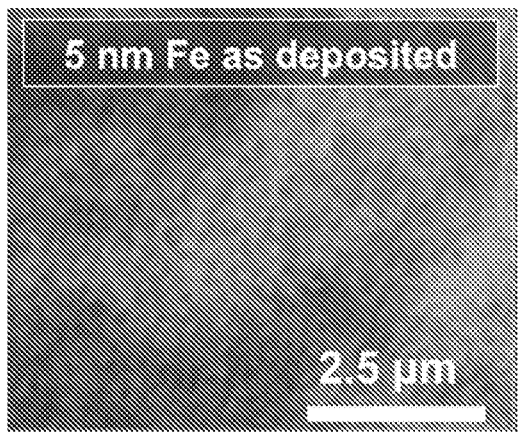
FIG. 83 is a SEM elemental map showing the 5 nm thick Fe catalyst as-deposited.
Figure 84:
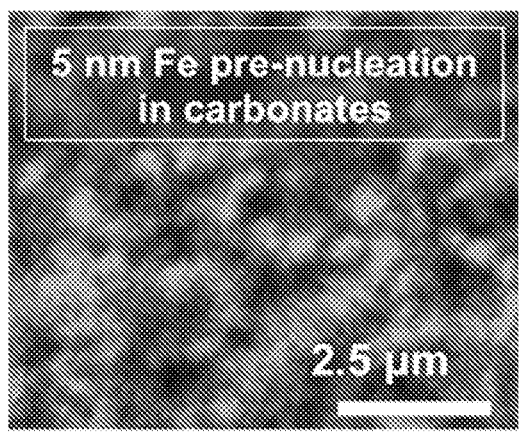
FIG. 84 is a SEM elemental map showing the 5 nm thick Fe catalyst after being heated for 15 minutes in the molten carbonate electrolyte.
Figure 85:
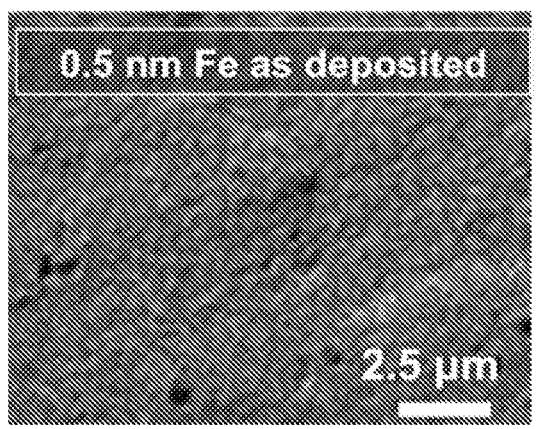
FIG. 85 is a SEM elemental map showing the 0.5 nm thick Fe catalyst as-deposited.
Figure 86:
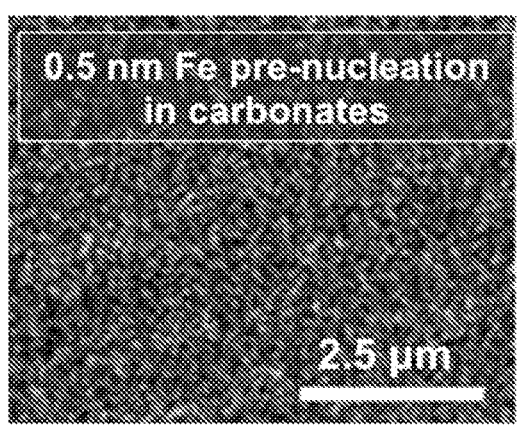
FIG. 86 is a SEM elemental map showing the 0.5 nm thick Fe catalyst after being heated for 15 minutes in the molten carbonate electrolyte.
Figure 87:
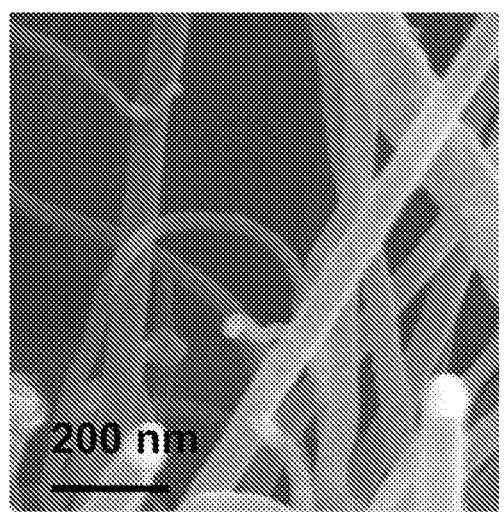
FIG. 87 shows SEM images of carbon nanotubes grown on 5 nm Fe catalysts for 1 hour, demonstrating catalysts embedded at the tips of the carbon nanotube materials.
Figure 88:
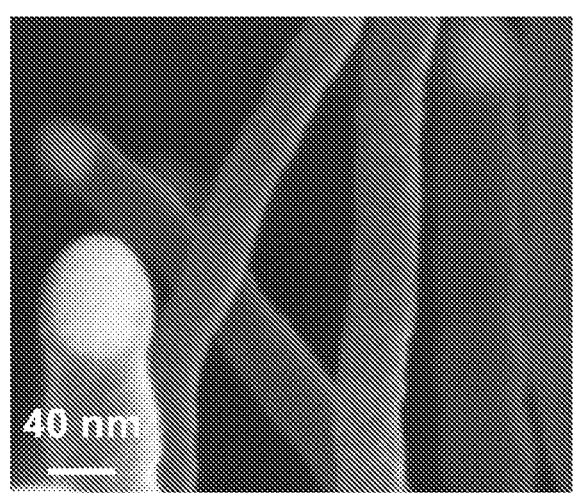
FIG. 88 shows SEM images of carbon nanotubes grown on 5 nm Fe catalysts for 1 hour, demonstrating catalysts embedded at the tips of the carbon nanotube materials.
Figure 89:
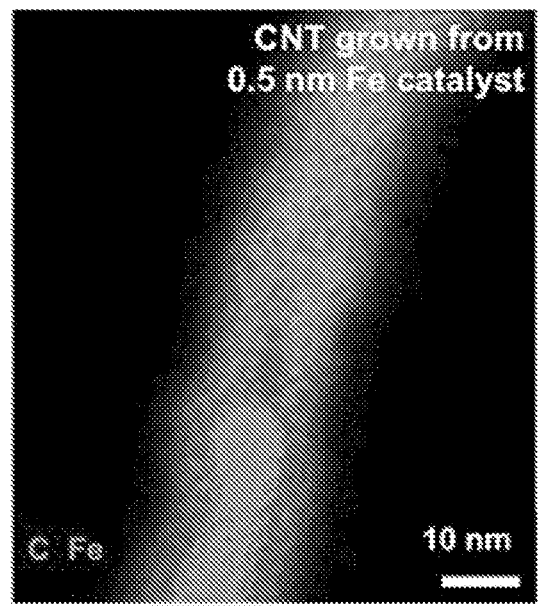
FIG. 89 is a STEM elemental map of a carbon nanotube grown from a 0.5 nm thick Fe catalyst, wherein the grown carbon nanotube has Fe catalyst therein.
Figure 90:
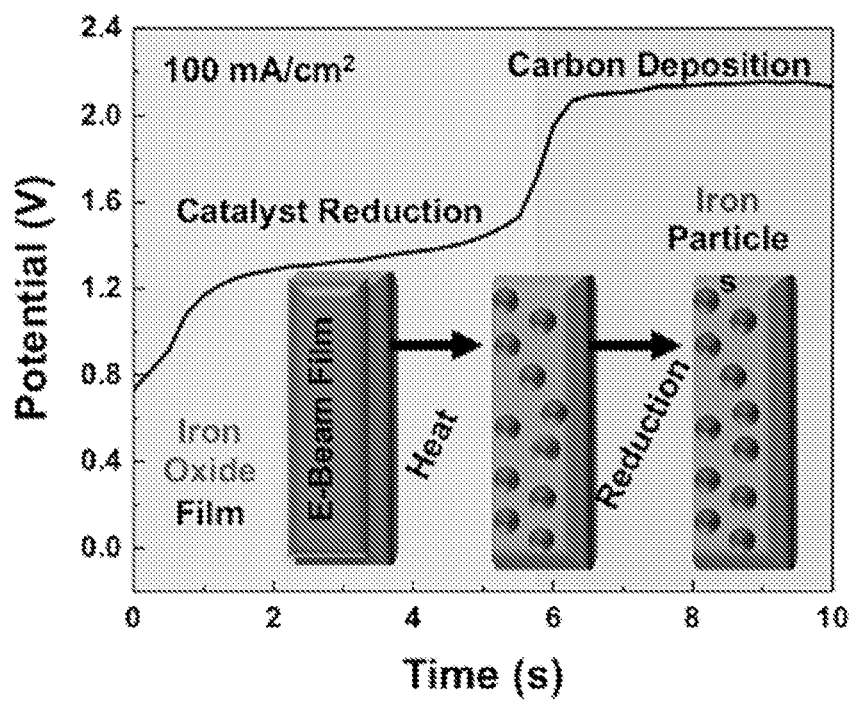
FIG. 90 is a galvanostatic electrolysis plot of potential versus time with inlay of schematic illustration of proposed mechanism of catalyst formation and reduction.
Figure 91:
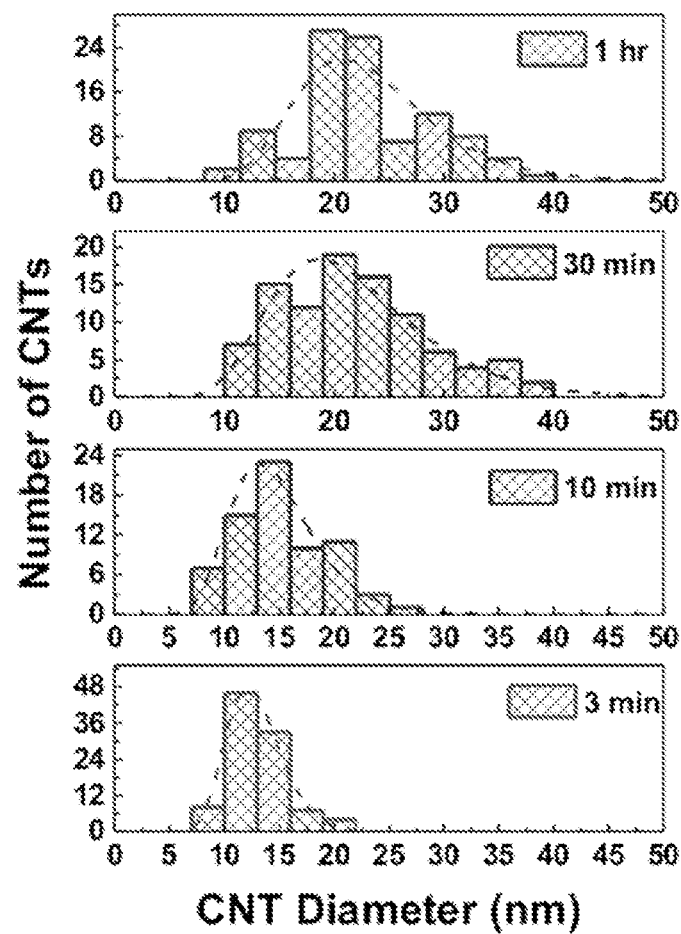
FIG. 91 shows the size distributions of carbon nanotubes grown from 0.5 nm Fe for varying growth times.
Figure 92:
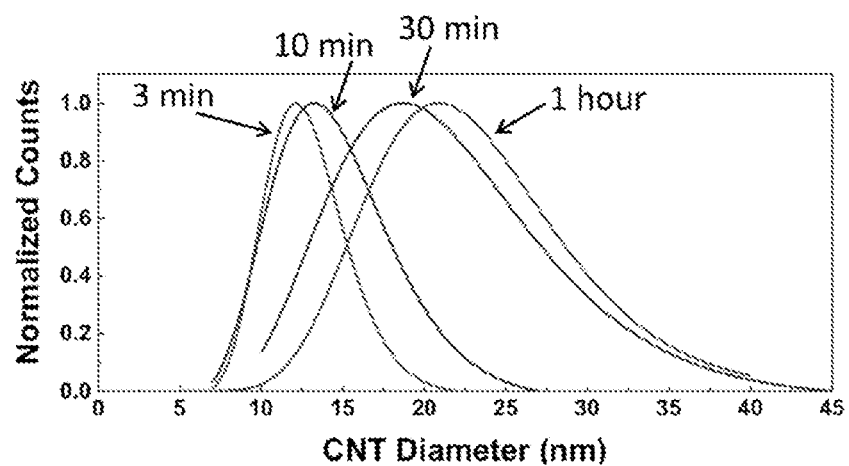
FIG. 92 is the normalized lognormal fits for 0.5 nm Fe grown carbon nanotubes for various growth times.
Figure 93:
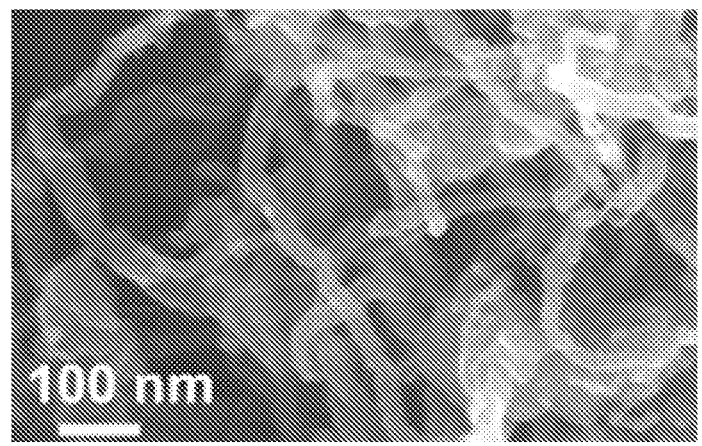
FIG. 93 is a representative SEM image of carbon nanotubes grown on 0.5 nm Fe for 30 minutes.
Figure 94:
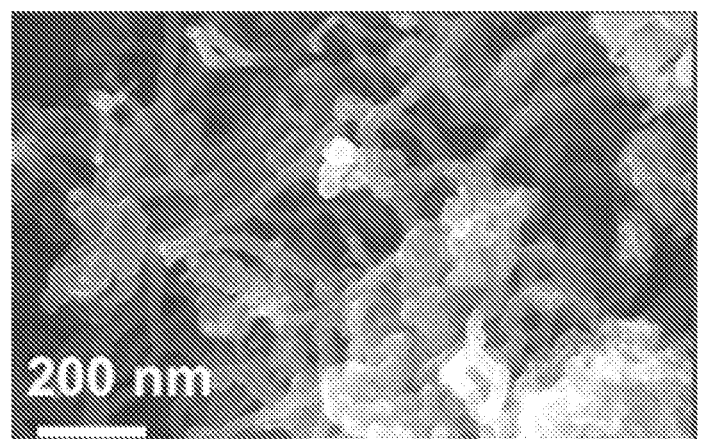
FIG. 94 is a representative SEM image of carbon nanotubes grown on 0.5 nm Fe for 10 minutes
Figure 95:
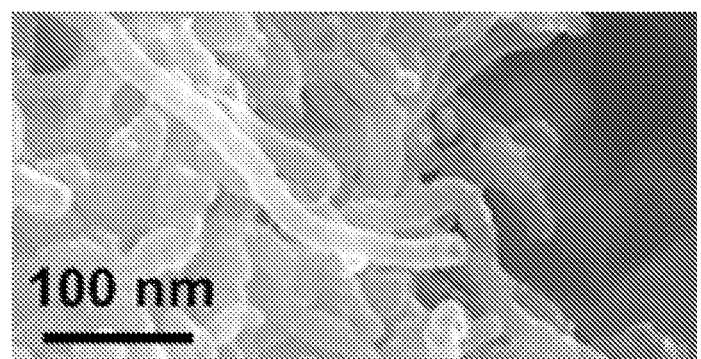
FIG. 95 is a representative SEM image of carbon nanotubes grown on 0.5 nm Fe for 3 minutes.
Figure 96:
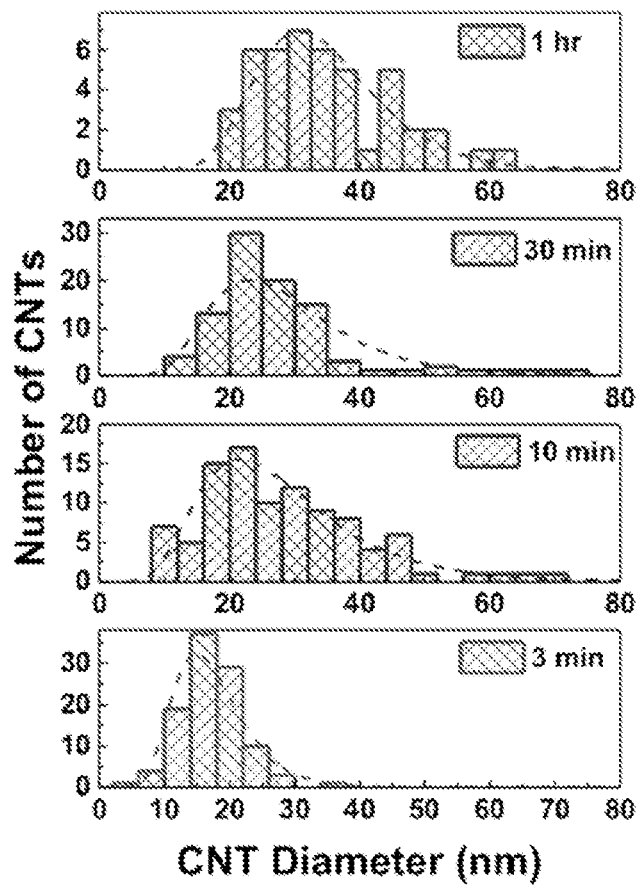
FIG. 96 shows size distributions of carbon nanotubes grown from 5 nm Fe for varying growth times.
Figure 97:
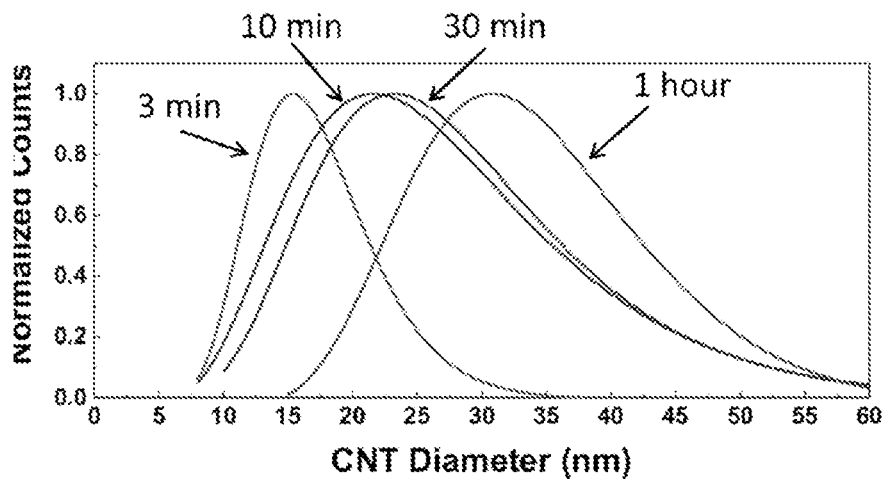
FIG. 97 is the normalized lognormal fits for 5 nm Fe grown carbon nanotubes for various growth times.
Figure 98:
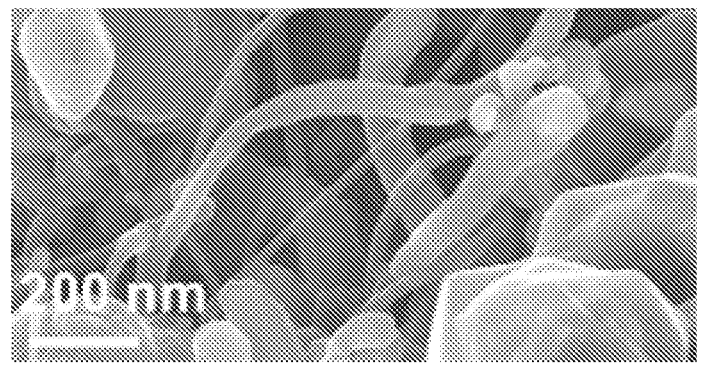
FIG. 98 is a representative SEM image of carbon nanotubes grown on 5 nm Fe for 30 minutes.
Figure 99:
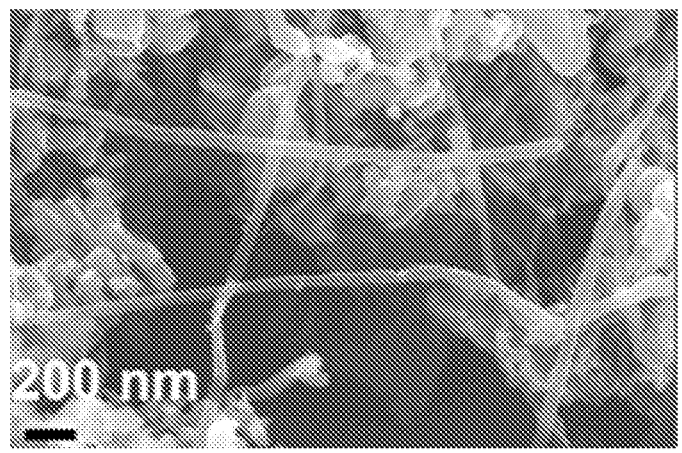
FIG. 99 is a representative SEM image of carbon nanotubes grown on 5 nm Fe for 10 minutes.
Figure 100:
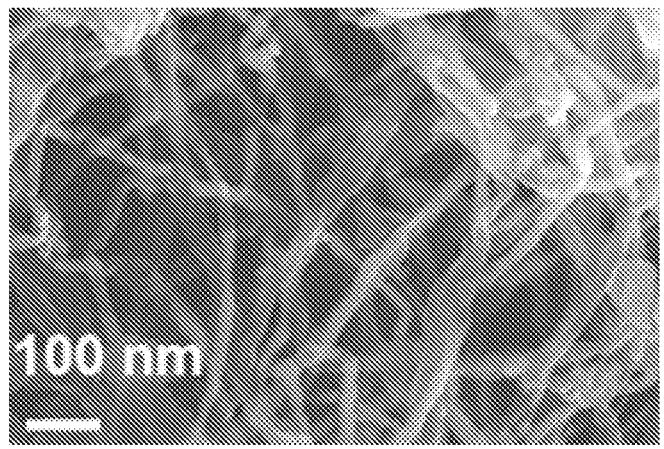
FIG. 100 is a representative SEM image of carbon nanotubes grown on 5 nm Fe for 3 minutes.

The results have demonstrated a strong correlation between the pre-deposited catalyst film thickness and carbon nanotube diameter, however better understanding the mechanism governing catalyst particle formation that leads to diameter-controlled carbon nanotube growth remains elusive. Since decades of gas-phase carbon nanotube growth studies have concluded with an accepted understanding of catalyst formation as a critical step that is necessary to nucleate carbon nanotube growth (Puretzky et al. *Appl. Phys. A.* 2005, 81, 223-240; Nessim. *Nanoscale.* 2010, 2, 1306-1323), experiments were performed to study the evolution of the cathode surfaces in the environment where carbon nanotube growth takes place using SEM elemental mapping. As-deposited Fe thin films on stainless steel surfaces before and after pre-nucleation heat treatment at 750° C. in $Li_2CO_3$ for 15 minutes (FIG. 83-FIG. 86) were compared. As shown in FIG. 83, the 5 nm Fe film appears uniformly distributed on the stainless steel surface until heated in the electrolyte, where the film forms larger particles, shown in FIG. 84. However, the 0.5 nm Fe film shows the formation of smaller well-distributed particles (FIG. 85-FIG. 86). This imaging isolates the catalyst formation prior to carbon nanotube nucleation and growth. Additionally, post-mortem STEM EDS imaging on the carbon nanotubes was performed to correlate the final products and the chemical identity of the catalyst particles that remain embedded inside the carbon nanotube tips (FIG. 87-FIG. 88) to confirm prior observations. The compiled STEM EDS map is shown in FIG. 89, where it can be seen that Fe is the only element that remains embedded inside a carbon nanotube tip grown from 0.5 nm Fe catalyst layer. FIG. 90 shows the first 10 seconds of a typical potential response from the galvanostatic electrolysis conditions applied to these Fe-based catalyst layers. There are two distinct plateaus, including the first at around 1.2 V for 6 seconds, then a higher potential plateau at around 2.0 V, which extends for the duration of the hour-long electrolysis. Because the study has elucidated pre-deposited Fe films as the basis for catalytic formation of carbon nanotubes, a reduction mechanism can be revealed in this two-plateau voltage response. E-beam deposited Fe films will form a natural oxide if left outside of an inert atmosphere, so the catalyst film begins as an iron oxide film, which forms particles under the application of heat in the molten carbonate electrolyte. The proposed mechanism is that the low-voltage plateau demonstrated here indicates the electrochemical reduction of these particles into elemental iron prior to carbon deposition, which takes please at around 2.0 V. This proposed mechanism is schematically represented as an inset in FIG. 90.

Figure 101:
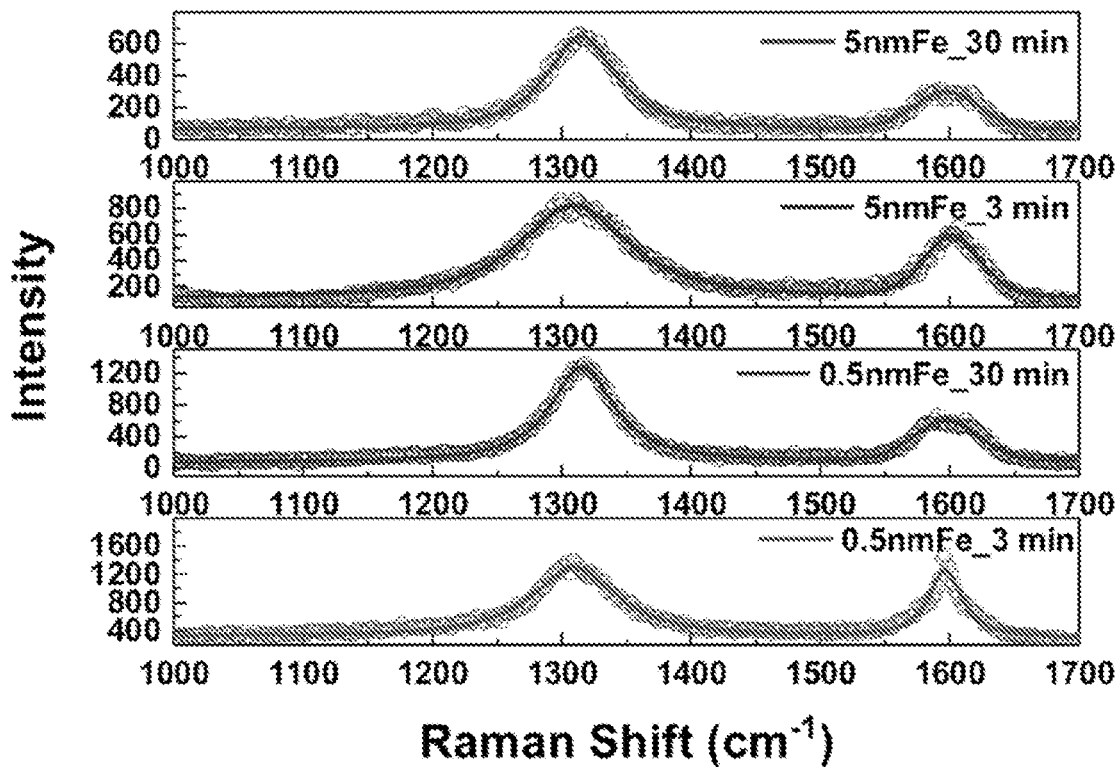
FIG. 101 is plots of representative Raman spectra for carbon nanotubes grown for 3 and 30 minutes from a 0.5 nm Fe film and a 5 nm Fe film.

These results indicate a strong correlation between catalyst size and carbon nanotube diameter, with catalyst size tunable through film thicknesses which form nanoparticles under conditions of heat treatment in molten carbonates. However, dynamic processes which govern catalyst migration, such as Ostwald ripening, remain elusive under the long 60 min electrolysis conditions, as these processes are likely to take place at the very beginning of catalyst formation and carbon nanotube nucleation. The study therefore performed time-stop experiments for the cases of 0.5 nm and 5 nm Fe thicknesses for 3, 10, and 30 min growth times and compared the carbon nanotubes produced under these conditions to those grown for 1 hour. The carbon nanotube diameter distributions and overlaid lognormal fits of the raw data measured from multiple SEM images taken at multiple spots as well as representative SEM images of each time growth and thickness are shown in FIG. 91-FIG. 101. Smaller diameter carbon nanotubes with a tighter size distribution are correlated to shorter growth times, with sizes ranging from ~8-22 nm for 0.5 nm Fe (FIGS. 91) and ~3-37 nm for 5 nm Fe (FIG. 96) for 3 min growth conditions. These diameter distributions become wider with median sizes increasing under conditions of longer growth times. Lognormal fits of each condition are overlaid in FIG. 92 (0.5 nm Fe grown carbon nanotubes) and FIG. 97 (5 nm Fe grown carbon nanotubes) and demonstrate this trend. Representative Raman spectra for each growth condition are shown in FIG. 101, and demonstrates the characteristic peaks for graphitized carbon.

Figure 102:
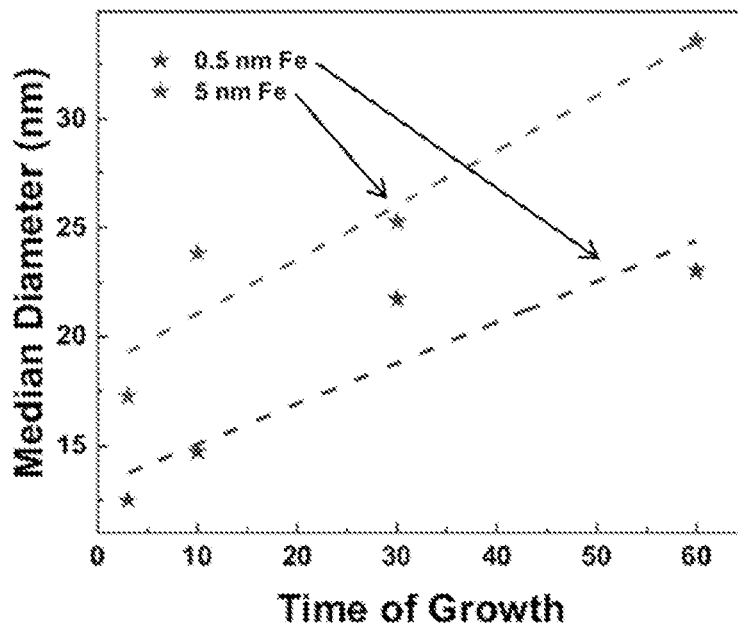
FIG. 102 shows a plot of median carbon nanotube diameter as a function of growth time for 0.5 nm Fe grown carbon nanotubes and 5 nm Fe grown carbon nanotubes.
Figure 103:
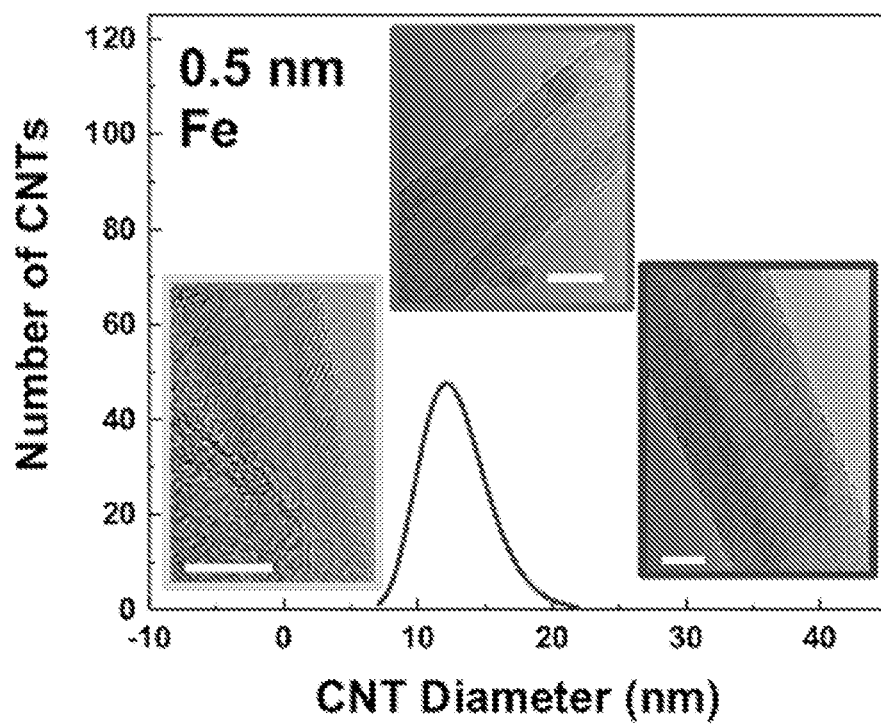
FIG. 103 is a plot of the lognormal fits of the size distribution with representative TEM images for 0.5 nm Fe grown carbon nanotubes.
Figure 104:
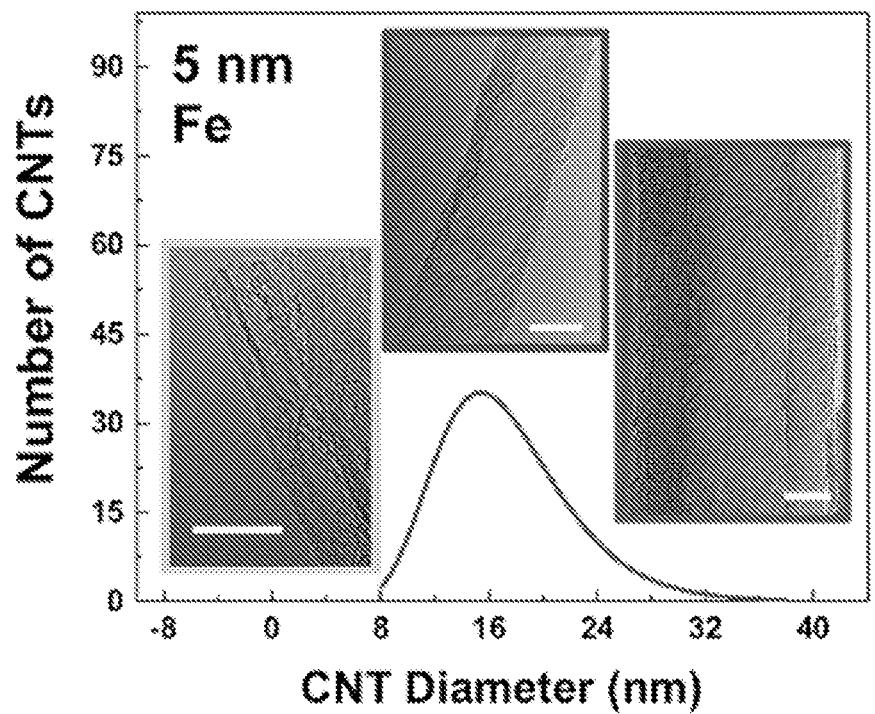
FIG. 104 is a plot of the lognormal fits of the size distribution with representative TEM images for 5 nm Fe grown carbon nanotubes.

The median sizes for each condition are plotted in FIG. 102 as a function of growth time for both thicknesses studied with linear fits overlaid. In each case there is a positive correlation between growth time and median carbon nanotube diameter, with larger diameters observed at each growth time for the 5 nm Fe grown carbon nanotubes compared to those grown from 0.5 nm Fe. In order to study the crystallinity and number of walls for the carbon nanotubes, HR-TEM imaging for carbon nanotubes grown for 3 min was performed and representative TEM images across the spectrum of measured diameters are shown as insets alongside the lognormal fits for 0.5 nm Fe (FIG. 103) and 5 nm Fe (FIG. 104) thicknesses. Notably, while the TEM images confirm the trends observed and measured from SEM imaging, TEM imaging reveals the presence of a double-walled carbon nanotube grown from 5 nm Fe for 3 min which is shown as an inset in FIG. 104, and represents the smallest diameter and fewest walled carbon nanotube grown from electrochemical methods to date. This further confirms the ability to tune diameter distributions and number of walls through catalyst properties and process parameters that influence catalyst properties, such as catalyst size and growth time.

In summary, this study demonstrates the general principle that catalytic growth of carbon nanotubes through molten salt electrolysis of atmospheric $CO_2$ can be controlled through catalyst engineering through deposited film thicknesses and growth time. The results demonstrate the ability to tune median carbon nanotube diameters from ~33 nm to ~23 nm by varying the catalyst thickness from 0.5 nm to 5 nm Fe. Raman spectroscopy and TEM characterization reveals a high level of crystallinity and lower concentration of defects for carbon nanotubes grown from thinner catalyst layers. SEM EDS measurements confirm the formation of catalyst particles on the surface of the stainless steel cathodes during pre-growth thermal treatment that provide the basis for multiwalled carbon nanotube nucleation. This is further confirmed through post-mortem STEM EDS imaging, which reveal Fe as the only element embedded inside the carbon nanotube tips. Galvanostatic electrolysis reveals two distinct voltage plateaus, which are proposed to be a low voltage electrochemical reduction of iron oxide to elemental iron, followed by carbon deposition at the higher voltage.

Time-stop studies performed for 3, 10, and 30 min growth reveal tighter size distributions centered around smaller diameters for shorter growth times. HR-TEM imaging reveals a high degree of crystallinity for the carbon nanotubes grown under short time conditions. The observation of a double-walled carbon nanotube in TEM imaging demonstrates the smallest carbon nanotube grown via electrochemical techniques and confirms the promise of tuning the process parameters towards the specific growth of valuable carbon-based nanostructures, such as single-walled carbon nanotubes and graphene. Overall, this work demonstrates that catalyst size and growth time can influence the resulting carbon nanotubes grown through electrochemical reduction of $CO_2$ in a molten carbonate electrolyte and present a promising route towards the growth of high-value all-carbon based nanostructures from this technique.

Figure 105:
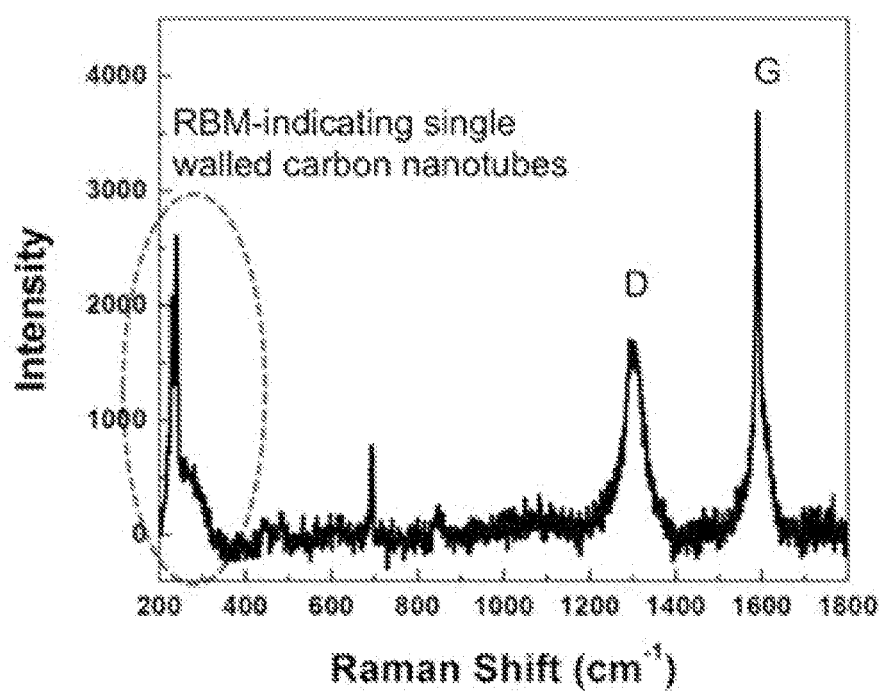
FIG. 105 is a Raman spectrum indicating the presence of single-walled carbon nanotubes.

Pre-deposited catalysts can achieve controllable carbon nanotube diameters. Controlling the pre-deposited catalyst can therefore be used to grow of single-walled carbon nanotubes, as growth of single-walled carbon nanotubes is only possible with well-defined small catalysts (~1 nm). The Raman spectra shown in FIG. 105 of carbon nanotubes grown in this process indicates the presence of single walled carbon nanotubes, with the peaks between 200 and 400 $cm^-$, corresponding to radial breathing modes which only arise in single walled carbon nanotubes.

Example 5

The EPA estimates that 26% of all greenhouse gas (GHG) emissions come from fuel consumption in the transportation industry. Among these gasses, the majority share is $CO_2$ (at 96%). Discussed herein is a technology that can convert atmospheric $CO_2$ into carbon nanotubes, fibers, graphite petals, and amorphous carbon. This presents a technology to store $CO_2$ gas as solid carbon, which is a stable non-oxidized form of carbon. This technology overcomes most capture and conversion techniques, which rely on the storage of gaseous $CO_2$ and is often bottlenecked by the probability of leaks and the lack of available storage reservoirs.

Figure 106:
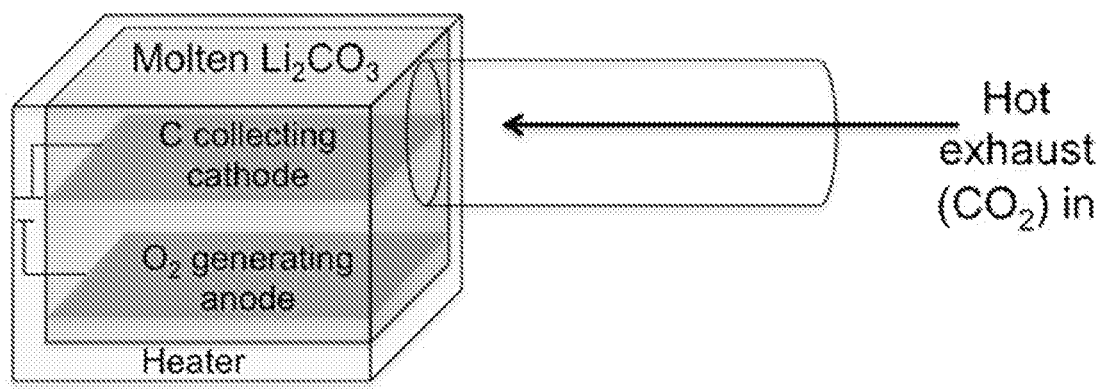
FIG. 106 is a schematic diagram of an apparatus.

As an example application of this conversion technology, a product is described which can be attached to the exhaust pipe of a passenger transportation vehicle (adaptable to larger commercial vehicles and trucks) (FIG. 106). In this case, the $CO_2$ used to produce carbon nanomaterials comes directly from one of the largest sources of $CO_2$ emissions, which would lead to a massive decrease in emissions altogether. Additionally, for the automotive transportation industry, a product that removes all $CO_2$ from exhaust gas would provide an even cleaner alternative to electric vehicles (EVs), which still suffer greatly from carbon footprints due to the $CO_2$ emitted to produce grid electricity. This would bridge the gap between the current need for a greener transportation industry and the future vision of electric vehicles and electricity powered by renewables to gain independence from non-renewable fossil fuels.

The energy required to heat the electrolyte will be the balance of heat in from hot exhaust (up to 1400 F, but 1000 F is assumed in this calculation) and heat loss to the atmosphere through the ceramic chamber. In the calculations shown below, the same operating temperature as described in the experimental details discussed in the examples above are assumed. However, for this application in particular, a eutectic electrolyte (mixture of different carbonates) would present a lower melting temperature (399 C, compared to 750 C) and would greatly reduce the amount of heat input to maintain an equilibrium state of molten electrolyte.

Using this equation for Qout:

$$Q_{out}=UA(T_i-T_o)$$

and the below values for U, A, $T_i$ and $T_o$:
$U_{Al2O3\ ceramic\ crucible}$=35 $W/m^2C$
$T_i$=750° C.
$T_o$=25° C.
A=assumed 0.04 $m^2$
the calculated $Q_{out}$ is 1015 W, which can be largely influenced by chamber size.

Next, $Q_{in}$ can be calculated according to:

$$Q_{in}=m(\Delta h+V^2/2+g\Delta z)$$

where
m=368.4 g $CO_2$/mi at 27 mph=0.063 mol $CO_2$/s;
$\Delta h=C_p(T_2=T_1)$;
$C_{pCO2\ at\ 750\ C}$=47.95 J/molK;
$T_2$=1033.15 K;
$T_1$=1023.15 K;
$\Delta h$=479.5 J/mol;
$g\Delta z$=0;
V=m/Ap=0.3057 m/s; and
A=gas exhaust opening (assuming 0.00456 m2)
giving a $Q_{in}$ of 30.2 W.

The $Q_{applied\ heat}$ is 984.9 W, which could come from thermal energy transferred from the chassis of an engine.

The EPA estimates that the average passenger car emits 368.4 g $CO_2$ per mile, at an average speed of 27 mph.

$CO_2$ splitting relies on the reaction: $C_3^{2-}+4e^-\rightarrow C+3O^{2-}$

According to this 4 electron process, the $CO_2$ that would be converted can be determined from:

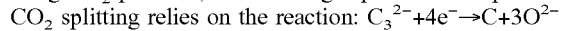

which gives 24,229 A, which could be supplied by a series of individual electrode pairs with a lower current (supplied by a car battery or series of capacitors) across each pair.

Other advantages which are obvious and which are inherent to the disclosure will be evident to one skilled in the art. It will be understood that certain features and sub-combinations are of utility and may be employed without reference to other features and sub-combinations. This is contemplated by and is within the scope of the claims. Since many possible embodiments may be made without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

What is claimed is:

1. A method of making a plurality of carbon nanotubes, comprising:
   applying a current across a catalytically passive anode and a catalytic cathode;
   wherein the catalytic cathode comprises a catalyst and the catalyst comprises Fe, Co, Mo, Cr, Cu, or a combination thereof;
   wherein the catalytically passive anode comprises a first conductive substrate coated with a first passivating layer, the first passivating layer comprising $Al_2O_3$, $TiO_2$, MgO, TiN, VN, or combinations thereof;
   wherein the catalytically passive anode and the catalytic cathode are in electrochemical contact with a molten carbonate electrolyte and a source of $CO_2$; and
   wherein the current is applied at a current density of from 25 $mA/cm^2$ to 500 $mA/cm^2$;
   thereby forming a plurality of carbon nanotubes on the catalytic cathode.

2. The method of claim 1, wherein the current is applied for an amount of time of from 1 minute to 10 hours.

3. The method of claim 1, wherein the first passivating layer has a thickness of 2 nm to 100 nm.

4. The method of claim 1, wherein the catalytically passive anode comprises a metal, a metal oxide, a carbon material, or a combination thereof, with the proviso that the catalytically passive anode does not comprise nickel.

5. The method of claim 1, wherein the catalytic cathode comprises steel.

6. The method of claim 1, wherein the catalytic cathode comprises a second conductive substrate and a catalytic layer deposited on said second conductive substrate, the catalytic layer comprising the catalyst and the catalytic layer having a thickness of from 0.1 nm to 25 nm.

7. The method of claim 6, wherein the catalytic cathode further comprises a second passivating layer; wherein the second passivating layer is disposed between the second conductive substrate and the catalytic layer; and wherein the second passivating layer comprises $Al_2O_3$, $TiO_2$, MgO, TiN, VN, or combinations thereof.

8. The method of claim 1, wherein the catalytic cathode comprises a second conductive substrate and a plurality of catalytic particles deposited on said second conductive substrate, wherein the plurality of catalytic particles comprise the catalyst and wherein the plurality of catalytic particles have an average particle size of from 0.5 nm to 50 nm.

9. The method of claim 8, wherein the catalytic cathode further comprises a second passivating layer; wherein the second passivating layer is disposed between the second conductive substrate and the plurality of catalytic particles; and wherein the second passivating layer comprises $Al_2O_3$, $TiO_2$, MgO, TiN, VN, or combinations thereof.

10. The method of claim 1, wherein the catalyst comprises Fe.

11. The method of claim 1, wherein the catalyst comprises Fe and the catalytic cathode comprises Fe in an amount of 75% or more.

12. The method of claim 1, wherein the source of $CO_2$ is provided by injecting the $CO_2$ source into the molten carbonate electrolyte.

13. The method of claim 1, wherein the source of $CO_2$ comprises $CO_2$, air, exhaust from an industrial process, exhaust from an internal combustion engine, or a combination thereof.

14. The method of claim 1, wherein the plurality of carbon nanotubes are crystalline.

15. The method of claim 1, wherein the average length of the plurality of carbon nanotubes is from 100 nm to 1 cm; the average outer diameter of the plurality of carbon nanotubes is 100 nm or less; or a combination thereof.

16. The method of claim 1, wherein:
   the catalyst comprises Fe;
   the catalytic cathode comprises steel;
   the current density is from 25 $mA/cm^2$ to 100 $mA/cm^2$;
   the current is applied for an amount of time of from 1 minute to 1 hour;
   the first conductive substrate comprises nickel;
   the first passivating layer comprises $Al_2O_3$; and
   the first passivating layer has a thickness of from 45 nm to 55 nm.

17. The method of claim 1, further comprising collecting the plurality of carbon nanotubes from the catalytic cathode; wherein collecting the plurality of carbon nanotubes from the catalytic cathode comprises:
   sonicating the catalytic cathode to separate the plurality of carbon nanotubes from the catalytic cathode by dispersing the plurality of carbon nanotubes into a solvent and centrifuging or filtering the solvent with the plurality of carbon nanotubes dispersed therein to thereby collect the plurality of carbon nanotubes; or mechanically scraping the catalytic cathode to separate the plurality of carbon nanotubes from the catalytic cathode.

* * * * *